(12) United States Patent
Yordanov et al.

(10) Patent No.: US 11,312,229 B1
(45) Date of Patent: Apr. 26, 2022

(54) FUEL SYSTEM MOUNTABLE TO A VEHICLE FRAME

(71) Applicant: Agility Fuel Systems LLC, Costa Mesa, CA (US)

(72) Inventors: Momchil Yordanov, Kelowna (CA); Chris Forsberg, Kelowna (CA); Andrew Taylor Gordon, Kelowna (CA); Adam Robertson, Kelowna (CA); Michael Gregory Volkmer, Lincoln, NE (US); Dustin Joseph John, Lincoln, NE (US); Chad Alvin Cederberg, Lincoln, NE (US); David Neil Morgan, Weston, NE (US); John David Makinson, Lincoln, NE (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 17/452,937

(22) Filed: Oct. 29, 2021

Related U.S. Application Data

(63) Continuation-in-part of application No. PCT/US2020/031104, filed on May 1, 2020.
(Continued)

(51) Int. Cl.
*B60K 15/03* (2006.01)
*B62D 21/02* (2006.01)
(Continued)

(52) U.S. Cl.
CPC .......... *B60K 15/03006* (2013.01); *B32B 1/08* (2013.01); *B32B 7/12* (2013.01);
(Continued)

(58) Field of Classification Search
CPC .... B60K 15/03006; B60K 2015/03065; B60K 2015/03046; B60K 2015/03039
See application file for complete search history.

(56) References Cited

U.S. PATENT DOCUMENTS

| 1,598,868 A | 9/1926 | Frederick |
| 2,044,039 A | 6/1936 | Woodcock |

(Continued)

FOREIGN PATENT DOCUMENTS

| CN | 105443221 | 3/2016 |
| DE | 10 2016 002 097 | 9/2016 |

(Continued)

OTHER PUBLICATIONS

EHA Composite Machinery GmbH Brochure, in 10 pages.
(Continued)

*Primary Examiner* — James A English
(74) *Attorney, Agent, or Firm* — Knobbe, Martens, Olson & Bear, LLP

(57) ABSTRACT

A system for powering a vehicle is provided. The system can include an engine or power generation system to be powered by a fuel and a housing. The housing can be configured to couple to one or more frame rails of the vehicle, receive and protect a cylinder configured to store the fuel to be used by the engine or power generation system. The housing can have one or more access panels allowing access to an interior of the housing. The cylinder can include a first end portion, a second end portion, a central body forming an enclosed cavity for storing pressurized gas, a reinforcement structure disposed over the central body, and a metal foil interposed between the reinforcement structure and central body. The metal foil can be configured to reduce permeation of contents of the cylinder.

20 Claims, 54 Drawing Sheets

Related U.S. Application Data

(60) Provisional application No. 62/842,366, filed on May 2, 2019.

(51) Int. Cl.

| | | |
|---|---|---|
| *F02M 21/02* | (2006.01) | |
| *B32B 27/08* | (2006.01) | |
| *B32B 15/082* | (2006.01) | |
| *B32B 15/20* | (2006.01) | |
| *B32B 27/30* | (2006.01) | |
| *B32B 27/32* | (2006.01) | |
| *B32B 1/08* | (2006.01) | |
| *B32B 7/12* | (2006.01) | |
| *B62D 33/06* | (2006.01) | |

(52) U.S. Cl.
CPC ............ *B32B 15/082* (2013.01); *B32B 15/20* (2013.01); *B32B 27/08* (2013.01); *B32B 27/304* (2013.01); *B32B 27/306* (2013.01); *B32B 27/32* (2013.01); *B62D 21/02* (2013.01); *B62D 33/0617* (2013.01); *F02M 21/0221* (2013.01); *B32B 2307/7265* (2013.01); *B32B 2597/00* (2013.01); *B32B 2605/08* (2013.01)

(56) References Cited

U.S. PATENT DOCUMENTS

| | | | |
|---|---|---|---|
| 2,479,828 A | 8/1949 | Geckler | |
| 2,632,262 A | 3/1953 | Jones | |
| 2,723,705 A | 11/1955 | Collins | |
| 3,074,584 A | 1/1963 | Dobell | |
| 3,312,575 A | 4/1967 | Corbin, Jr. | |
| 3,321,347 A | 5/1967 | Price et al. | |
| 3,669,816 A | 6/1972 | Smith | |
| 3,783,964 A | 1/1974 | Telesio | |
| 3,795,573 A | 3/1974 | Smith et al. | |
| 3,843,010 A | 10/1974 | Morse et al. | |
| 4,102,461 A | 7/1978 | Soyland | |
| 4,231,444 A | 11/1980 | Telesio | |
| 4,231,708 A | 11/1980 | Telesio | |
| 4,394,027 A | 7/1983 | Watkins | |
| 4,438,858 A | 3/1984 | Grover | |
| 4,660,738 A | 4/1987 | Ives | |
| 4,760,949 A | 8/1988 | Elias | |
| 4,927,038 A | 5/1990 | Roebuck | |
| 4,971,092 A | 11/1990 | Parry | |
| 5,054,799 A | 10/1991 | Fingerle | |
| 5,078,223 A | 1/1992 | Ishiwatari | |
| 5,136,752 A | 8/1992 | Bening et al. | |
| 5,285,863 A | 2/1994 | Miki | |
| 5,287,987 A | 2/1994 | Gaiser | |
| 5,287,988 A | 2/1994 | Murray | |
| 5,368,184 A | 11/1994 | Fay et al. | |
| 5,419,139 A | 5/1995 | Blum et al. | |
| 5,476,189 A | 12/1995 | Duvall et al. | |
| 5,499,739 A | 3/1996 | Greist, III et al. | |
| 5,527,098 A | 6/1996 | McKinney | |
| 5,798,156 A | 8/1998 | Mitkitsky | |
| 5,810,309 A | 9/1998 | Augustine et al. | |
| 5,822,838 A | 10/1998 | Seal et al. | |
| 6,053,533 A | 4/2000 | Osborn et al. | |
| 6,098,754 A | 8/2000 | Toner | |
| 6,145,692 A | 11/2000 | Cherevatsky | |
| 6,158,794 A * | 12/2000 | Flanagan ........... | B60H 1/00364 296/37.6 |
| 6,347,678 B1 | 2/2002 | Osborn et al. | |
| 6,402,198 B2 | 6/2002 | Gollungberg | |
| 6,481,751 B1 | 11/2002 | Davis, Jr. et al. | |
| 6,510,961 B1 | 1/2003 | Head et al. | |
| 6,630,529 B2 | 10/2003 | Robichaud | |
| 6,668,471 B1 | 12/2003 | Cook et al. | |
| 6,676,163 B2 | 10/2004 | Joitescu et al. | |
| 6,843,237 B2 | 1/2005 | Bowen et al. | |
| 6,896,318 B2 | 5/2005 | Marrs et al. | |
| 6,986,490 B2 | 1/2006 | Eihusen et al. | |
| 7,137,474 B2 | 11/2006 | Yokote | |
| 7,189,040 B2 | 3/2007 | Sharp | |
| 7,208,207 B2 | 4/2007 | Ono et al. | |
| 7,211,307 B2 | 5/2007 | Potter et al. | |
| 7,270,209 B2 | 9/2007 | Suess | |
| 7,743,869 B2 | 6/2010 | Flournoy, Jr. et al. | |
| 7,743,940 B2 | 6/2010 | Brunnhofer | |
| 7,770,679 B2 | 8/2010 | Takaku et al. | |
| 7,810,754 B2 | 10/2010 | Uozumi et al. | |
| 7,815,141 B2 | 10/2010 | Uozumi et al. | |
| 7,832,235 B2 | 11/2010 | Neubert et al. | |
| 7,984,925 B2 | 7/2011 | Levin et al. | |
| 8,048,248 B2 | 11/2011 | Neubert | |
| 8,056,928 B2 | 11/2011 | Ijaz et al. | |
| 8,074,826 B2 | 12/2011 | Cronin et al. | |
| 8,113,457 B2 | 2/2012 | Tanigawa et al. | |
| 8,186,535 B2 | 5/2012 | Sheam | |
| 8,308,017 B2 | 11/2012 | Schlag | |
| 8,313,595 B2 | 11/2012 | Blanc et al. | |
| 8,381,955 B2 | 2/2013 | Grater et al. | |
| 8,668,108 B2 | 3/2014 | Yeggy et al. | |
| 8,690,191 B2 | 4/2014 | Gentry | |
| 8,807,256 B2 | 8/2014 | Gibb et al. | |
| 8,820,453 B2 | 9/2014 | Giles-Brown et al. | |
| 8,905,170 B2 | 12/2014 | Kyoden et al. | |
| 9,011,622 B2 | 4/2015 | Radtke | |
| 9,061,584 B2 | 6/2015 | Vargo et al. | |
| 9,074,685 B2 | 7/2015 | Strack et al. | |
| 9,103,500 B2 | 8/2015 | Newhouse et al. | |
| 9,114,930 B2 | 8/2015 | Simmons | |
| 9,120,372 B2 | 9/2015 | Sloan et al. | |
| 9,156,202 B2 | 10/2015 | Tanigawa et al. | |
| D743,869 S | 11/2015 | Sloan et al. | |
| 9,227,582 B2 | 1/2016 | Katayama et al. | |
| 9,302,437 B2 | 4/2016 | Radtke | |
| 9,340,108 B2 | 5/2016 | Goedken | |
| 9,421,861 B2 | 8/2016 | Green | |
| 9,457,652 B2 | 10/2016 | Sloan et al. | |
| 9,499,047 B2 | 11/2016 | Milton | |
| 9,533,569 B2 | 1/2017 | McKinney et al. | |
| 9,545,770 B2 | 1/2017 | Miller | |
| 9,579,969 B2 | 2/2017 | Crist et al. | |
| 9,592,731 B2 | 3/2017 | Hanlin et al. | |
| 9,618,160 B2 | 4/2017 | Eihusen et al. | |
| 9,738,154 B2 | 8/2017 | Green | |
| 9,884,552 B2 | 2/2018 | Sloan et al. | |
| 10,017,037 B2 | 6/2018 | Newman et al. | |
| 10,081,243 B2 | 9/2018 | Zimmerman et al. | |
| 10,086,694 B2 | 10/2018 | Green | |
| 10,088,110 B2 | 10/2018 | Newhouse et al. | |
| 10,124,665 B2 | 11/2018 | van der Linden | |
| 10,144,280 B2 | 12/2018 | Sloan et al. | |
| 10,287,052 B2 | 5/2019 | Vanswijgenhoven | |
| 10,369,884 B2 | 8/2019 | Sloan et al. | |
| 10,465,848 B1 | 11/2019 | Newhouse et al. | |
| 10,481,133 B2 | 11/2019 | Eihusen et al. | |
| 10,544,901 B2 | 1/2020 | Newhouse et al. | |
| 10,589,788 B1 | 3/2020 | Milton et al. | |
| 10,627,048 B2 | 4/2020 | Morgan | |
| 10,627,049 B2 | 4/2020 | Schimenti et al. | |
| 10,641,431 B2 | 5/2020 | Mallick et al. | |
| 10,648,620 B2 | 5/2020 | Yeggy et al. | |
| 10,670,191 B2 | 6/2020 | Yeggy et al. | |
| 10,696,155 B2 | 6/2020 | Sloan et al. | |
| 10,744,873 B2 | 8/2020 | Sloan et al. | |
| 10,746,354 B2 | 8/2020 | Moutray et al. | |
| 10,753,474 B2 | 8/2020 | Moutray et al. | |
| 10,760,741 B2 | 9/2020 | Moutray et al. | |
| 10,823,333 B2 | 11/2020 | Criel et al. | |
| 10,851,945 B2 | 12/2020 | Glaesemann et al. | |
| 10,864,859 B2 | 12/2020 | Sloan et al. | |
| 10,906,395 B2 | 2/2021 | Gibb et al. | |
| 10,928,010 B2 | 2/2021 | Halvorsen et al. | |
| 10,942,533 B2 | 3/2021 | Hawkins et al. | |
| 11,015,762 B2 | 5/2021 | Mauieu et al. | |
| 2002/0030397 A1 | 3/2002 | Tamura et al. | |
| 2004/0056390 A1 | 3/2004 | Yeh | |

(56) References Cited

U.S. PATENT DOCUMENTS

| | | |
|---|---|---|
| 2004/0075034 A1 | 4/2004 | Yokote |
| 2005/0029022 A1 | 2/2005 | Kubusch et al. |
| 2005/0045391 A1 | 3/2005 | Kubusch et al. |
| 2005/0191435 A1 | 9/2005 | Bauman |
| 2008/0067209 A1 | 3/2008 | Gunn |
| 2008/0105310 A1 | 5/2008 | Ogami et al. |
| 2008/0115998 A1 | 5/2008 | Naganuma et al. |
| 2008/0169139 A1 | 7/2008 | Kramer |
| 2008/0173358 A1 | 7/2008 | Guldi |
| 2009/0114784 A1 | 5/2009 | Tam |
| 2010/0065597 A1 | 3/2010 | Grater et al. |
| 2011/0210475 A1 | 9/2011 | Strack et al. |
| 2011/0220660 A1 | 9/2011 | Strack |
| 2011/0233353 A1 | 9/2011 | Palmer |
| 2011/0288738 A1 | 11/2011 | Donnelly et al. |
| 2011/0304083 A1 | 12/2011 | Strack |
| 2012/0080466 A1 | 4/2012 | Schultheis et al. |
| 2012/0090907 A1 | 4/2012 | Store et al. |
| 2012/0161430 A1 | 6/2012 | Mulanon |
| 2012/0174371 A1 | 7/2012 | Koehnan et al. |
| 2012/0228307 A1 | 9/2012 | Simmons |
| 2012/0280481 A1 | 11/2012 | Gentry |
| 2012/0313348 A1 | 12/2012 | Pfaff |
| 2013/0001384 A1 | 1/2013 | Karlsson et al. |
| 2013/0112313 A1 | 5/2013 | Donnelly et al. |
| 2013/0199863 A1 | 8/2013 | Robbins |
| 2013/0313266 A1 | 11/2013 | Andernach et al. |
| 2013/0334381 A1 | 12/2013 | Vargo, Jr. et al. |
| 2014/0008373 A1 | 1/2014 | Sharp et al. |
| 2014/0034409 A1 | 2/2014 | Nakamura et al. |
| 2014/0061266 A1 | 3/2014 | Milton et al. |
| 2014/0069972 A1 | 3/2014 | Willemsen |
| 2014/0137953 A1 | 5/2014 | Gibb et al. |
| 2014/0138173 A1* | 5/2014 | Gibb .................. B60K 15/013 180/69.5 |
| 2014/0175782 A1 | 6/2014 | Sloan et al. |
| 2014/0217107 A1 | 8/2014 | Sloan et al. |
| 2014/0238529 A1 | 8/2014 | Komuniecki et al. |
| 2014/0291047 A1 | 10/2014 | Matsumoto et al. |
| 2014/0326732 A1* | 11/2014 | Hutzen .................. B29C 49/22 220/562 |
| 2014/0367954 A1 | 12/2014 | McKinney et al. |
| 2015/0044407 A1 | 2/2015 | Som et al. |
| 2015/0096994 A1 | 4/2015 | Radtke |
| 2015/0107693 A1 | 4/2015 | Green |
| 2015/0108747 A1 | 4/2015 | Goedken |
| 2015/0112506 A1 | 4/2015 | Hanlin et al. |
| 2015/0175353 A1 | 6/2015 | Gillmore et al. |
| 2015/0192251 A1 | 7/2015 | Tupper et al. |
| 2015/0240993 A1 | 8/2015 | DeLay |
| 2016/0023548 A1 | 1/2016 | Crist et al. |
| 2016/0082910 A1 | 3/2016 | Sloan et al. |
| 2016/0226041 A1 | 8/2016 | Jackson et al. |
| 2017/0334288 A1 | 1/2017 | Rike et al. |
| 2017/0057348 A1 | 3/2017 | Arold et al. |
| 2017/0101003 A1 | 4/2017 | Zimmerman et al. |
| 2017/0282710 A1* | 10/2017 | Sloan ...................... F17C 13/08 |
| 2017/0313179 A1* | 11/2017 | Sloan .................. B62D 35/008 |
| 2018/0080607 A1 | 3/2018 | Van Haaren et al. |
| 2018/0283610 A1 | 10/2018 | Wexler et al. |
| 2019/0107455 A1 | 4/2019 | Wortman et al. |
| 2019/0111609 A1 | 4/2019 | Van Nimwegen et al. |
| 2019/0170297 A1 | 6/2019 | Criel et al. |
| 2020/0072315 A1 | 3/2020 | Seno et al. |
| 2020/0088299 A1 | 3/2020 | Baumer et al. |
| 2020/0331536 A1* | 10/2020 | Sloan .................. B62D 25/088 |
| 2020/0347992 A1 | 11/2020 | Volkmer et al. |
| 2020/0384854 A1 | 12/2020 | Sloan et al. |
| 2021/0088183 A1 | 3/2021 | Middendorf |
| 2021/0123565 A1 | 4/2021 | Kerforn et al. |
| 2021/0123568 A1 | 4/2021 | Kronholz et al. |
| 2021/0129663 A1 | 5/2021 | Yordanov et al. |
| 2021/0138717 A1 | 5/2021 | Iriyama |

FOREIGN PATENT DOCUMENTS

| | | |
|---|---|---|
| DE | 10 2017 208492 | 11/2018 |
| EP | 1 574 320 B1 | 10/2008 |
| EP | 2 065 247 A1 | 11/2008 |
| EP | 2 130 747 A2 | 12/2009 |
| EP | 2 165 875 A2 | 3/2010 |
| JP | H11-278069 A | 10/1999 |
| JP | 2005-138771 A | 6/2005 |
| JP | 2009-220680 A | 10/2009 |
| JP | 2010-100207 A | 5/2010 |
| KR | 19980035495 | 8/1998 |
| KR | 10-2006-0022778 | 3/2006 |
| KR | 20170000950 | 1/2017 |
| WO | WO 1994/012396 A1 | 6/1994 |
| WO | WO 2000/057102 A1 | 9/2000 |
| WO | WO 2007/110399 A2 | 10/2007 |
| WO | WO 2007/133213 A1 | 11/2007 |
| WO | WO 2012/087224 A1 | 6/2012 |
| WO | WO 2012/115622 A1 | 8/2012 |
| WO | WO 2014/063018 A1 | 4/2014 |
| WO | WO 2015/191918 | 12/2015 |
| WO | WO 2016/210329 A1 | 12/2016 |
| WO | WO 2017/173379 | 10/2017 |
| WO | WO 2018/135990 A1 | 7/2018 |
| WO | WO 2020/197856 A1 | 10/2020 |
| WO | WO 2020/223666 A1 | 11/2020 |

OTHER PUBLICATIONS

JEC Connect, "The new machine concept for the large-scale pressure vessel", Jun. 2021, in 4 pages.

Roth Composite Machinery Gmbh, "Press release—Aerospace: Roth Filament Winding Plant for the manufacture of Ariane 6 boosters", Jun. 26, 2018, in 7 pages.

Office Action dated Sep. 10, 2020, in U.S. Appl. No. 16/863,329, in 16 pages.

Amendment and Response to Office Action dated Sep. 10, 2020, filed Dec. 9, 2020, in U.S. Appl. No. 16/863,329, in 13 pages.

Office Action dated Dec. 28, 2020, in U.S. Appl. No. 16/863,329, in 14 pages.

Applicant-Initiated Interview Summary dated Feb. 23, 2021, in U.S. Appl. No. 16/863,329, in 6 pages.

Amendment and Response to Office Action dated Dec. 28, 2020, filed Mar. 11, 2021, in U.S. Appl. No. 16/863,329, in 11 pages.

Office Action dated Jun. 16, 2021, in U.S. Appl. No. 16/863,329, in 12 pages.

Applicant-Initiated Interview Summary dated Sep. 20, 2021, in U.S. Appl. No. 16/863,329, in 4 pages.

* cited by examiner

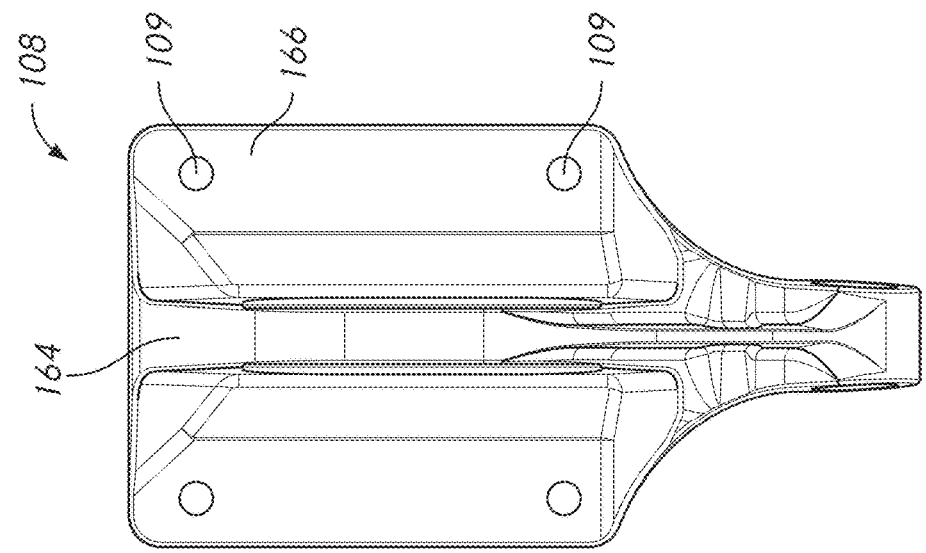
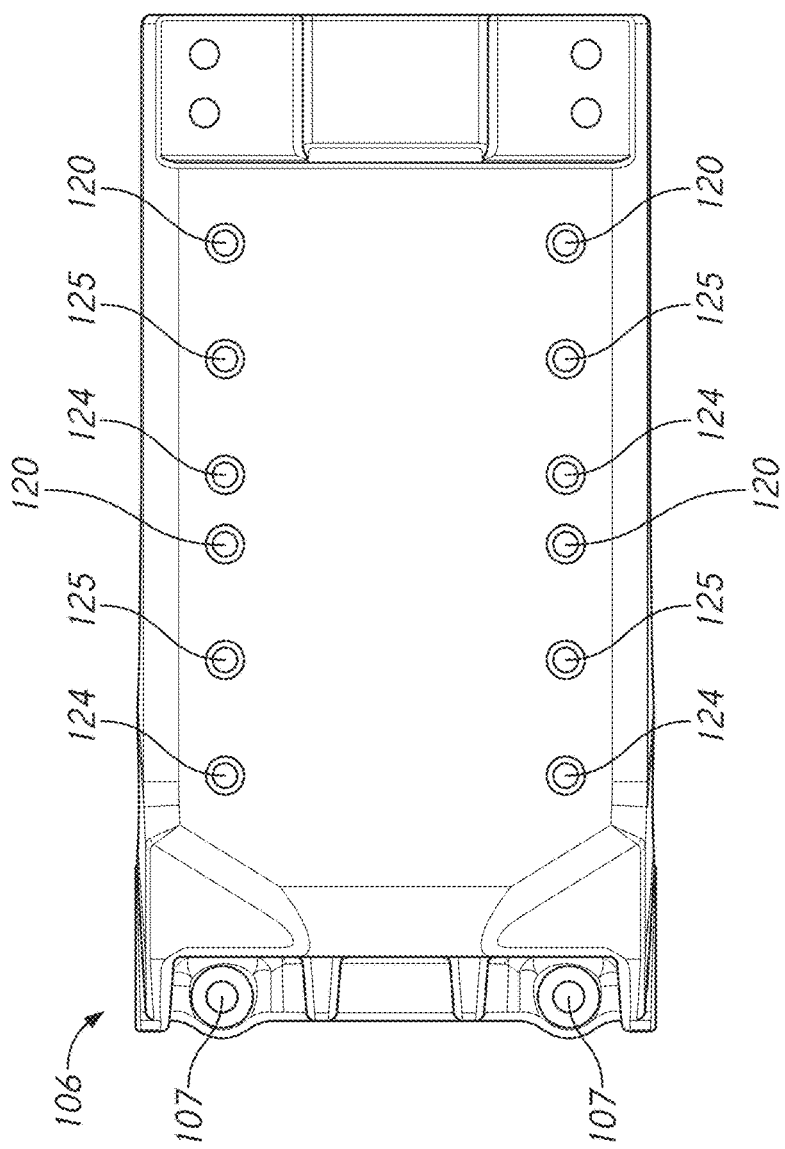
FIG. 3

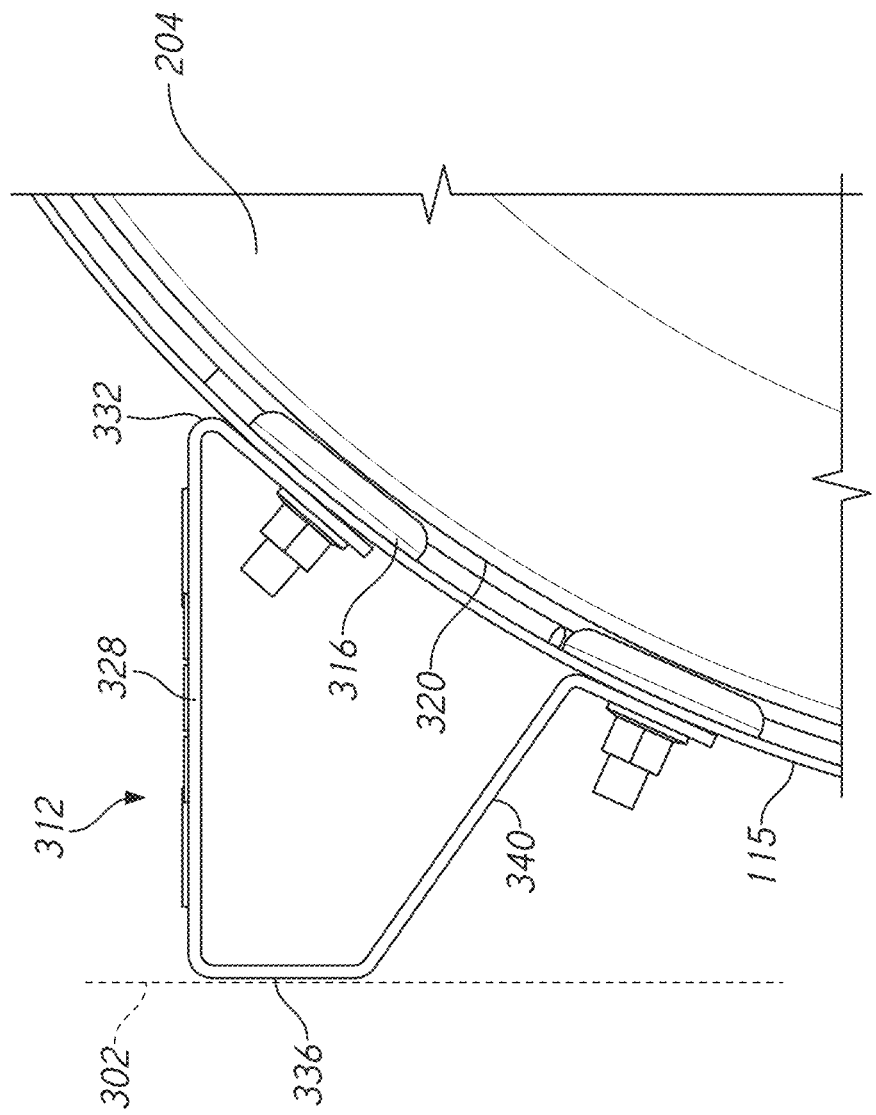

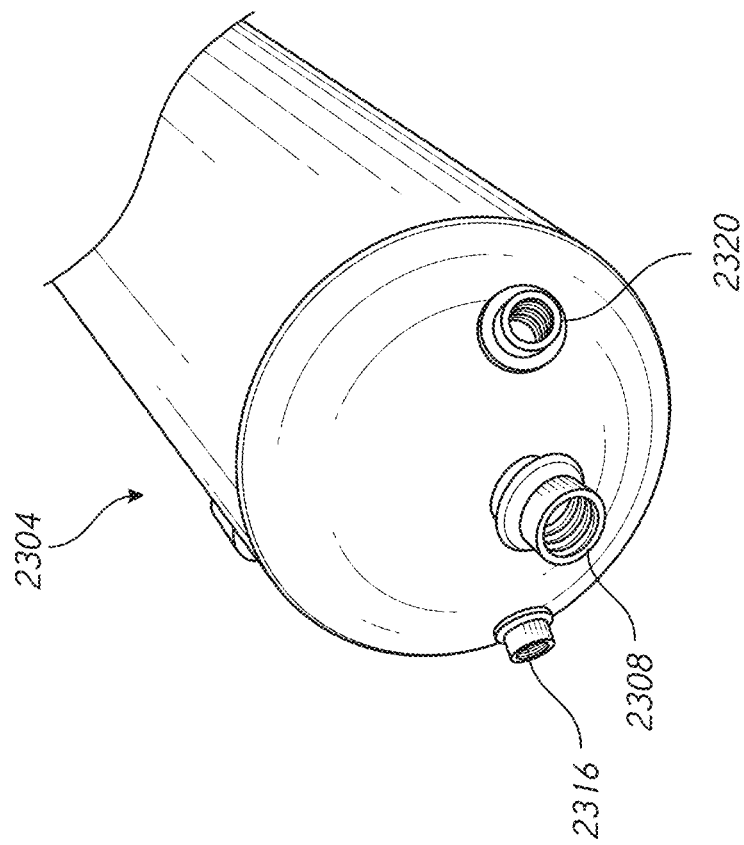
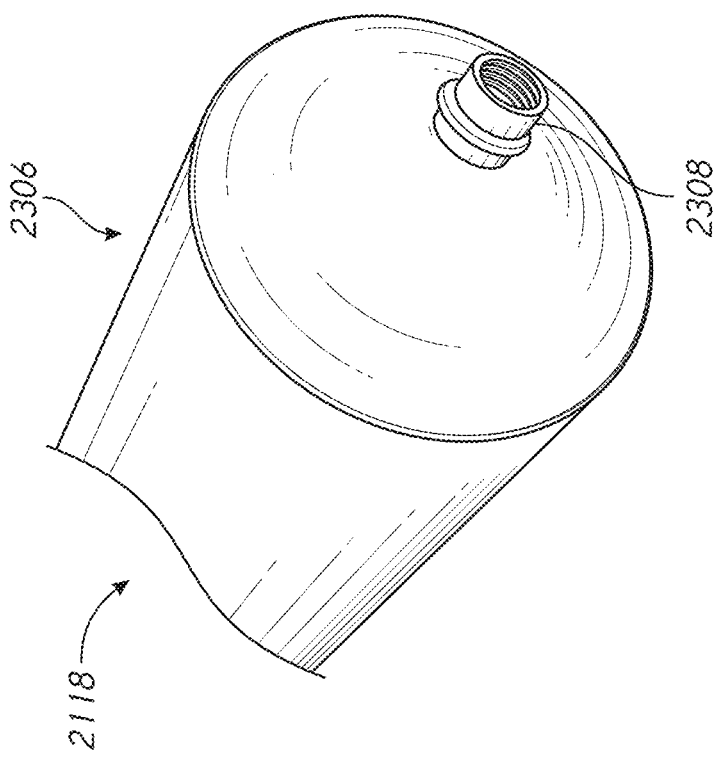
FIG. 40

FUEL SYSTEM MOUNTABLE TO A VEHICLE FRAME

CROSS-REFERENCE

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application relates to fuel systems that can be mounted to a lateral or side portion of a vehicle frame rail.

Description of the Related Art

Compressed natural gas (CNG) is an alternative fuel that provides many advantages. CNG fuels burn cleaner than other combustion fuels for vehicles. CNG also can be more cost effective.

CNG fuel systems can come in several forms. One form employs a Type IV fuel tank constructed with a polymeric liner. Carbon fiber wrapped around the liner can reinforce the liner, to produce a fuel tank strong enough for use on heavy-duty trucks and other vehicles. The fuel tank can have a boss sealing each of the end portion of the fuel tank. The boss can provide access to the fuel tank for filling and dispensing the fuel contained therein. A side mounted fuel system can include a frame to support the fuel tank on a side or lateral portion of a vehicle. Straps can support central portions of the fuel tank within the frame. Some fuel tanks also can be supported at one or both ends at the bosses.

SUMMARY OF THE INVENTION

While the side mounted fuel system is known, complications in mounting the fuel system can arise. Straps adds cost, complexity, and a failure mode to the fuel system. Also, other components are mounted to the lateral portion of the frame rail. So it can be challenging to locate the fuel system conveniently relative to these other components. A need exists to provide improved side-mounted fuel systems. There is a need for improved assemblies and systems that can be more flexibly connected to the frame rail, e.g., a two or more positions spaced along the frame rail. There is a need for improved assemblies and systems that support a fuel tank at a boss portion. Also, there is a need for an improved cab access system. These improvements can enable larger tanks to be supported to a lateral portion of a frame rail while not extending the width of the vehicle at the tank beyond acceptable limits.

In one embodiment, a vehicle is provided that includes a cab, a plurality of wheels, one or more frame rails, an engine or power generation system, a cylinder, and a housing. The cab is configured to house one or more occupants of the vehicle. The one or more frame rails are configured to support the cab and the plurality of wheels. The engine or power generation system is configured to be powered by a fuel. The cylinder is configured to store the fuel to be used by the engine or power generation system. The cylinder has a first end portion, a second end portion, and a central body forming an enclosed cavity for storing pressurized gas, a reinforcement structure disposed over the central body, and a metal foil interposed between the reinforcement structure and central body. The metal foil is configured to reduce permeation of contents of the cylinder. The housing is coupled to at least one of the one or more frame rails. The housing is configured to receive the cylinder, protect the cylinder, and accommodate fluid coupling between the cylinder and the engine or power generation system. The housing has one or more access panels allowing access to an interior of the housing.

In some variations, the vehicle is a tractor configured to pull a trailer.

In some variations, the fuel is compressed natural gas.

In some variations, the housing is located on a side of the vehicle, behind a cab of the vehicle, a rooftop of the vehicle, or on a tailgate of the vehicle. The access panel is rotatably coupled to an end portion of the housing in a configuration that enables the access panel to be rotated between open and closed positioned while keeping an inner surface of the access panel parallel to an outer surface of the end portion of the housing.

In some variations, the metal foil is an aluminum foil having a thickness in a range between 0.0005 in and 0.05 inches.

In some variations, the central body has a first end coupled with the first end portion and a second end coupled with the second end portion. The central body has an outer surface and an inner surface disposed between the first end and the second end. The central body between the inner surface and the outer surface is a continuous expanse of a homogenous material.

In some variations, the vehicle further comprises an adhesive layer interposed between the metal foil and the central body.

In some variations, the metal foil comprises a portion of a metal foil structure comprising a polymer layer, the polymer layer of the metal foil structure disposed on a side of the metal foil such that the polymer layer is interposed between the metal foil and the central body.

In some variations, the central body comprises a cylindrical body and the first end portion comprises a hemispherical member coupled with one end of the cylindrical body. The metal foil is disposed over the cylindrical body.

In some variations, the central body comprises a cylindrical body and the first end portion comprises a hemispherical member coupled with one end of the cylindrical body. The metal foil has a circumferential end spaced apart from the hemispherical member.

In some variations, the metal foil is disposed in a laminate structure and is wound about the central body.

In some variations, the metal foil is wound circumferentially about the central body.

In another embodiment, a system for powering a vehicle is provided that includes an engine or power generation system and a housing. The engine or power generation system is configured to be powered by a fuel. The housing is configured to couple to one or more frame rails of the vehicle and receive and protect a cylinder configured to store the fuel to be used by the engine or power generation system. The cylinder comprises a first end portion, a second end portion, a central body forming an enclosed cavity for storing pressurized gas, a reinforcement structure disposed over the central body, and a metal foil interpose between the reinforcement structure and central body. The metal foil is configured to reduce permeation of contents of the cylinder.

In some variations, the housing is located on a side of the vehicle, behind a cab of the vehicle, a rooftop of the vehicle, or on a tailgate of the vehicle In some variations, the system further comprises an adhesive layer interposed between the metal foil and the central body.

In some variations, the metal foil comprises a portion of a metal foil structure comprising a polymer layer, the polymer layer of the metal foil structure disposed on a side of the metal foil such that the polymer layer is interposed between the metal foil and the central body.

In some variations, the central body comprises a cylindrical body and the first end portion comprises a hemispherical member coupled with one end of the cylindrical body. The metal foil is disposed over the cylindrical body.

In some variations, the central body comprises a cylindrical body and the first end portion comprises a hemispherical member coupled with one end of the cylindrical body. The metal foil has a circumferential end spaced apart from the hemispherical member.

In some variations, the metal foil is disposed in a laminate structure and is wound circumferentially about the central body.

In another embodiment, a system for powering a vehicle is provided that includes an engine or power generation system, an internal pressure enclosure, a reinforcement structure, a barrier structure, and a housing. The engine or power generation system is configured to be powered by a pressurized gas. The internal pressure enclosure includes a first end portion, a second end portion, a central body having a first end coupled with the first end portion and a second end coupled with the second portion The central body further has an outer surface and an inner surface disposed between the first end and the second. The first end portion, the second end portion, and the central body form an enclosed cavity for storing the pressurized gas wherein the inner surface of the central body forms at least a portion of an innermost surface of the internal pressure enclosure. The central body between the inner surface and the outer surface being a continuous expanse of a homogenous material. The reinforcement structure is disposed over the central body. The barrier structure is interposed between the reinforcement structure and the outer surface of the central body. The barrier structure is configured to reduce permeation of contents of the internal pressure enclosure. The housing is coupled to one or more frame rails of the vehicle and configured to receive the internal pressure enclosure.

In another embodiment, a fuel system is provided that includes a fuel system frame, a first bracket, and a second bracket. The fuel system frame has a first position and a second position spaced apart from the first position. The first bracket is configured to connect to the fuel system frame at the first position or at the second position to support the fuel system from either the first position or the second position. The second bracket has a first portion configured to mate with the first bracket and a second portion configured to connect to a vehicle frame rail.

The first position and the second position allow the first and second brackets to be located at any one of a plurality of different vehicle frame rail positions along the frame rail without requiring the movement of the fuel system frame.

The first position and the second position allow the fuel system to be located in any one of a plurality of different vehicle frame rail positions along the frame rail without requiring the movement of the second bracket.

In another embodiment, a fuel system is provided that includes a fuel tank and a support assembly. The fuel tank includes a central cylindrical portion, a first neck portion that has a first boss at a first end and a second neck portion that has a second boss at a second end. The support assembly is configured to connect the fuel system to a side portion of a frame rail of a vehicle. The support assembly has a first tank support portion, a second tank support portion, and a bracket system. The first tank support portion is configured to support the first neck portion of the tank. The second tank support portion is configured to support the second neck portion of the tank. The bracket system is coupled with the first tank support portion and the second tank support portion. The bracket system is configured to be coupled to a frame rail at a frame rail position longitudinally between the first neck portion of the fuel tank and the second neck portion of the fuel tank.

In some variations, the tank is not being directly supported at locations longitudinally between the first and second neck portions.

In another embodiment a fuel system is provided that includes a fuel tank, a frame, and a step support. The fuel tank has a central cylindrical portion, a first end and a second end opposite the first end. The frame has a frame rail connection portion disposed on a vehicle side of the fuel system and a tank support portion disposed around one or both of the first and second ends of the fuel tank. The step support is configured to apply a load to the central cylindrical portion of the fuel tank.

In some embodiments, a fuel system is provided that includes an access door on an end of the fuel system. The access door can be configured to be moved to provide access to three or more components within the fuel system. One of the three or more components can be a filter. For example, in some embodiments, the access door can provide access to a filter, a defuel assembly, and a bleed valve. In some embodiments, the access door can provide access to a filter, a cylinder valve assembly, and a bleed valve.

In some configurations the fuel system enclosure, e.g., cover, has an elongated side opening that provides access to one or more components. The components can be mounted to one or more modular frame members, e.g., plates. The elongate opening enables service access to one or more components that may be mounted in a modular way and accessible through the opening. For example, the same exterior enclosure with the elongate access opening can be used to enclose a wide range of internal component layouts while providing service, inspection and repair access to the components thereof. In one example, three modular frame members are provided, each with one or more serviceable component mounted thereto. The access opening can provide access to the components on all three modular frame members.

In another form, an enclosure is provided with an access door assembly having two stop positions. The assembly can have a first stop position corresponding to the door being rotated out of a position of covering an access opening. The assembly can have a second stop position corresponding to the door being rotated to a position of covering the access opening. In one of the positions, a hook comes to rest on a shaft of the access door assembly whereby the position of the door is restrained. The door can be fixed in the restrained position by actuating a door locking clamp.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

FIG. 3 is a disassembled view of a portion of a fuel system bracket and a portion of a fuel system support assembly that has a plurality of connection positions;

FIG. 13A is a detail view of a step assembly of FIG. 13 of the fuel system of FIG. 2;

FIG. 40 is a perspective view of end portions of two tanks, illustrating ports of pressure vessels of the fluid storage system of FIG. 35;

DETAILED DESCRIPTION OF THE PREFERRED EMBODIMENT

Figure 1:
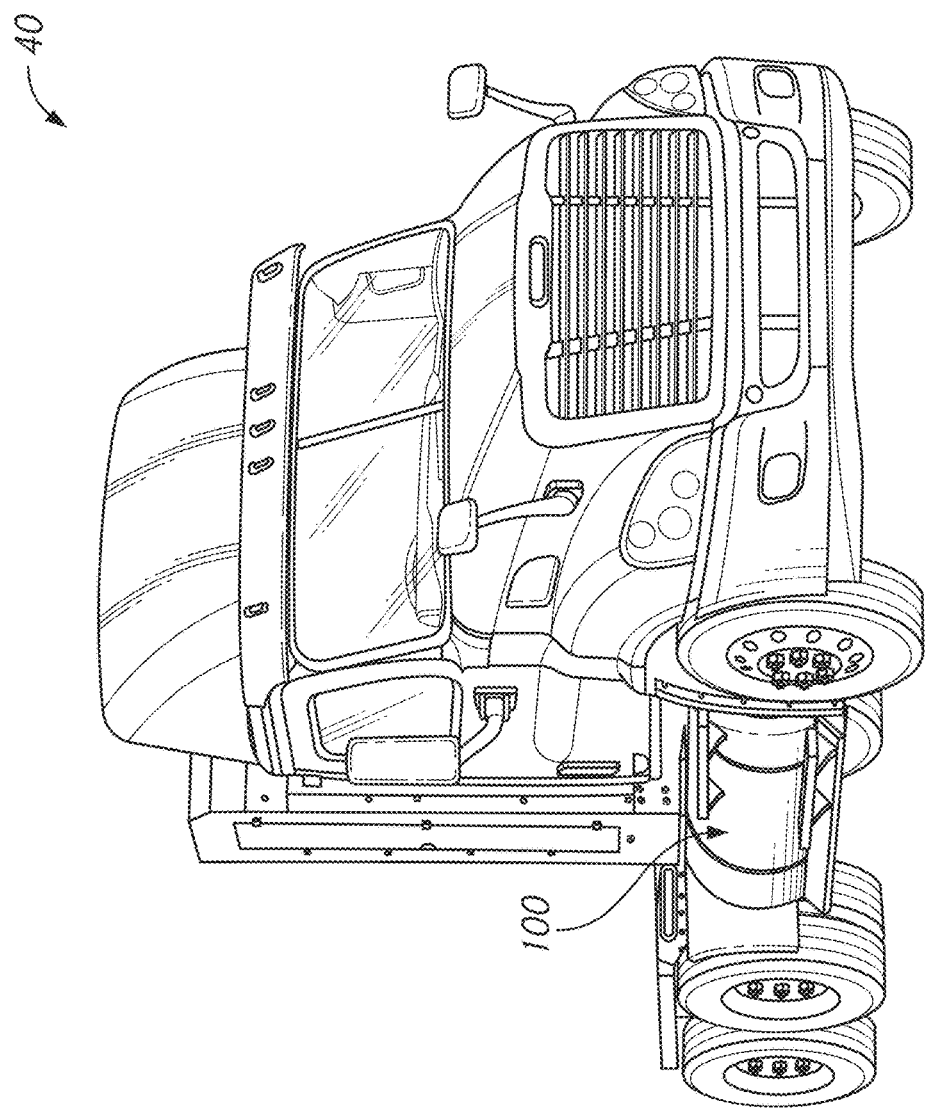
FIG. 1 is a perspective view of a cab of a heavy duty vehicle having a fuel system mounted to a side portion of a frame rail of the vehicle.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses a number of improvements in a side mounted fuel system 100 that, in some embodiments, provides more options in mating or mounting the fuel system 100 to a frame rail 42 of a vehicle 40. See, e.g., FIG. 2 and Section I below. In some cases, the improvement provide enhanced neck mounting of a fuel tank 102 of the fuel system 100. See, e.g., FIGS. 11-12 and Section II below. In some cases, the improvements make better use of available space for vehicle access steps a large fuel tank 102. See, e.g., FIG. 13 and Section III below. In some cases, the improvements provide for better access to components of the fuel system. See, e.g., FIGS. 14, 14A, and 14B and Section IV below. In some cases, the improvements include improved gas cylinder assemblies. See, e.g., FIGS. 15-32 and Section V below. In some cases, the improvements include auxiliary fluid handling systems and/or fuel systems mounted in arrangements other than side mounted. See, e.g., FIGS. 33-47 and Section VI below.

I. Support Assembly for Frame Rail Connections

Some embodiments of the fuel system 100 provide more options for how mounting the fuel system 100 to a vehicle 40. The vehicle 40 can be or include a portion of a heavy-duty vehicle, such as a tractor unit for forming a tractor-trailer. The vehicle 40 includes a frame rail 42 that supports various components, such as forward wheels, rearward wheels, and a cab. The frame rail 42 can include a rigid member formed into a shape providing enhanced strength, such as having an I-beam or a C shaped cross-section configuration. A C-shaped frame rail 42 can have a long side 44 facing away from a center of the frame rail 42 and short sides at a top and a bottom side thereof. The side 44 faces away from a central, vertical forward-rearward plane. The side 44 can be equipped to support the fuel system 100 as well as a number of other components.

Figure 2:
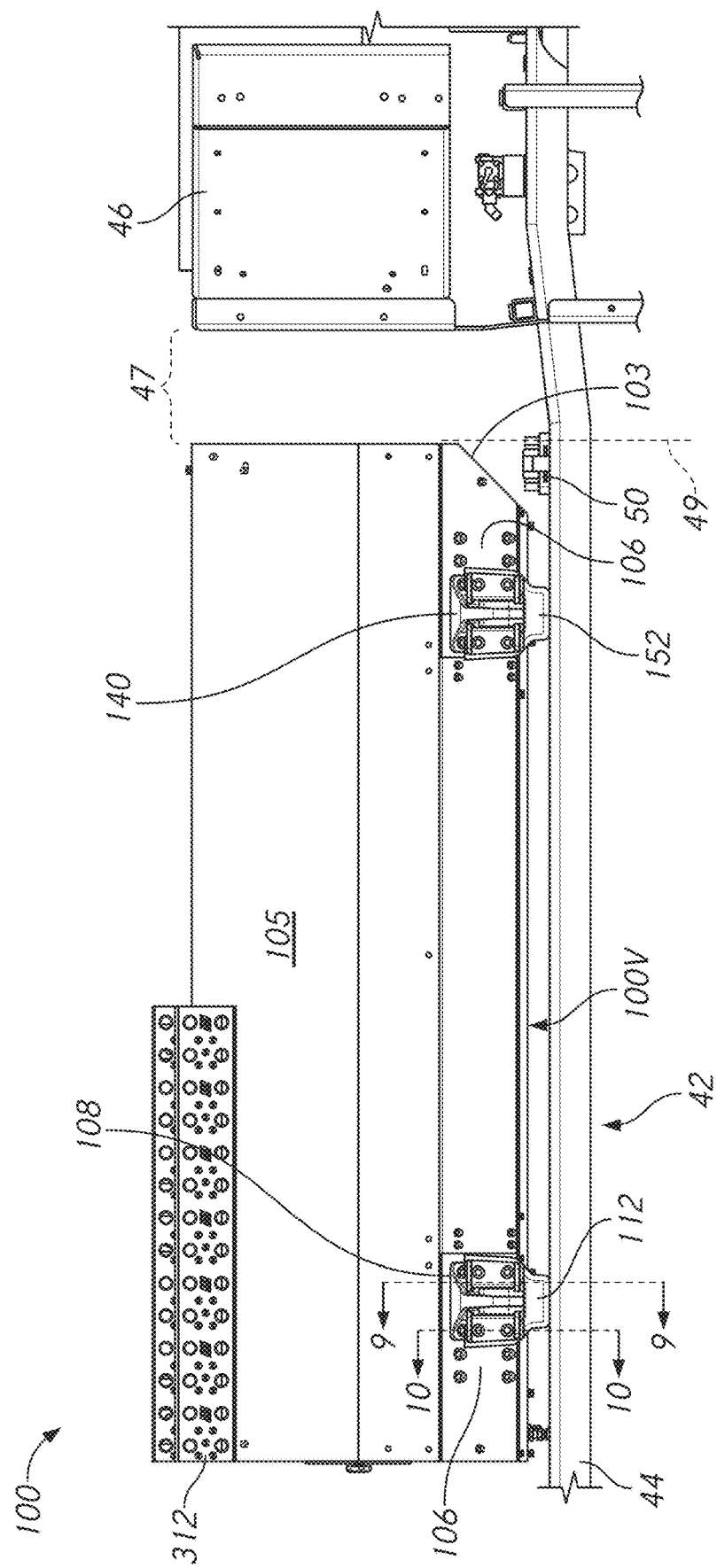
FIG. 2 is a top view of a portion of a vehicle frame rail of a vehicle chassis having a fuel system according to one embodiment coupled to a lateral portion of the frame rail.

FIG. 2 shows an example of how the fuel system 100 and other components can be mounted to the frame rail 42. The fuel system 100 accommodates these other components to make better use of restricted space and/or to provide compact configurations. For example, a fender 46 can be disposed at least partially over front wheels of the vehicle 40. In one embodiment, a gap 47 separates a forward face of the fuel system 100 from a rearward edge of the fender 46. A bracket assembly described below can adjust the gap 47. As a further example, a shackle 50 coupled to the frame rail 42 can be configured to support a shock absorber. The shock absorber configuration and/or the geometry of the vehicle 40 can limit a desired position for the shackle 50.

The mounting location of the fuel system 100 can be shifted to better accommodate these other vehicle components. Also, the bracket assembly component of the fuel system 100 to be shifted even if the rest of the fuel system 100 is not shifted to accommodate these other components.

A. Frame Rail Mounting Location Adjustment

FIGS. 2, 3, 5, and 11 show further aspects of mounting location for the fuel system 100. The fuel system 100 includes the fuel tank 102 that is supported by a support assembly, e.g. a fuel system frame 104. The fuel system frame 104 can also include a frame rail connection portion 106 that can couple with a portion of a bracket assembly in a number of different positions. The frame rail connection portion 106 is provided on a vehicle side 100V of the fuel system 100. The frame rail connection portion 106 can have a grid of mount features, which can include a plurality of mounting holes as discussed further below. The plurality of mounting holes enables greater flexibility in placement of the brackets used to connect the fuel system 100 to the frame rail 42. The plurality of mounting holes enables greater flexibility in placement of the fuel system 100 on the frame rail 42. The plurality of mounting holes enables greater flexibility in placement of the fuel system 100 or the brackets along the frame rail 42. The fuel system 100 also includes a cover 105 that in combination with the fuel system frame 104 encloses a space around the fuel tank 102.

FIGS. 2, 3 and 6-8 show details of a first bracket 108 and the connection thereof to the frame rail connection portion 106 at a rearward portion of the fuel system 100. In one embodiment, the frame rail connection portion 106 is able to couple with a first bracket 108 in more than one position. The first bracket 108 can be coupled to a second bracket 112 to mount the fuel system 100 to the frame rail 42 as discussed further below. FIG. 3 shows that in one example, the frame rail connection portion 106 can have an array of holes that allows the first bracket 108 to couple to the frame rail connection portion 106 in a plurality of discrete predefined positions. A first frame rail connection portion 106 can be coupled to a rearward position of the fuel system 100 in the orientation shown in FIG. 3 and a second frame rail connection portion 106 can be coupled to a forward position of the fuel system 100. The second frame rail connection portion 106 toward the forward position can be in an inverted orientation (rotated 180 degrees about an axis into and out of the page). As a result, mounting features 107 (e.g., fastener holes) of the rearward frame rail connection portion 106 can be located toward the rear of the fuel system 100 and the mounting features 107 of the forward frame rail connection portion 106 can be located toward the front of the fuel system 100.

A first position 120 can be provided by a subset of the holes on the frame rail connection portion 106. For example a pair of holes located toward a forward end of the array of holes, one above the other, can in part define the first position 120. The forward pair of holes can be located at a common longitudinal positon of the frame rail connection portion 106. A second pair of holes can in part define the first position 120. The second pair of holes of the first position 120 can be located at a common longitudinal position of the frame rail connection portion 106 spaced apart from the first pair of holes of the first position 120. The first position 120 includes in this embodiment as a set of four holes including a forward most pair of holes on the frame rail connection portion 106. This configuration allows the frame rail connection portion 106 to be coupled with the first bracket 108 at a forward-most position of the frame rail connection portion 106. Although the first position 120 can include four holes, in some embodiments the first position 120 can include more or fewer holes than four holes, can include a different arrangements of holes, and can include positions along one or more slots as described further below. This can allow the first bracket 108 and a second bracket 112 coupled therewith to be located forward relative to a second position 124 defined by a set of holes of the array of holes on the frame rail connection portion 106.

In one embodiment, the second position 124 is defined by a pair of holes disposed toward the rearward end of the frame rail connection portion 106. The pair of holes of the second position 124 disposed toward the rearward end can be disposed at a common longitudinal position of the frame rail connection portion 106. The second position 124 can be further defined by a second pair of holes spaced forward of the first pair of holes of the second position 124. The second pair of holes of the second position 124 can be located forward of, and in the illustrated example immediately adjacent to, the rearward pair of holes of the first position 120. Although the second position 124 include four holes, the second position 124 could include more or fewer holes than four holes, can include different arrangements of holes, and can include positions along one or more slots as described further below.

The frame rail connection portion 106 can define a third position 125 between the first position 120 and the second position 124. The third position 125 can be defined in part by a pair of holes located rearward of, e.g., in one case immediately adjacent to, the forward holes of the first position 120. The third position 125 can be further defined by a second pair of holes located rearward of, e.g., immediately rearward of, the rearward holes of the first position 120. Although the third position 125 include four holes, the third position 125 could include more or fewer holes than four holes, could include different arrangements of holes, and could include positions along one or more slots as described further below. Although three positions are illustrated in the frame rail connection portion 106, in other embodiments there can be more or fewer positions defined by discrete, predefined holes in the frame rail connection portion 106. The positions 120, 124, and 125 can also be forward, rearward and intermediate in a second frame rail connection portion 106 which can be inverted and can be located toward the forward end of the fuel system 100 as discussed above.

The distance between the positions 120, 124, 125 can be any suitable distance. For distance from the forward pair of holes of the first position, 120 to the forward pair of holes of the second position 124 can be 100 mm in one embodiment. The distance from the second position 124 to the third position 125, e.g., from the forward pair of holes of the first position 124 to the forward pair of holes of the second position 125 can be 50 mm in one embodiment. These distances can be uniform or can vary from one position to the next. For example, the distance from the forward pair of holes of the first position 120 to the forward pair of holes of the second position 124 can be any of 200 mm, 150 mm, 100 mm, 50 mm, 25 mm or more or less. The distance from the second position 124 to the third position 125, e.g., from the forward pair of holes of the first position 124 to the forward pair of holes of the second position 125 can be any of approximately 160 mm, 155 mm, 152 mm, 143 mm, 126 mm, 100 mm, 75 mm, 70 mm, 61 mm, 50 mm, 32 mm, 25 mm, or 12 mm. The distance from the second position 124 to the third position 125 can be three-quarters, two-thirds, one-half, one-third or one-quarter of the distance from the first position 120 to the second position 124.

FIG. 3 can further illustrate the positioning of a bracket assembly relative to the frame rail connection portion 106. A first bracket 108 can include a portion illustrated in FIG. 3 that is configured to be coupled with the frame rail connection portion 106. The portion of the first bracket 108 can include a central flange 164. The central flange 164 can project away from a bracket mounting base 166 that can include a plurality of mounting holes 109. The mounting holes 109 can be arranged to match the holes corresponding to one or more position of the frame rail connection portion 106. For example, the mounting holes 109 can be arranged in an array that includes a pair of mounting holes 109 on a first side of the central flange 164 and a pair of mounting holes 109 on a second side of the central flange 164 opposite the first side. Thus, the mounting holes 109 can be aligned over the holes of the first position 120 and fasteners can be used to secure the bracket mounting base 166 to the frame rail connection portion 106.

Advantageously, the groups of holes forming the first position 120, the second position 124, and the third position 125 can all be arranged at the same spacing as the mounting holes 109 such that the bracket mounting base 166 can be aligned with the holes of any of these positions.

As noted above, the fuel system frame 104 can include the frame rail connection portion 106 located toward a rearward portion of the fuel system 100. The fuel system frame 104 can also include a second frame rail connection portion 106 located toward a forward portion thereof. A structural member 256 can couple the two frame rail connection portion 106 together or they can be formed on a single unitary frame member. The forward frame rail connection portion 106 can have the same or a similar configuration as the rearward frame rail connection portion 106, e.g., with an array of holes defining a plurality of discrete spaced apart positions. The forward frame rail connection portion 106 can be coupled with bracket mounting base 166 of a third bracket 140, the third bracket 140 configured to couple with a fourth bracket 152 to form a second bracket assembly to couple the fuel system 100 to the frame rail 42.

The holes in the frame rail connection portions 106 (forward and rearward) enable several types of mounting configurations. For example, in one case, the longitudinal position of the fuel system 100 along the frame rail 42 can be determined. For example, the desired gap 47 can be provided between a forward portion of the fuel system 100 and an adjacent component, such as the fender 46. In another example, the vehicle side 100V of the fuel system 100 can be disposed at least partially over a low profile component, such as the shackle 50. Potential interference at the forward end of the fuel system 100 with other components on the frame rail 42 can be determined. In one example, securing the third bracket 140 to the frame rail connection portion 106 in the first position 120 would result in interference with another such component. The third bracket 140 can be moved to the second position 124 or the third position 125 of the forward frame rail connection portion 106. This allows the fourth bracket 152 to move to a frame rail position corresponding to the second position 124 or the third position 125 out of interfering position with such other component.

FIG. 2 shows the third bracket 140 in the second position 124 of the forward frame rail connection portion 106. FIG. 3 shows that in the case of the rearward frame rail connection portion 106 the first position 120 is a forward position, the second position 124 is a rearward position, and the third position 125 is an intermediate position between the forward and rearward positions. In in the case of the forward frame rail connection portion 106, the second position 124 is also the rearmost position of the forward frame rail connection portion 106. For the forward frame rail connection portion 106 the second position 124 is the position farthest from the mounting features 107. The position of the first bracket 108 on the rearward frame rail connection portion 106 can also be selected to avoid interference with other components on the frame rail 42. In the illustrated embodiment, the bracket mounting base 166 of the first bracket 108 can be secured to the fuel system 100 at the first position 120, forward of the other positions 124, 125. This enables the rearward bracket assembly including the first bracket 108 and the second bracket 112 to move forward out of a potentially interfering position with other component on the frame rail 42. One can see from the foregoing description that a number of permutation is possible. In the illustrated embodiment, there are nine permutations that are possible for positioning the first bracket 108 and the third bracket 140. These positions can result in corresponding shifting of the second bracket 112 and the fourth bracket 152 as needed to provide convenient connection, e.g., out of interference with other components connected to the frame rail 42.

Figure 3A:
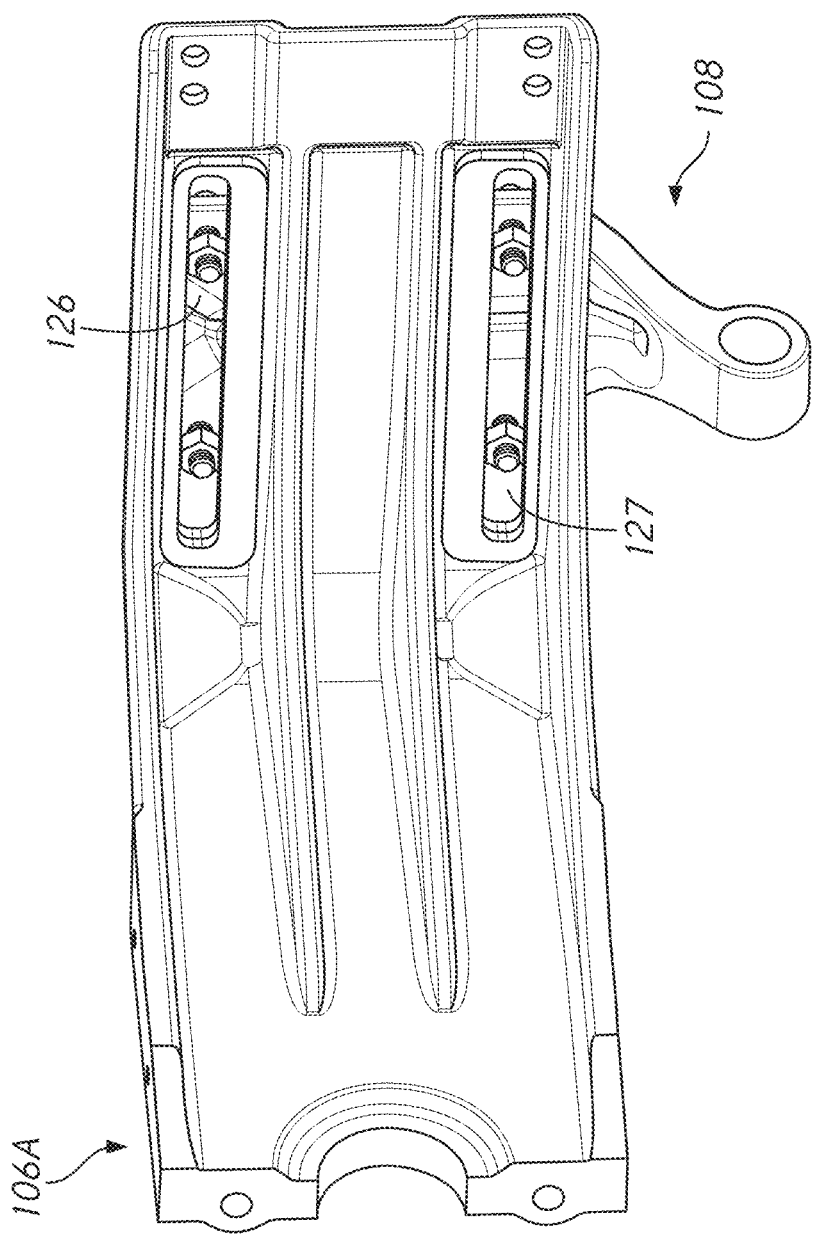
FIGS. 3A-3B show a tank-side and frame rails side views, respectively, of a bracket assembly including a bracket portion and a fuel system support assembly portion having a continuous range of connection positions.
Figure 3B:
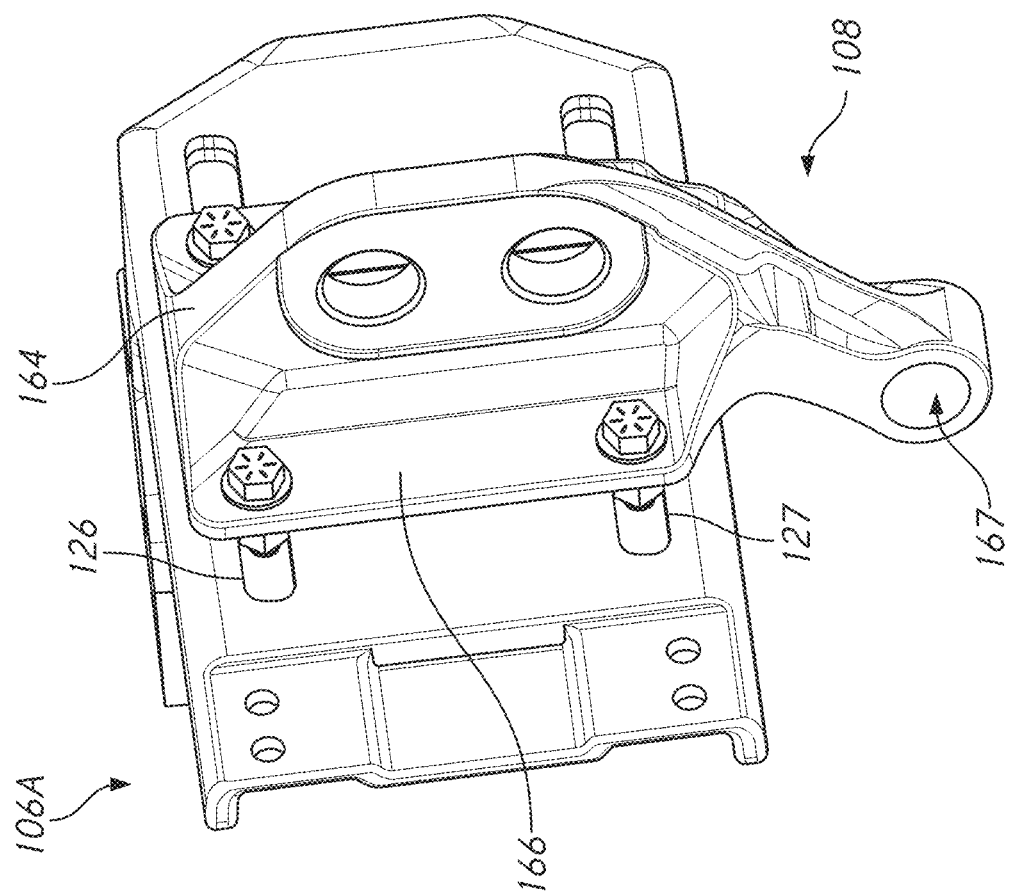

FIGS. 3A and 3B illustrate another embodiment of a frame rail connection portion 106A that can be integrated into the fuel system frame 104. The frame rail connection portion 106A can facilitate adjustment along a continuous range of positions that are not predefined within the range. The frame rail connection portion 106A enables connection of the bracket mounting base 166 of the first bracket 108 or of the third bracket 140 to the rearward frame rail connection portion 106A and to the frame rail connection portion 106A. In one embodiment, the frame rail connection portion 106A includes a first slot 126 and a second slot 127. The first slot 126 can be located generally above the second slot 127, e.g., extending parallel to the second slot 127. Fasteners disposed through the mounting holes 109 of the bracket mounting base 166 of the first bracket 108 can be located at any position along the first slot 126 and second slot 127.

The position of the first bracket 108 can be defined by initially loosely coupling the first bracket 108 to the frame rail connection portion 106A at the first slot 126 and/or the second slot 127, e.g., by bolts or other fasteners. The position of the first bracket 108 can be refined by sliding the first bracket 108 along the frame rail connection portion 106A to reach a user-defined position that is beneficial, e.g., that avoids interference as needed. This allows positioning of a bracket assembly including the first bracket 108 to be selected during mounting to the vehicle 40 at any such position. In a fuel system frame 104 that includes forward and rearward frame rail connection portion 106A, the third bracket 140 also can be coupled and positioned in this manner, allowing the end user to select the positions along the first slot 126 and second slot 127 during mounting of the fuel system 100 to the vehicle 40.

B. Bracket Assemblies Providing Fastenerless Secure Connections

FIGS. 4-10 illustrate bracket assemblies that provide convenient connection during fuel system-to-vehicle assembly. These bracket assemblies provide secure connections without requiring the bracket interface to be further secured by bolts or other similar fasteners. Such fasteners can be provided prior to final shipment.

Figure 4:
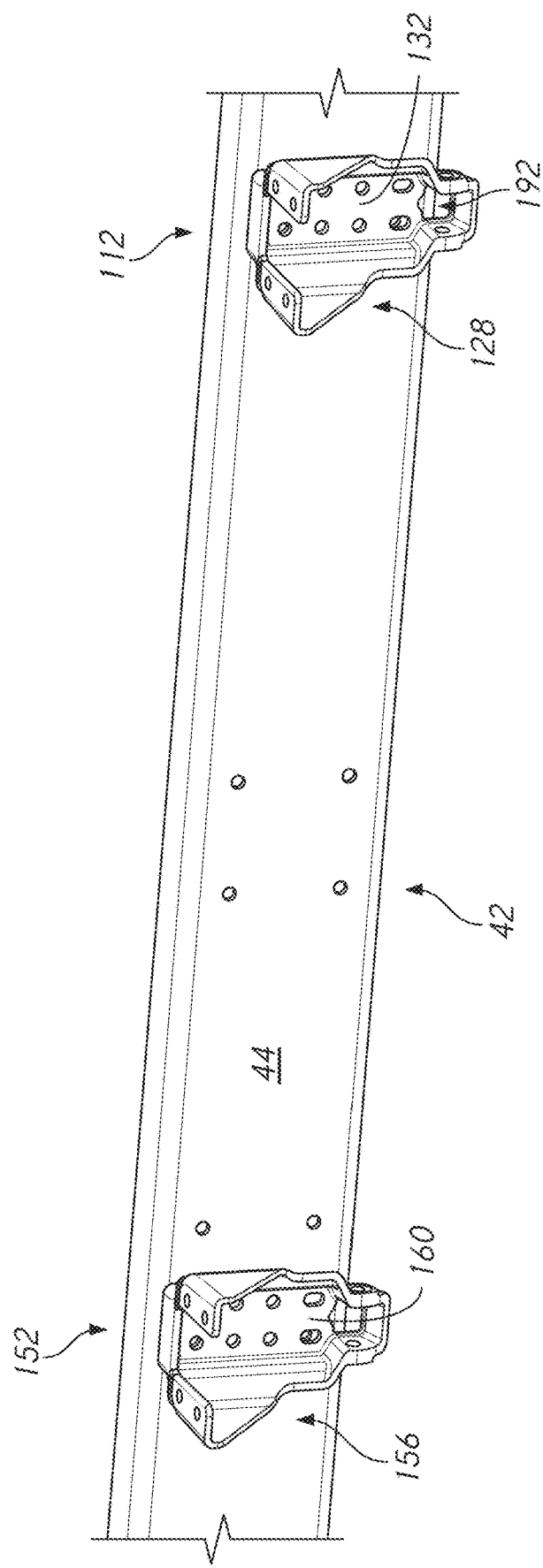
FIG. 4 is a perspective view of a frame rail and bracket assembly for mounting a fuel system according to one embodiment.

FIG. 4 shows that in one assembly a plurality of, e.g., two vehicle-side bracket assembly portions can be coupled to the frame rail 42. The second bracket 112 can be secured to the side 44 of the frame rail 42 forward of the fourth bracket 152. The second bracket 112 can form a portion of a rearward bracket assembly with the first bracket 108. The fourth bracket 152 can form a portion of a forward bracket assembly with the third bracket 140. The brackets 112, 152 have similar construction so the description of each one applies to the other. The second bracket 112 includes a first portion 128 and a second portion 132. The second portion 132 facilitates connection to the side 44 of the frame rail 42. For example, the second portion 132 can have an array of mounting holes that can receives fasteners to be secured across the frame rail 42. The first portion 128 can be a continuous member with, the second portion 132 or can be part of an assembly therewith. The first portion 128 can allow the first bracket 108 to be lowered onto the second bracket 112. The first portion 128 can support the first bracket 108 so that the fuel system 100 coupled therewith is retained on the frame rail 42. A flange member can be provided on the first bracket 108 can come to rest on top of the second portion 132 of the second bracket 112. A portion of the first bracket 108 can come to rest against a lower surface of the second portion 132 of the second bracket 112. The fourth bracket 152 can have a first portion 156 similar to the first portion 128 and a second portion 160 similar to the second portion 132.

Figure 5:
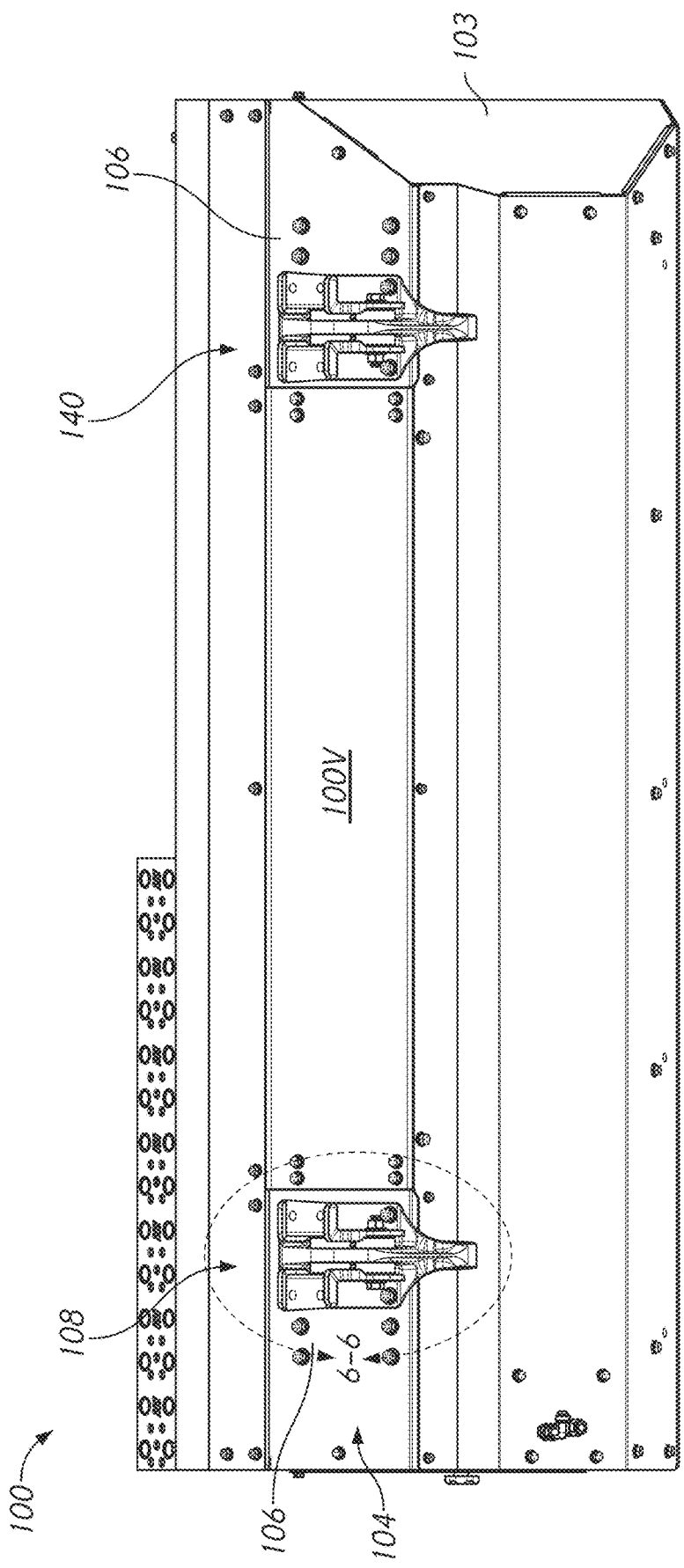
FIG. 5 is a vehicle side view of a fuel system and bracket assembly according to one embodiment.
Figure 6:
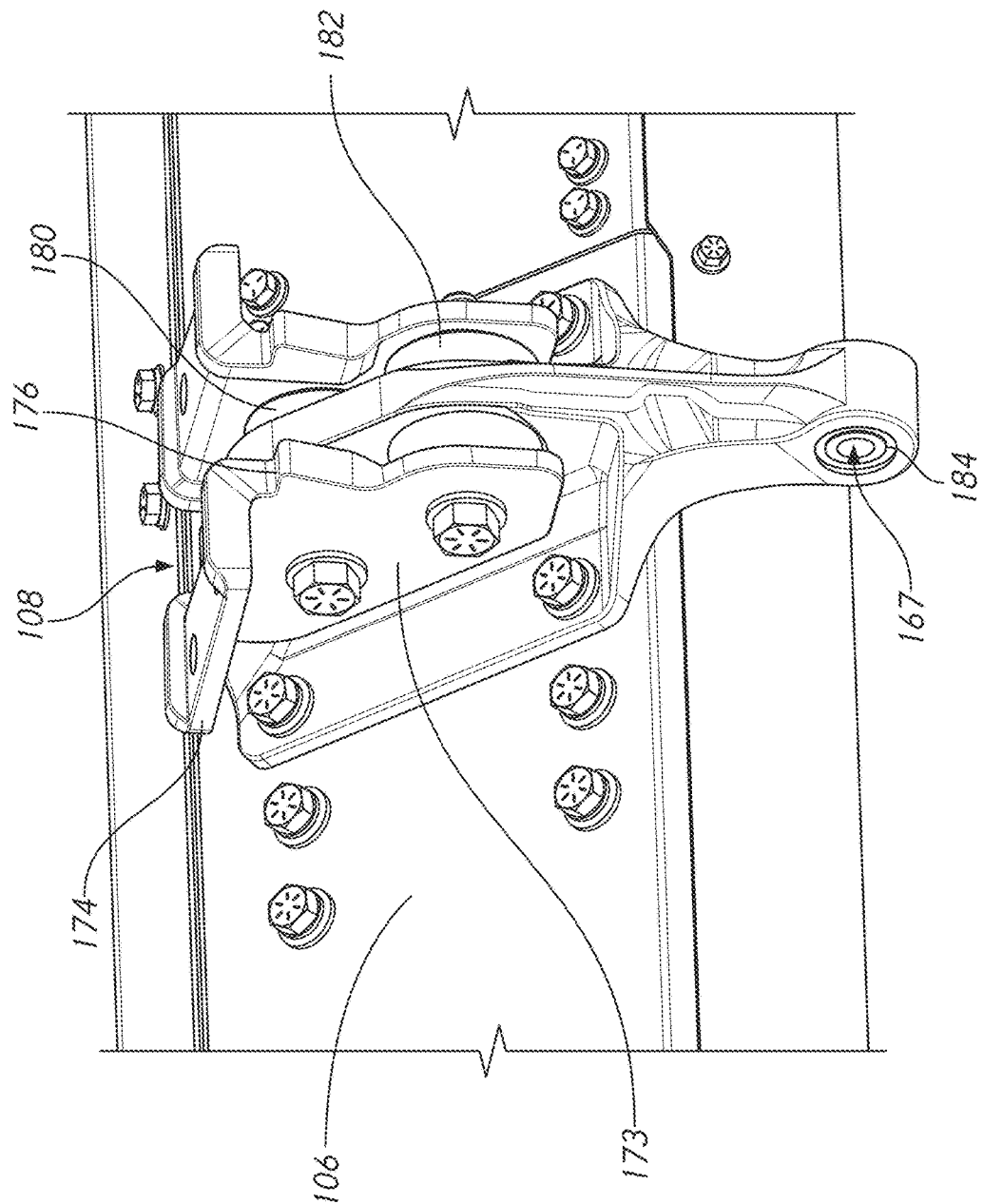
FIG. 6 shows detail 6-6 of the fuel system and bracket assembly of FIG. 5.

FIGS. 5-6 show details of the first bracket 108. The first bracket 108 can be located rearward of the third bracket 140 on the vehicle side 100V of the fuel system 100. The position of each of the brackets 108, 140 can be selected by the user, e.g., based on the desire to avoid interference with other components, as discussed above. In the illustrated embodiment, the first bracket 108 is in the first position 120 of the rearward frame rail connection portion 106 and the third bracket 140 is in the second position 124 of the forward frame rail connection portion 106. The third bracket 140 can have the same construction as the first bracket 108.

FIG. 6 shows the structure of the first bracket 108 in more detail. The first bracket 108 includes a body including the central flange 164 and the bracket mounting base 166. The bracket mounting base 166 can include a generally planar side configured to be secured against the frame rail connection portion 106. The central flange 164 can extend away from a side of the bracket mounting base 166 opposite the side configured to mate with the frame rail connection portion 106. The central flange 164 can have opposite sides that face forward and rearward when the first bracket 108 is mounted to the frame rail connection portion 106 and to the frame rail 42. The first bracket 108 can include a mounting portion for coupling the first bracket 108 to the second bracket 112. The mounting portion can include a bracket aperture 167 disposed along an axis extending between the opposing sides of the central flange 164. The bracket aperture 167 provides a point of connection between the first bracket 108 and the second bracket 112 as discussed further below.

The first bracket 108 includes first and second support wings 168, 172. The support wings can have similar, e.g., mirror image, configurations. The first support wing 168 can include a mount portion 173 and a vertical support 174. The mount portion 173 and vertical support 174 form a flange configuration for resting on top of the second portion 132 of the second bracket 112. The mount portion 173 is configured to extend along a forward side of the central flange 164.

The mount portion 173 can be secured adjacent to the central flange 164 through one or more resilient members, e.g., vibration dampers. The vertical support 174 can extend rearward from an upper portion, e.g., the top of, the mount portion 173. The vertical support 174 can be configured to rest on top of a portion of the second bracket 112 in a predefined position when the first bracket 108 and the second bracket 112 are connected. The position can be defined at least in part by a transverse motion limit structure. In one embodiment, at least the vertical support 174 includes a configuration to resist bending. For example, the cross-section of the vertical support 174 can have a one or more flanges that extend away from the loading surface, where forces are applied between the vertical support 174 and the second bracket 112. The flanges act in a manner similar to an I-beam to enhance the stiffness of the first support wing 168. The flanges can be seen as areas of greater height at the vehicle facing side and at the fuel system facing side of the first support wing 168.

The first support wing 168 also can include a rotational support 176. The rotational support 176 can include a projection configured to rest against a lower portion, e.g., surface, of the second bracket 112. The rotational support 176 can help to enable the fuel system 100 to be supported on the frame rail 42 with the force of gravity being countered at least in part through the rotational support 176. The weight is further supported through the first support wing 168 and the second support wing 172. A clearance is provided between a top surface of the rotational support 176 and a bottom surface of the vertical support 174 to receive the first portion 128 of the second bracket 112. This is described in greater detail below in connection with FIGS. 7-10.

The connection between the first support wing 168 and the second support wing 172 and the central flange 164 can be through a resilient member, such as a damper or a vibration isolator. FIG. 6 shows that a first resilient member 180 provided between the first support wing 168 and the central flange 164. The first resilient member 180 can be configured as a stepped cylinder having a smaller diameter section on a central portion of the outside surface there. The first resilient member 180 can have larger diameter section on ends thereof on both sides of the central portion. The larger diameter section of one end of the first resilient member 180 can be disposed between opposing surfaces of the first support wing 168 and the central flange 164. The larger diameter section of another end of the first resilient member 180 can be disposed between opposing surfaces of the second support wing 172 and the central flange 164. As shown, bolts can be disposed through the first resilient member 180 and the second resilient member 182 to secure the first support wing 168 to the central flange 164. The first resilient member 180 and the second resilient member 182 are resilient, e.g., compressible, such that loads applied during operation of the vehicle 40 from the road are not directly transferred to the fuel system 100 but rather are absorbed to some extent and modulated in the first resilient member 180 and the second resilient member 182. In one variation, the first resilient member 180 and the second resilient member 182 can be combined providing a single member with multiple aperture for securing the wings to the central flange 164.

A third resilient member 184 provided in the bracket aperture 167 modulates similar loads that could be applied through the point of connection at the bracket aperture 167 between the first bracket 108 and the second bracket 112. In one modified embodiment, connection at the bracket aperture 167 can be provided without any vibration isolation or damping, e.g. by directly bolting the first bracket 108 to the second bracket 112 at this location. In a further modified embodiment, the first resilient member 180 and the second resilient member 182 can be eliminated. The connection points between the first and/or second support wing 168, 172 can be rigid e.g., direct connection without intervening resilient members.

Figure 9:
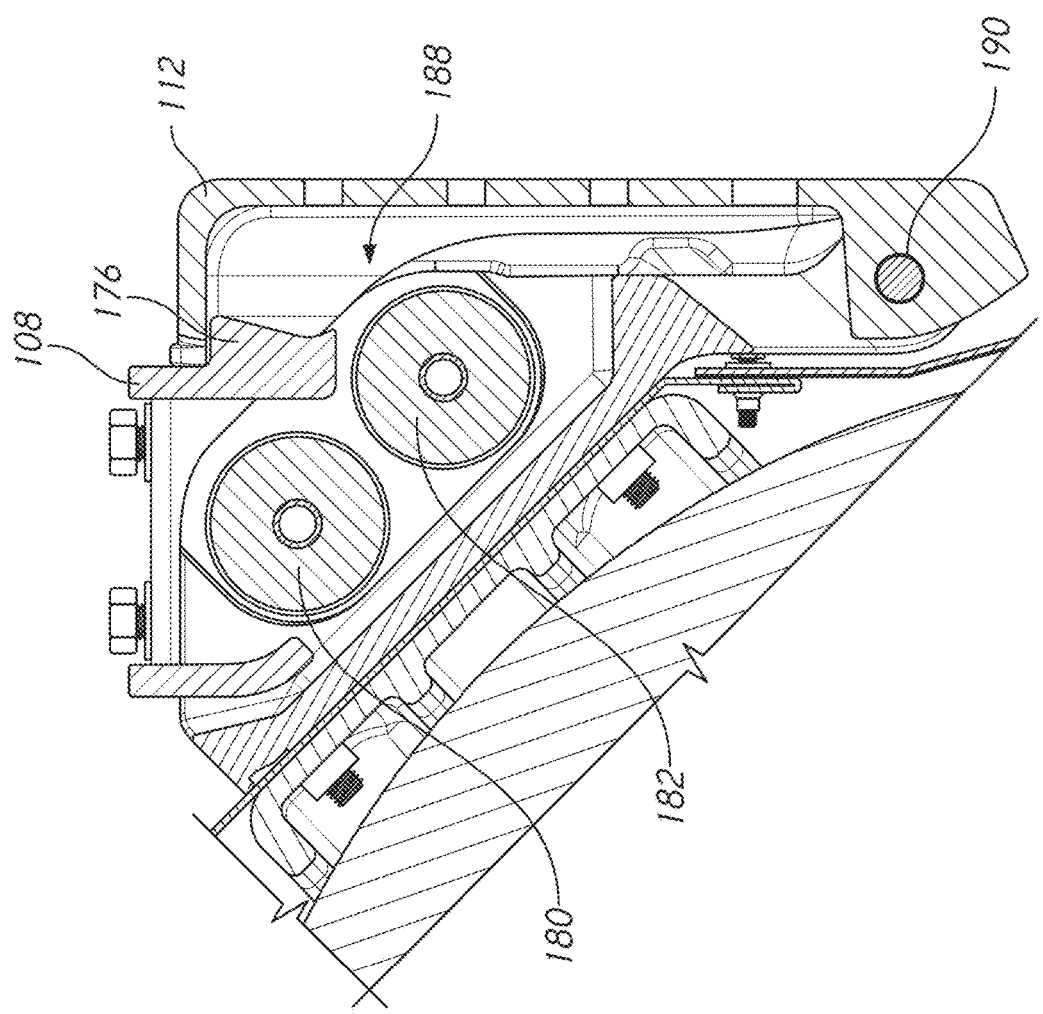
FIG. 9 is a cross-section of the bracket assembly of FIG. 2 taken at the section plane 9-9 showing an elevation support of a fuel system bracket.
Figure 10:
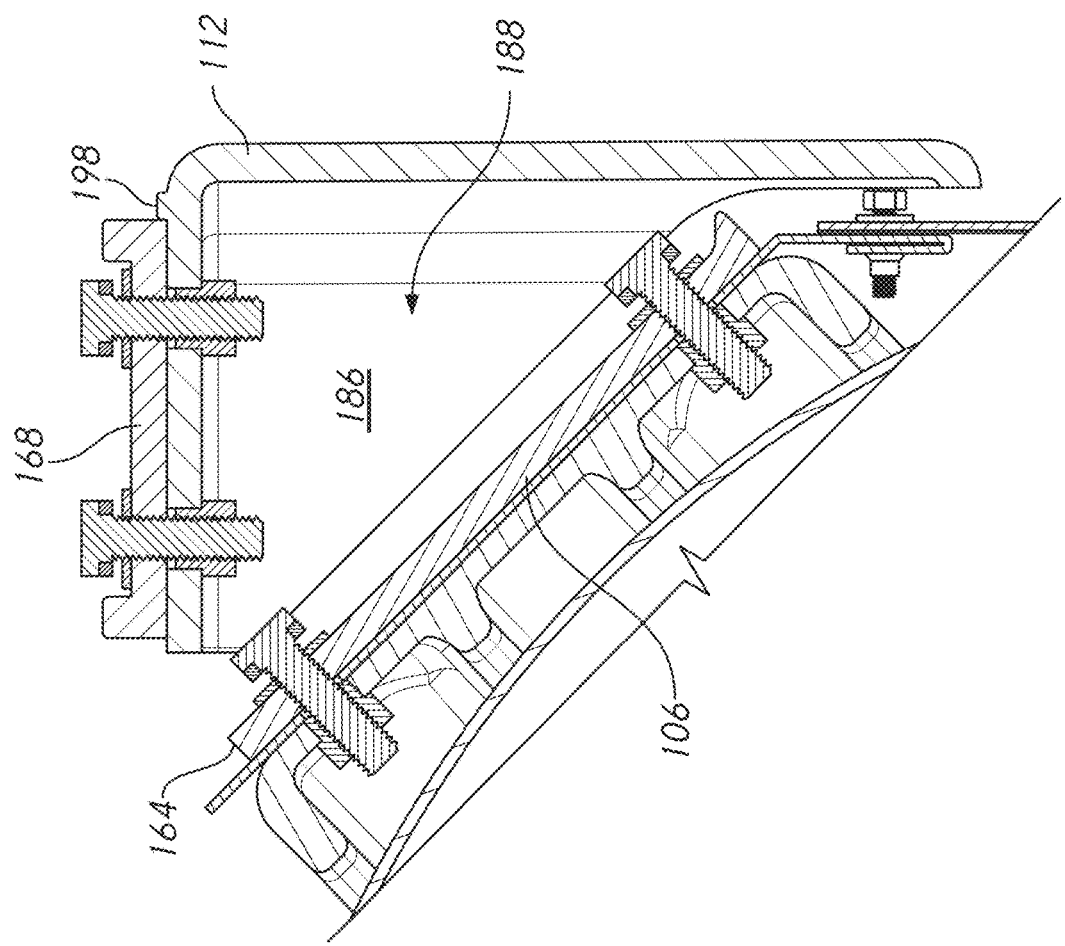
FIG. 10 is a cross-section of the bracket assembly of FIG. 2 taken at the section plane 10-10 showing a transverse motion limit portion of a frame rail bracket.

FIGS. 4, 9 and 10 illustrate aspects of the second bracket 112. In one embodiment, the second bracket 112 and the fourth bracket 152 have the same construction. So, description of either the second bracket 112 or of the fourth bracket 152 applies to the other these two brackets. The second bracket 112 includes a first portion 128 and a second portion 132, as discussed above. The first portion 128 can include a generally planar structure at least on a side configured to face the side 44 of the frame rail 42. The first portion 128 can have one or a plurality of apertures for securing the second bracket 112 to the frame rail 42 using fasteners. The second bracket 112 can have a vertical support 186 on each of a forward and a rearward side of an internal space 188 disposed on a lateral side of the second bracket 112. The internal space 188 can be disposed on a side opposite the side of the second bracket 112 that faces the side 44 of the frame rail 42 when the second bracket 112 is coupled thereto.

The vertical supports 186 can be formed flanges of the second bracket 112 located forward and rearward of the internal space 188. The internal space 188 can be configured, e.g., sized and shaped, to receive the central flange 164 and the mount portion 173 of the first bracket 108. The vertical supports 186 can be configured to reside immediately below and in contact with the first support wing 168 and the second support wing 172 when the first bracket 108 is mated with the second bracket 112. The vertical support 186 can have a geometry to enhance stiffness, e.g., with a support flange disposed beneath the vertical support 186 in contact with the second portion 132.

The second bracket 112 can include a transverse motion limiter 196 configured to control the position of the first bracket 108 relative to the second bracket 112 when these brackets are assembled together. The transverse motion limiter 196 can include one or more, e.g., two, ridges 198 disposed along a top surface of the vertical support 186. The ridges 198 can have a height of about 0.1 inch. In some embodiments, the ridges 198 have a height of 0.2 inch, 0.3 inch, 0.4 inch, 0.5 inch, 0.6 inch, 0.7 inch, or more than 0.7 inches. The ridges 198 can have a height that is 5% of the thickness of the first support wing 168 or the second support wing 172 in a vertical direction, e.g., of the transverse stiffening structure of the support wing. The ridges 198 can have a height that is 10% of the thickness of the first support wing 168 or the second support wing 172 in a vertical direction. The ridges 198 can have a height that is 25% of the thickness of the first support wing 168 or the second support wing 172 in a vertical direction.

The support wings 168, 172 and the vertical supports 186 can allow the fuel system 100 to be mounted to the frame rail 42 during assembly without any additional fasteners. The support wings 168, 172 and the vertical supports 186 can have apertures for allowing bolts to more permanently connect the second bracket 112 to the first bracket 108, as discussed further below. The second bracket 112 also can include a bracket aperture 190 configured to be aligned with the bracket aperture 167 when the brackets are assembled. The alignment of the bracket aperture 190 on the second bracket 112 and the bracket aperture 167 on the first bracket 108 can be facilitated by a clearance gap 192 formed through the second bracket 112. The clearance gap 192 can allow a portion of the body of the first bracket 108 disposed about the bracket aperture 167 to overlap with the first portion 128 of the second bracket 112.

Figure 7:
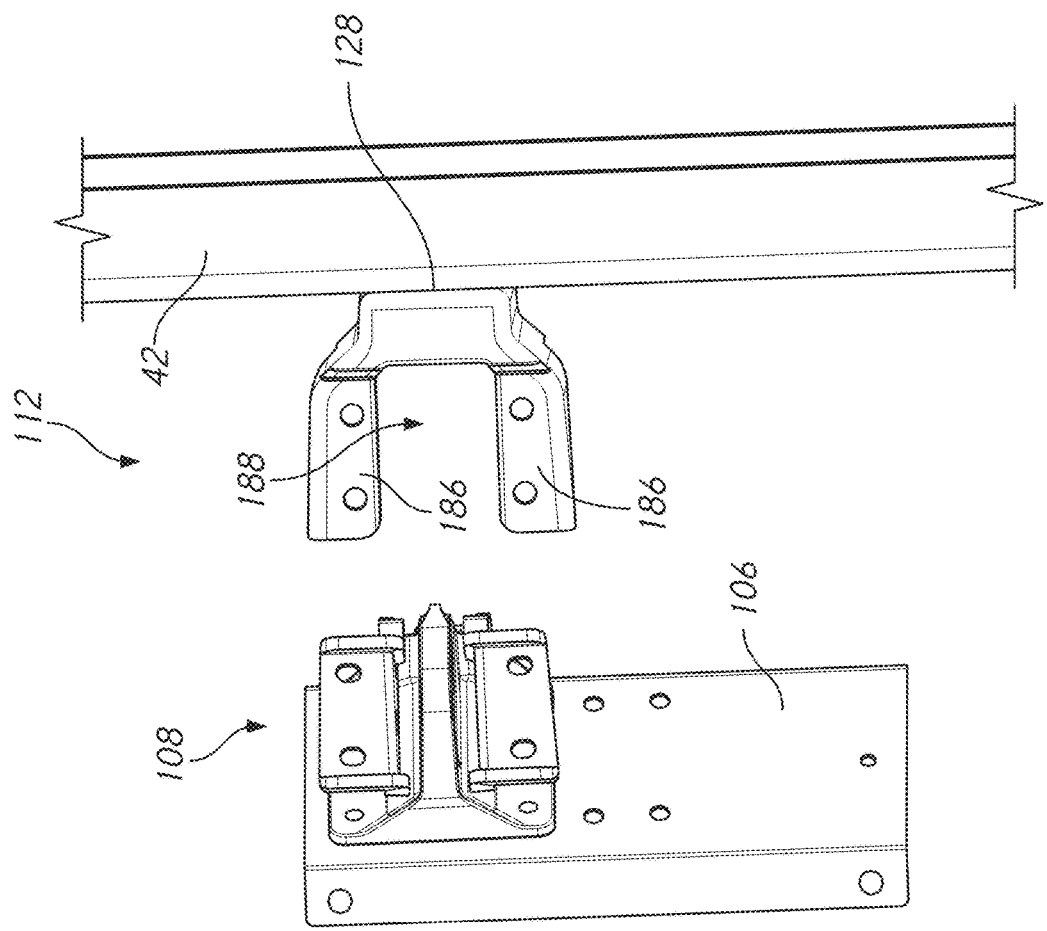
FIG. 7-8 are top and perspective views of a bracket assembly according to one embodiment.
Figure 8:
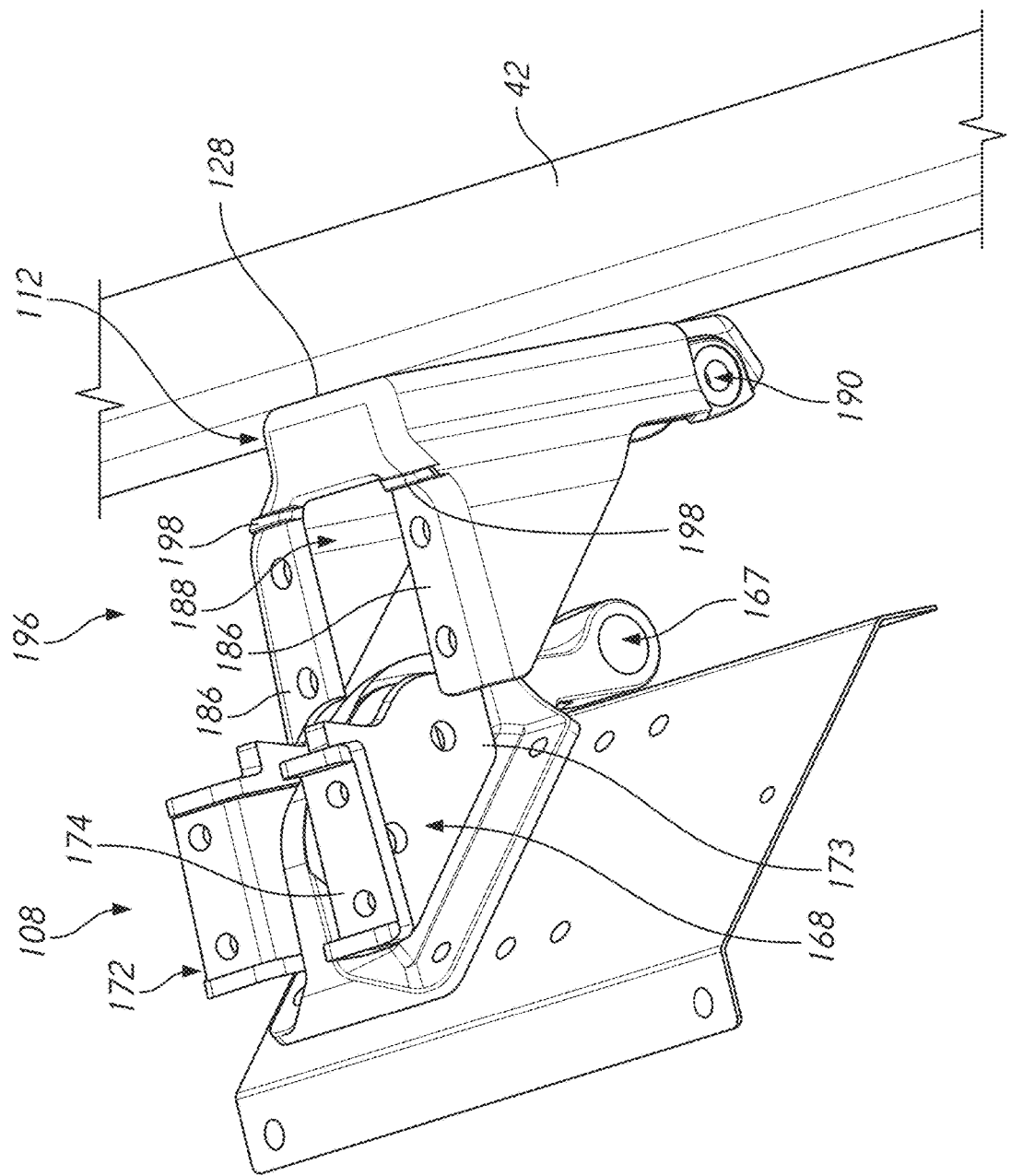

FIGS. 7-10 illustrate methods of assembling the fuel system 100 to the frame rail 42. FIG. 7 shows that the fuel system 100 with the first bracket 108 attached thereto at the frame rail connection portion 106 can be placed adjacent to the second bracket 112, which is coupled to the side 44 of the frame rail 42. The first bracket 108 and be placed at or slightly above the elevation of the second bracket 112. FIG. 8 shows that the first bracket 108 can be moved into the internal space 188. For example, the portion of the central flange 164 away from the vehicle side 100V can be moved into the internal space 188. The mount portion 173 of the first support wing 168 can be moved into the internal space 188. The first bracket 108 and the fuel system 100 coupled thereto can be moved down relative to the second bracket 112 from the position shown in FIG. 8 until a bottom side of the first support wing 168 (and of the wing 172) is disposed above, on top of or in contact with the vertical support 186. Specifically the vertical support 174 of the first support wing 168 of the first bracket 108 can be placed on top of the vertical support 186 of the second bracket 112. A vertical support of the wing 172 of the first bracket 108 can be placed on top of the vertical support 186 of the second bracket 112. FIG. 9 shows that when so placed, the rotational support 176 of the first bracket 108 can come into contact with a lower surface of the second bracket 112. The lower surface can be disposed on a transverse portion of the second bracket 112 disposed between the vertical support 186 and facing or partly bounding the internal space 188. The rotational support 176 can limit rotation of the fuel system 100 relative to the frame rail 42, which rotation can be a function of the outboard weight of the fuel system 100.

FIG. 10 shows that the transverse position of the fuel system 100 relative to the frame rail 42 can be at least partially controlled by the transverse motion limiter 196, e.g., by ridges 198 located on top of the vertical support 186. The ridges 198 can be configured, e.g., sized and positioned to abut an in-board face of the first bracket 108, e.g., of an inboard portion of one or both of the support wings 168, 172. Said another way, as the fuel system 100 and the first bracket 108 move toward the frame rail 42 the in-board side of one or both of the wings 168, 172 will abut the ridges 198 and such abutment can be detected by the assemble device or personnel positioning the fuel system 100. This will confirm that the first bracket 108 and the second bracket 112 are at least temporarily connected. This position will also bring the bracket aperture 167 in line with the bracket aperture 190, as discussed above.

These configurations allow the fuel system 100 to be at least temporarily secured to the frame rail 42 without any additional connecting devices, e.g., without any bolts passing through both of the brackets 108, 112. FIGS. 9 and 10 shows that subsequently, e.g., before sending the vehicle 40 out on the road at the end of assembly, bolts can be passed through both brackets 108, 112 to provide a more secure connection.

The manner of assembling the third bracket 140 to the fourth bracket 152 can be the same as that discussed above in connection with the first bracket 108 and second bracket 112. Additionally, the bracket assembly methods can include selecting a position from a discrete number of positions or along a continuous range, for connection of the first bracket 108 to the frame rail connection portion 106. The position selected can be based on the presence of other components on the frame rail 42, e.g., of a frame cross-member. The position of the first bracket 108 can follow a preferred location of the second bracket 112 to avoid interference with such components. The position of the first bracket 108 can follow a preferred location of the second bracket 112 to share a mount location with another member. The position of the second bracket 112 can follow a preferred location of the first bracket 108.

II. Neck Mounted Fuel Tank Assemblies for Side Mounted Fuel Systems

The fuel system 100 provides a number of advantages, some of which relate to the manner in which the fuel tank 102 thereof is supported within the cover 105. The fuel tank 102 is supported in novel ways, e.g. at ends thereof and with arcuate supports that provide advantages positioning relative to the frame rail 42. In some embodiments, the fuel system frame 104 is configured with low profile mounting configurations, to maintain mounting locations between ends of the cover 105 of the fuel system 100 to provide low profile mounting configurations. In some embodiments, the fuel system frame 104 has extended mounting location configurations to position the mounting locations outside the area opposite the fuel tank 102 to leave the frame rail 42 free from connections opposite the fuel tank 102.

A. Low Profile Mounting Configurations

Figure 11:
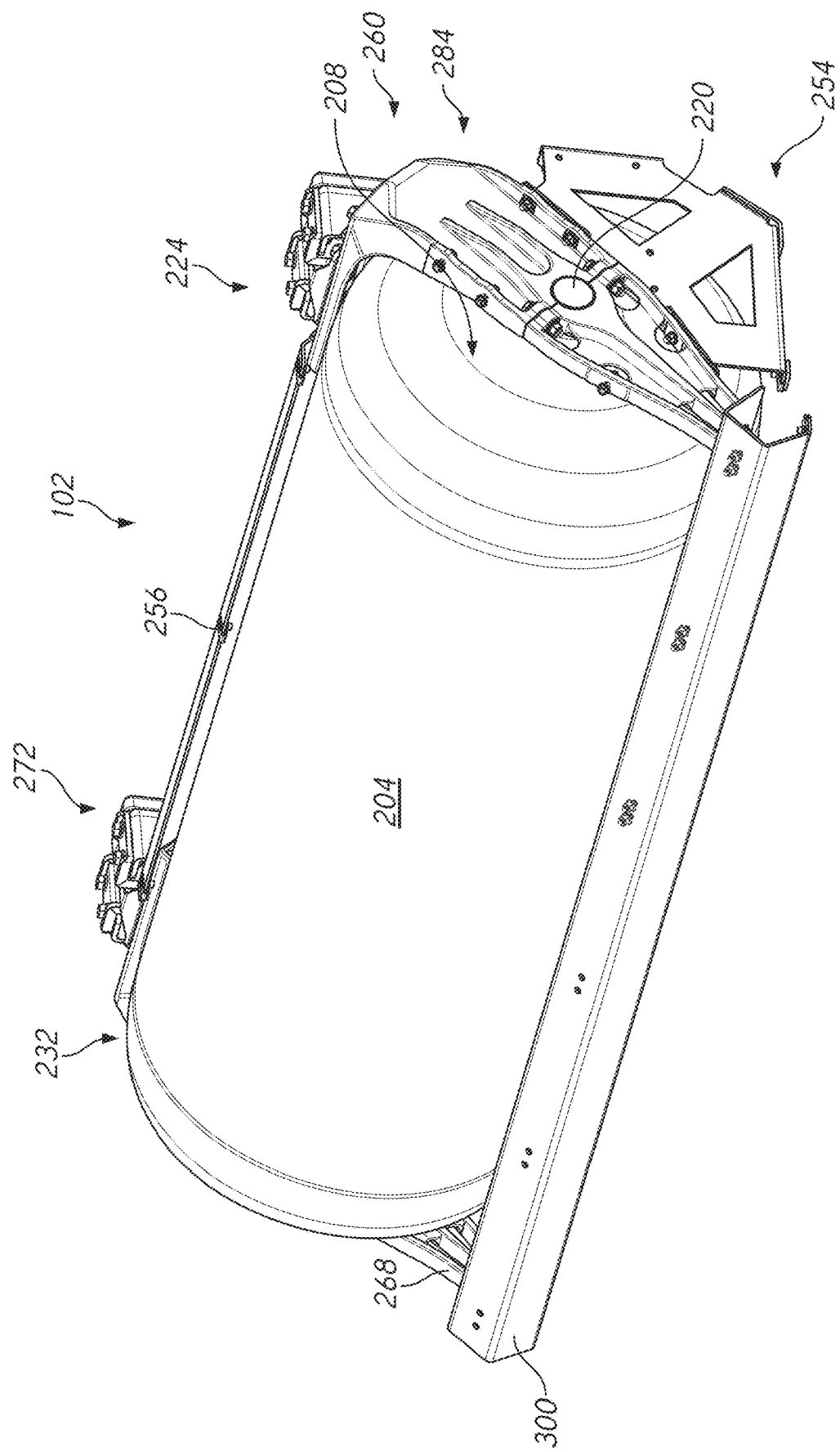
FIG. 11 is a perspective view of the fuel system of FIG. 2 with the cover thereof removed showing neck support of the fuel tank.

FIG. 11 shows the fuel system 100 with the cover 105 removed. The fuel tank 102 has a central cylindrical portion 204, a first neck portion 208, and a second neck portion 212. The first neck portion 208 includes a first boss 220 located at the end of the fuel tank 102. The first boss 220 is a sealed portion of the fuel tank 102 that can have fuel conduit coupled therewith to enable filling fuel into and drawing fuel from the fuel tank 102. The first boss 220 is also sufficiently rigid to enable the fuel tank 102 to be supported at that location as discussed further below. The fuel tank 102 can have a second boss 228 disposed at a second end 232 of the fuel tank 102. The fuel tank 102 also can include a polymeric liner at least in the central cylindrical portion 204 thereof. The liner can be secured to a first dome assembly including the first boss 220 and to a second dome assembly including the second boss 228.

In some embodiments the fuel tank 102 is supported only at the first neck portion 208 and the second neck portion 212. In such embodiments, no straps are provided in the central cylindrical portion 204 nor is the fuel tank 102 supported in any other manner between the first end 224 and the second end 232. In other embodiments, one or more supporting straps also can be provided between the first end 224 and the second end 232 to support the fuel tank 102.

Figure 12:
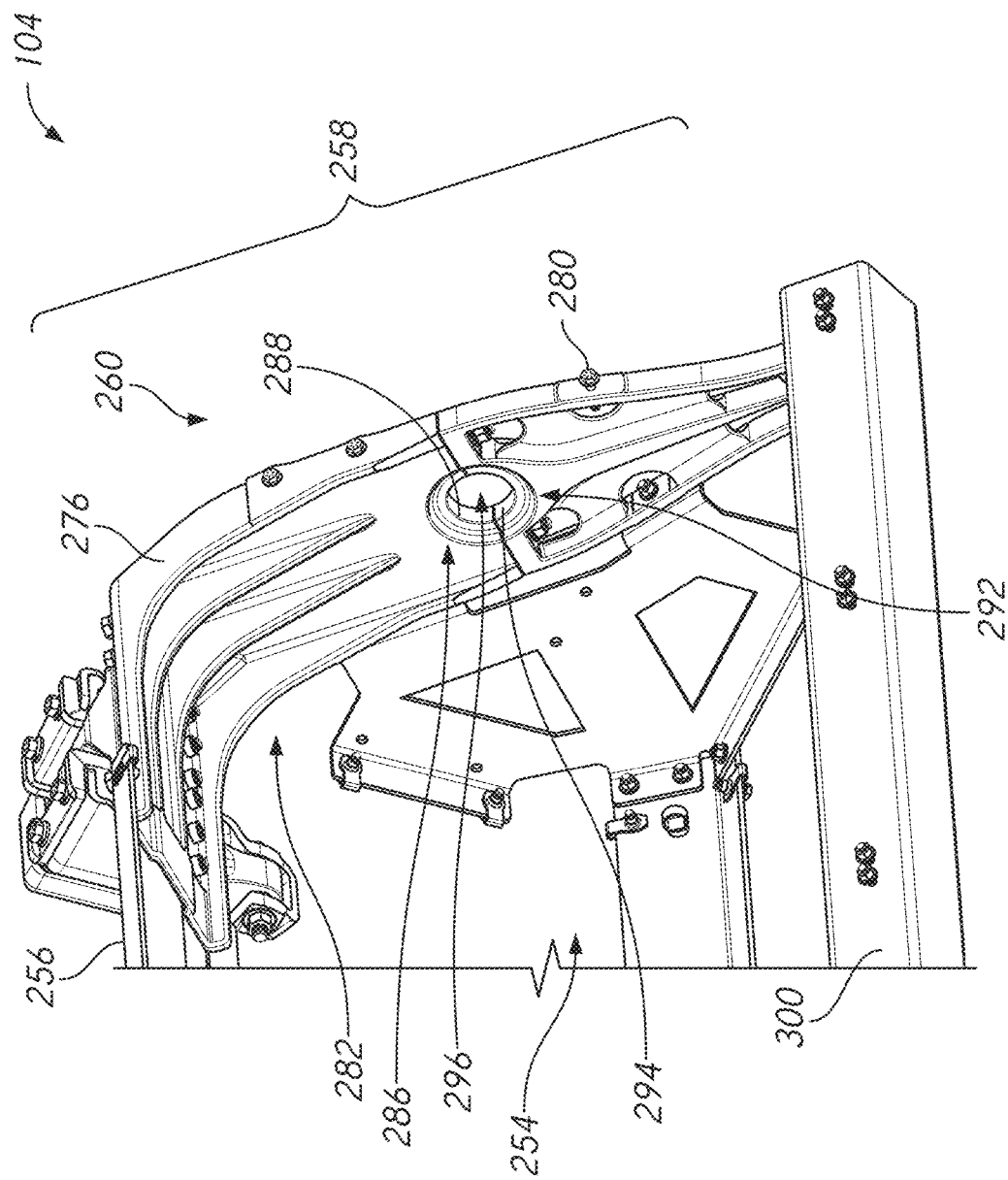
FIG. 12 is a perspective view of a frame assembly of the fuel system of FIG. 2 with the cover and the fuel tank removed.

FIGS. 11 and 12 show that the fuel system frame 104 that includes the frame rail connection portions 106 (forward and rearward) can also include tank end support portion 258 that are secured to the first end 224 and the second end 232 of the fuel tank 102. The tank support portions 258 extend across a diameter of and around forward and rearward ends of the fuel tank 102. The tank support portions 258 on forward and rearward ends are connected by a structural member 256 to provide a concave frame structure into which the fuel tank 102 is received. The fuel system frame 104 can further include a collision load member 300 on a lateral side to absorb at least some of the load of an impact. The fuel system frame 104 can also include a lower frame assembly 254 for supporting the cover 105 and/or for enhancing the strength of the fuel system frame 104. The lower frame assembly 254 can be disposed around and under a portion of the fuel tank 102 circumferentially between the positions of the tank support portions 258. FIG. 11 shows that the fuel system frame 104 including the tank support portions 258, the lower frame assembly 254 and the collision load member 300 can form an enclosure disposed about half of the circumference of the fuel tank 102 such that the fuel tank 102 can be placed within the frame from the other half circumference. In one assembly technique, the second tank support portion 268 is separated from the first tank support portion 260 of the tank support portion 258. The first tank support portion 260 and the second tank support portion 268 can be separated on both ends of the frame assembly. The first boss 220 and the second boss 228 can be placed into the concave ends of the first tank support portion 260. Thereafter, the second tank support portion 268 can be secured to the first tank support portion 260 to form the tank support portion 258 around the first boss 220 and the second boss 228. Fasteners, such as bolts can then be advanced through apertures in the first tank support portion 260 and the second tank support portion 268 provide a rigid connection in the tank support portion 258. In some embodiments, the lower frame assembly 254 is assembled to the tank support portion 258 on each end of the frame assembly after the second tank support portion 268 is secured to the first tank support portion 260.

FIG. 12 shows more detail of the structure of the tank support portion 258. The tank support portion 258 includes a first tank support portion 260 and a second tank support portion 268. The first tank support portion 260 can be disposed on a rearward side of the fuel system 100. The second tank support portion 268 can be located on the forward side of the fuel system 100. The first and second tank support portions 260, 268 can be similar, e.g., mirror images of each other. The first tank support portion 260 will be discussed in detail. The description of the first tank support portion 260 and the second tank support portion 268 can be applied to each other.

The first tank support portion 260 can include a first tank bracket 276 and a second tank bracket 280. The first tank bracket 276 can include a first ribbed side 282 and a second ribbed side 284. The first ribbed side 282 can have a plurality of, e.g., two, three, or four, or more than four ribs to enhance the strength of the first tank bracket 276. The ribs can enhance the stiffness of the brackets.

The second tank bracket 280 can include a first block 286 disposed at an end thereof configured to engage the fuel tank 102. The first block 286 includes a first support surface 288 configured to engage the fuel tank 102. The second tank bracket 280 also can include a second block 292. The second block 292 includes a second support surface 294 configured to engage the fuel tank 102. One or both of the first block 286 and the second block 292 can include a thicker portion of the first tank bracket 276 and the second tank bracket 280, as shown in FIG. 11. The blocks 286, 292 can have a thickness sufficient to secure fasteners therein and therebetween. A space 296 defined between the first support surface 288 and the second support surface 294 can be configured to receive the first boss 220 of the fuel tank 102. The first tank bracket 276 and the second tank bracket 280 can be separate components to be joined as appropriate, e.g., by one or more bolts through the first block 286 and the second block 292.

FIGS. 11 and 12 show that the fuel system frame 104 can be configured to locate the mounting points or locations inward of the ends of the fuel system 100. As discussed above, the first bracket 108 and the third bracket 140 are secured to the frame rail connection portions 106 away from the first end 224 and the second end 232 of the fuel tank 102. For example, the first tank bracket 276 can be formed such that a first portion thereof extends to the first block 286 and a second end is coupled with or extends to the frame rail connection portion 106. The first tank bracket 276 can comprise an L-shaped or curved construction with the first block 286 on one end and the frame rail connection portion 106 on an end opposite the first block 286. The L-shape or curve can have an inner angle or portion that includes the first ribbed side 282. The L-shape or curve can have an inner portion that follows the curvature of the fuel tank 102. The inner angle or portion can be oriented toward the mounting space for the tank.

FIGS. 11 and 12 show that this configuration allows the frame rail connection portion 106 to be located within the fuel system frame 104 at a longitudinal position of the fuel system 100 that is toward the central cylindrical portion 204 of the fuel tank 102, e.g., at or over the cylindrical portion 204. For example the second bracket 112 and/or the fourth bracket 152 can be aligned with, e.g., intersected by or centered on a plane containing the ends of the central cylindrical portion 204 (e.g., the liner portion) of the fuel tank 102. In other words, a projection of the first end 224 and/or the second end 232 of the fuel tank 102 into the plane of the second portion 132 of the second bracket 112 would show the second bracket 112 to be between the projected ends. FIG. 2 shows that the second bracket 112 and the third bracket 140 can thus be spaced from the ends of the fuel system 100 with the cover 105 in place.

The curved configuration of the first tank bracket 276 can allow the cover 105 to be shaped to create space for components on the frame rail 42. As shown in FIG. 2 the shape of the first tank bracket 276 on the forward side of the fuel system 100 can enable the cover 105 to have an angled surface 103 creating space for the shackle 50 (or other low profile component mounted to the frame rail 42). By moving the mount points on the frame rail connection portion 106 away from the forward and/or the rearward ends of the fuel system 100, a more compact mounting arrangement or footprint for the fuel system 100 can be provided on the frame rail 42. Also, the mount point locations on the frame rail connection portion 106 provide more options for supporting the fuel system 100 and other components on the frame rail 42. For instance, the shackle 50 can be mounted to the frame rail 42 opposite the angled surface 103, e.g., rearward of the projection 49 (see FIG. 2).

B. Extended Mounting Location Configurations

Figure 11A:
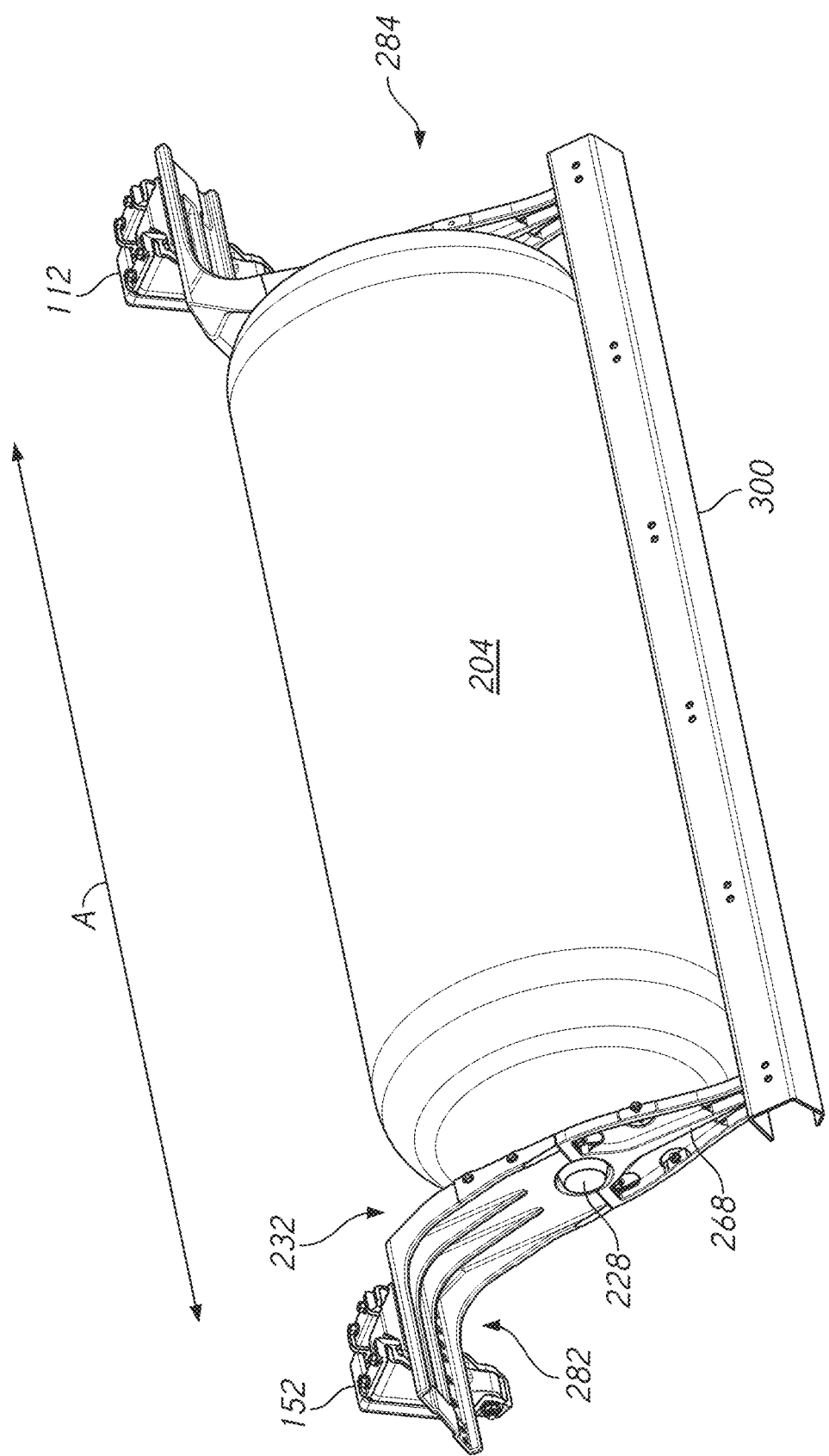
FIGS. 11A-11B show a perspective view of an alternative configuration in which fuel system mounting positions are located outside of a projection of the fuel tank, e.g., of a forward end of the fuel tank and/or rearward of a rearward end of the fuel tank.
Figure 11B:
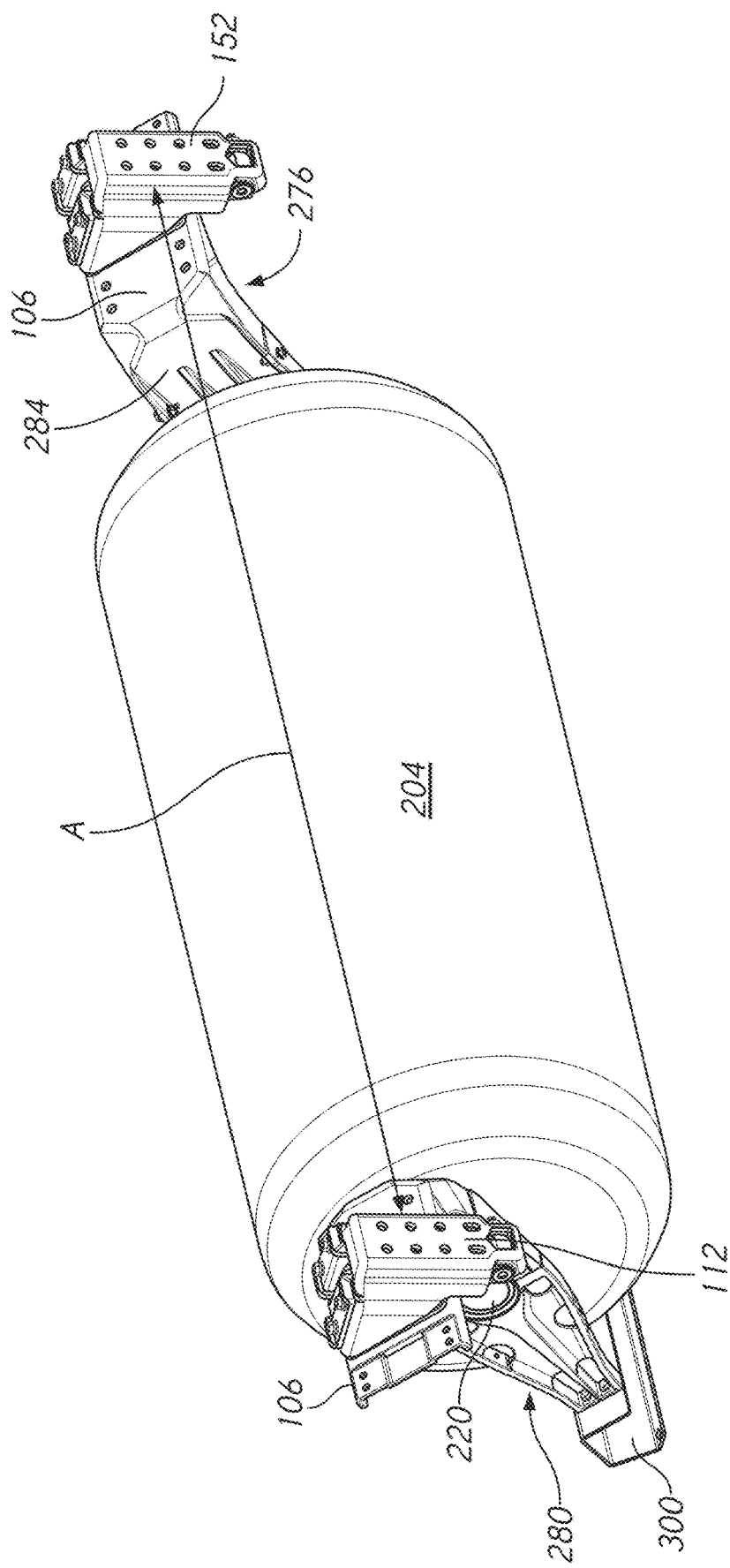

While reducing the longitudinal extent of the footprint of the fuel system 100 between the second bracket 112 and the fourth bracket 152 can be beneficial, in some embodiments it is desirable to avoid locating mounting points between the ends of the fuel tank 102 or even between the forward and rearward faces of the cover 105. FIGS. 11A and 11B show that the fuel system frame 104 can have another frame mounting configuration in which the first tank bracket 276 on the forward and/or the rearward ends of the fuel system 100 are re-oriented so that the first ribbed side 282 faces away from the space in which the fuel tank 102 is mounted.

The first block 286 can be configured to mount to the second tank bracket 280 in at least two different orientations, e.g., as shown in FIG. 12 for a low profile frame rail mounting configuration or as in FIGS. 11A and 11B for a frame rail configuration avoiding a length A of the frame rail 42 opposite the fuel tank 102. Fastening apertures on the first block 286 of the first tank bracket 276 and on the second block 292 of the second tank bracket 280 can align in a configuration where the internal angle of the first tank bracket 276 faces toward the fuel tank 102 or where the internal angle of the first tank bracket 276 faces away from the fuel tank 102. In a configuration for reversing the first tank bracket 276, mount features for supporting the lower frame assembly 254 can be provided on both of the short sides that extend between the first ribbed side 282 and the second ribbed side 284. The cover 105 can be modified to enclose the reversed first tank bracket 276 on one or both of the forward and rearward sides of the fuel system 100. End portions of an overall enclosure of the fuel system 100 that includes the cover 105 can be modified to have an opening through which the first tank bracket 276 can extend to position the frame rail connection portion 106 at an exposed location for mounting to the frame rail 42. For example, the cover 105 can be disposed circumferentially around the fuel tank 102. Sheet or plate members can be coupled with the ends of the circumferential cover 105. The sheet or plate members can cover then ends, e.g., the end shown in FIG. 13 to form an overall enclosure. When so extended the forward frame rail connection portion 106 is located forward of the second end 232 of the fuel tank 102 and the rearward frame rail connection portion 106 is located rearward of the first end 224 of the fuel tank 102.

The configuration of the fuel system frame 104 illustrated in FIGS. 11A and 11B provides an arrangement whereby a length of the frame rail 42 between the ends of the fuel system 100 and even between the first end 224 and the second end 232 of the fuel tank 102 is free of connection locations for the fuel system 100. The fuel system 100 is disposed at or over this portion of the frame rail 42. The frame rail 42 at the connection free length can be used for mounting other components between the fuel system 100 and the rail or on an in-board side of the frame rail 42 (opposite the side 44). For example, internal trusses of the chassis of which the frame rail 42 is a part can be located along this length without concern for interference between such trusses and the brackets coupled to the forward and rearward frame rail connection portions 106.

III. Access Step Support Configurations

Figure 13:
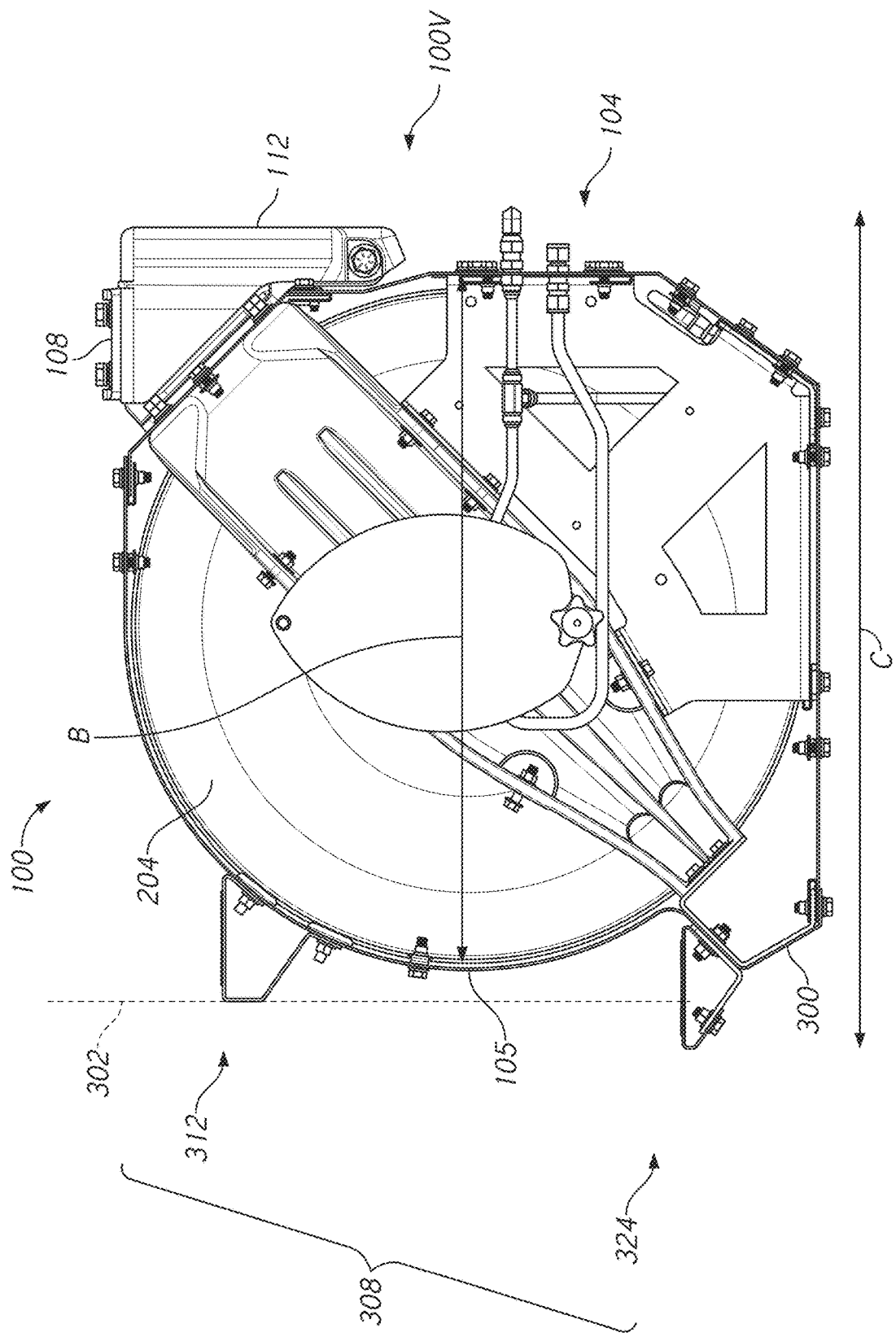
FIG. 13 is an end view of the fuel system of FIG. 2 with an end portion of the cover of the system removed, showing a step assembly of the fuel system.

In some cases it is desired to include a larger fuel tank 102, e.g., a tank of more than 24 inches in diameter, e.g., 25 inches, 26 inches, or 27 inches in diameter. This desire for larger size of the fuel tank 102 conflicts with a limitation on the lateral extent of the fuel system 100 when applied to the vehicle 40. With reference to FIG. 13, it is desired to maximize dimension B (tank diameter) while not increasing dimension C (distance from frame rail mount location to outward most extent of the fuel system 100). Another constraint is that if more than one step is provided, an upper step should be in-board of an upper step boundary 302. The upper step boundary 302 provide enough clearance for a user to comfortably lift his or her foot from a lower step 324 to a step member 312 of a step support assembly 308. In some embodiments, the fuel system 100 includes enhanced access step configurations that enable the fuel system 100 to be meet these conflicting requirements.

FIGS. 2 and 13 shows that a step support assembly 308 can have an external portion disposed outside the cover 105 to be accessible to the user for accessing the cab of the vehicle 40. The external portion of the step support assembly 308 can include a step member 312 that is formed to provide a low profile on a lateral side of the fuel system 100 and in some embodiments a second (e.g., a lower) step portion 324. The step member 312 can be supported directly on an outside surface 320 the fuel tank 102 by a compressible member 316, discussed further below. The direct support on the outside surface 320 of the fuel tank 102 helps to maintain a compact configuration in the width direction, e.g., to maintain as small a dimension C as possible (see FIG. 13).

Unlike many conventional steps, in some embodiments the step member 312 is not rectangular in cross-section. FIG. 13A shows one profile of the step member 312 in which an upper surface 328 that is exposed and onto which the user can step. The upper surface 328 of the step member 312 can be generally horizontal to provide a flat surface for stepping. A first lateral edge 332 of the step member 312 can be disposed adjacent to the outside surface 320 of the fuel tank 102. In one embodiment, the step member 312 can be formed from a sheet. An edge of the sheet can be folded to form the first lateral edge 332. In particular, the edge of the sheet can be folded at least partially under the upper surface 328. The folded under portion can be formed to generally follow the curvature of the tank. In one example, the folded under portion can have an internal angle of less than 90 degrees or an external angle of greater than 270 degrees. The folded over portion can provide a length over which apertures for coupling to the compressible member 316 can be provided, as discussed further below. The step member 312 can have a second lateral edge 336 disposed opposite the first lateral edge 332. The second lateral edge 336 can comprise the lateral most extent of the step member 312. The second lateral edge 336 can be located inward of the upper step boundary 302.

The step member 312 can include a lower surface 340 that extends from a lower portion of the second lateral edge 336 toward the tank when assembled to the tank, as shown in FIG. 13A. The lower surface 340 can be disposed at an angle to the second lateral edge 336, e.g., at an internal angle that is greater than 90 degrees, or at an external angle that is greater than 180 degrees. As shown in FIG. 13A, the lower surface 340 preferably extends at a non-horizontal angle toward the outside surface 320 of the fuel tank 102. The internal angle between the lower surface 340 and the second lateral edge 336 is preferably about 120 degrees.

As discussed above, the step member 312 can be formed from a sheet. In one embodiment, an edge of the sheet can be folded over to define the lower extent of the lower surface 340. The folded over portion can include one or a plurality of apertures to facilitate securing the compressible member 316 and a portion of the cover 105 between the step member 312 and the fuel tank 102. In one embodiment a folded over portion of the step member 312 extends away from the lower surface 340. The folded over portion can extend generally in a direction along the fuel tank 102. The folded over portion can be curved to follow the curvature of the fuel tank 102 or can be generally straight but disposed along a direction generally tangential to the outside surface 320 of the fuel tank 102. The folded over portion can extend at an internal angle to the lower surface 340 of about 90 degrees. Other angles are possible. In some embodiment, the folded over ends of the step member 312 are sufficiently flexible to allow the ends to conform to the tank shape when the step member 312 is attached to the fuel system 100.

The non-rectangular shape of the step member 312 as formed and when applied to the outside surface 320 of the fuel tank 102 enable the fuel system 100 to maximize the length of the upper surface 328 while remaining in-board of the upper step boundary 302. FIGS. 13 and 13A illustrate one example of a non-rectangular step configuration that help maximize the size of the tank (dimension B—see FIG. 13) while not overly extending the width dimension of the fuel system 100 (dimension C—see FIG. 13).

The step support assembly 308 also enhances compactness and step size by providing a more direct connection between the step member 312 and the fuel tank 102. In one embodiment, folded over end portions of the step member 312 are mounted to the outside surface 320 through intervening compressible members 316. The compressible member 316 are placed on an upper half of the fuel tank 102 such that a stepping force is opposed by the outside surface 320 of the fuel tank 102. In particular, the load will be applied through the compressible members to the outside surface 320. In one embodiment, the step member 312 is supported by one or a plurality of compressible member 316, e.g., by two, four, six or eight compressible member 316. The compressible member 316 can be formed of a polymeric material, such as one or more of a neoprene, a rubber material, nitrile rubber, natural rubber, and EPDM. The compressible member 316 can be generally circular in shape and can have a diameter of about one-half inch to two inches. In other specific examples, the compressible member 316 has a diameter of about one inch, about two inches, about three inches, or about four inches. FIG. 13 shows that the cover 105 can be disposed between the step member 312 and an outside surface of the compressible member 316.

The lower step 324 can be coupled with the collision load member 300. In one embodiment, the cover 105 is disposed between the lower step 324 and the collision load member 300. The lower step 324 can be intersected by the upper step boundary 302 such that a lower foot can rest on the lower step 324 and an upper foot of a user can be lifted up and over the second lateral edge 336 of the step support assembly 308 and come comfortably to rest across the upper step boundary 302 and onto the upper surface 328 of the step member 312.

In some embodiments the first bracket 108 can have a number of connection points to more permanently connect the first bracket 108 to the second bracket 112. For example, a plurality of, e.g., two, apertures can be formed through upper segments of the first support wing 168 and the second support wing 172 to secure the first bracket 108 to the second bracket 112.

IV. Access Door Configurations

In some cases it is desired to include an access door 400 on one or more ends of the fuel system 100. The access door 400 can be configured to move between a closed position and one or more open positions. Moving the access door 400 to an open position can uncover an opening 420 on an end of the fuel system 100 and provide access to certain components within the fuel system 100. In some cases, the opening 420 is vertically elongated to provided access along a majority, e.g., along 75 percent, of the height of the side of the cover 105. The access door 400 can have a shape matching that of the opening 420.

Figure 14:
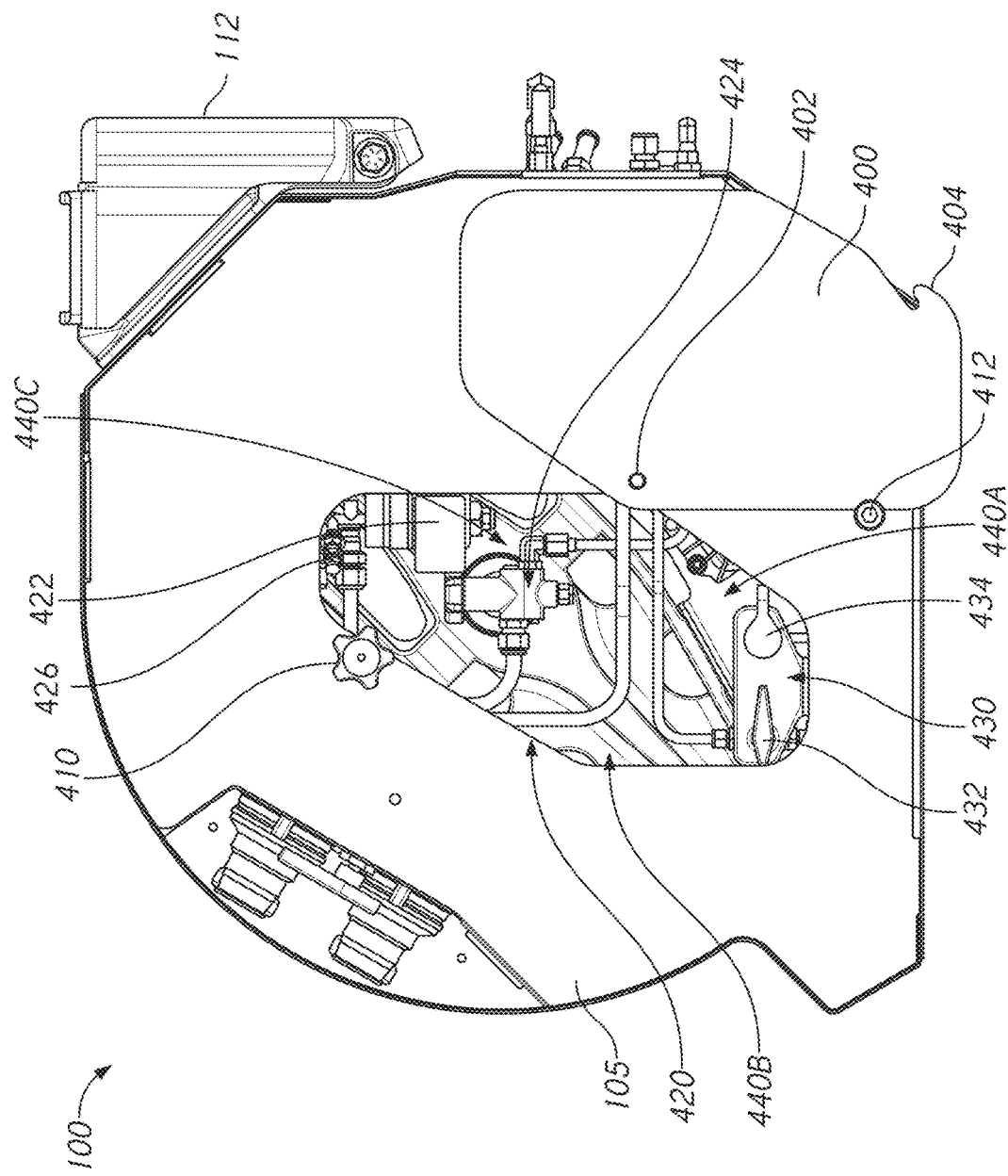
FIG. 14 is an end view of the fuel system of FIG. 2 showing an access door in an open position.
Figure 14A:
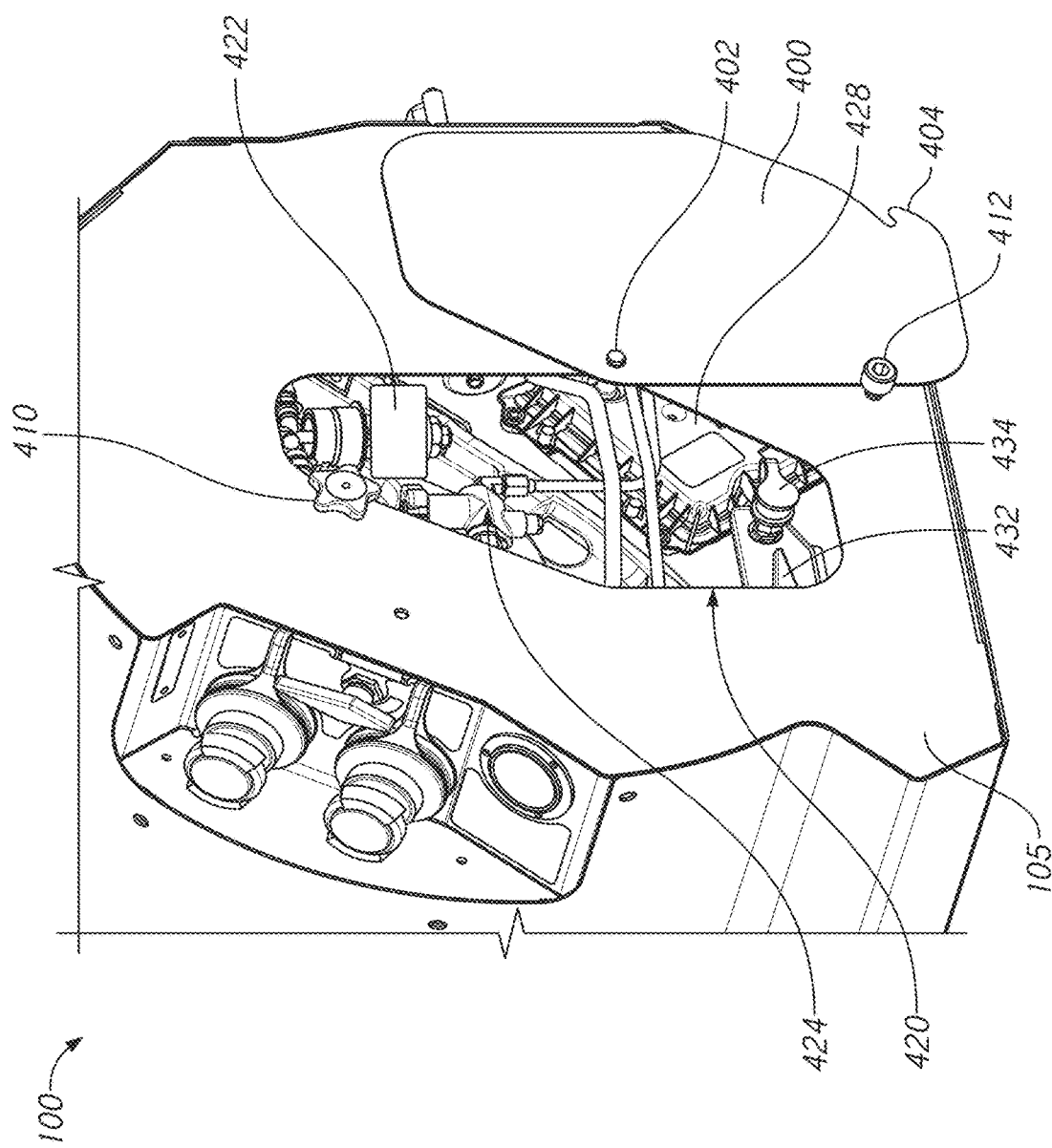
FIG. 14A is a perspective view of an end of the fuel system of FIG. 2 showing the access door of FIG. 14 in an open position.
Figure 14B:
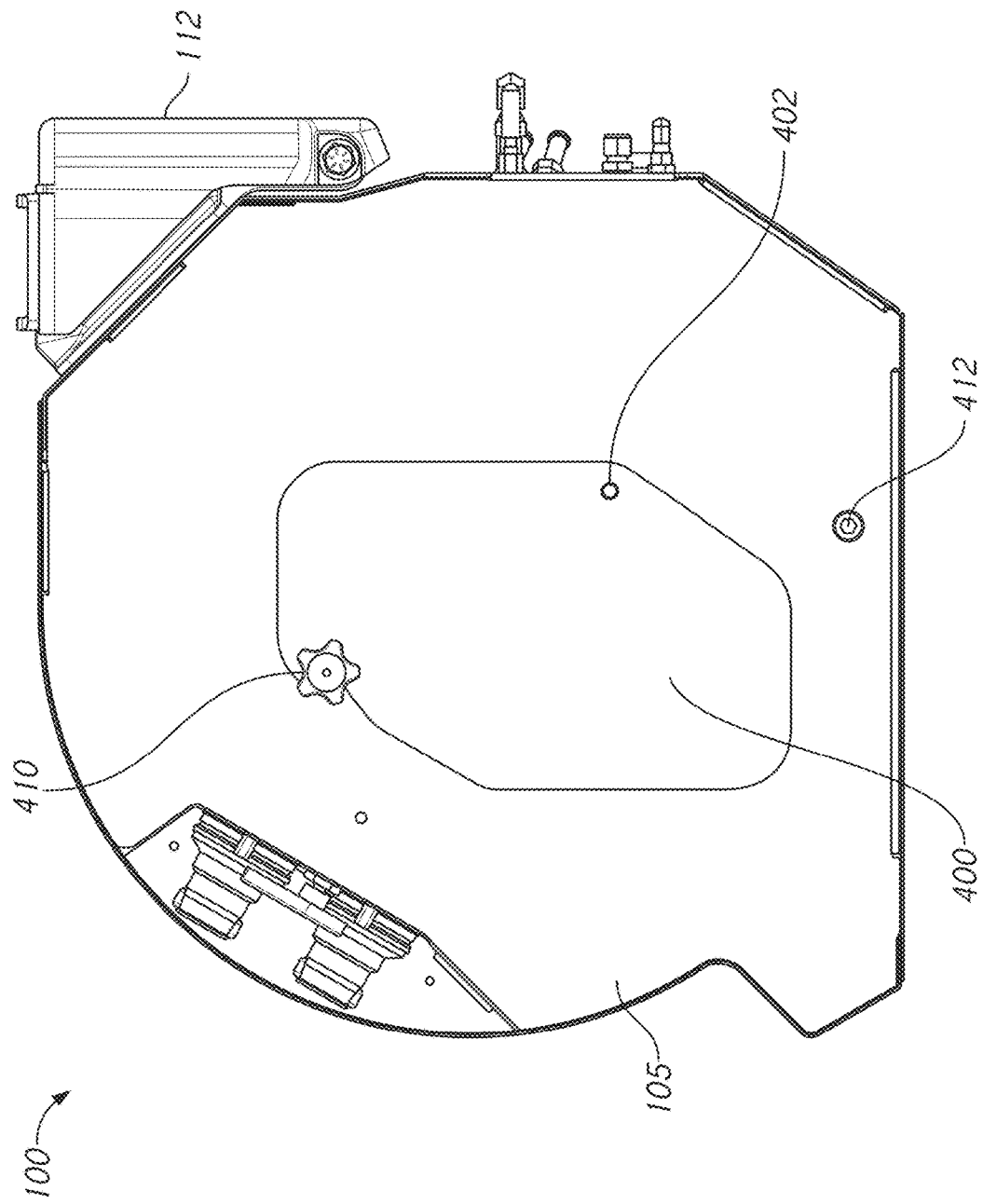
FIG. 14B is an end view of the fuel system of FIG. 2 showing the access door of FIG. 14 in a closed position.

In some embodiments, the access door 400 can be coupled to the cover 105 of the fuel system 100. For example, as shown in FIGS. 14, 14A, and 14B, the access door 400 can be rotatably coupled to an end portion of the cover 105 by a pivot 402. In some embodiments, the pivot 402 is configured to provide some amount of resistance to rotation of the access door 400 (e.g., friction), thereby preventing the access door 400 from freely rotating about the pivot 402 under its own weight and allowing the access door 400 to remain fixed in any position. The resistance provided by the pivot 402 can be easily overcome by applying additional force to the access door 400, such as by manually moving the access door 400 about the pivot 402.

In some embodiments, the axis of rotation of the access door 400 extends through the pivot 402, perpendicular to the outer surface of the end portion of the cover 105, allowing the access door 400 to be rotated between open and closed positions (e.g., rotated clockwise and/or counterclockwise) while keeping an inner surface of the access door 400 parallel to the outer surface of the end portion of the cover 105. This configuration can advantageously allow the access door 400 to be opened and closed even when space is limited between components of the fuel system 100 (e.g., when an outwardly swinging door would not be usable). For example, in some embodiments, the access door 400 can be opened and closed when the fuel system 100 is side-mounted and there is 4 inches or less clearance between the fuel system 100 and another component mounted to the frame rail 42 adjacent to the system 100. The access door 400 can be shaped such that the access door 400 does not interfere with portions of the fuel system frame 104 and brackets.

In some embodiments, the access door 400 can be secured in a closed position using a fastener 410. In some embodiments, the fastener 410 can comprise a bolt, rod, knob, lever, and/or button. For example, in some embodiments, the fastener 410 comprises a knob threaded on a rod. In some embodiments, the fastener 410 is fixed in a particular location on the fuel system 100 (e.g., does not change position when the access door 400 changes position). For example, the fastener 410 can be coupled to the outer surface of the cover 105.

In some embodiments, a portion of the access door 400, such as a flange 404, can be configured to be positioned between a lower surface of the fastener 410 and the outer surface of the cover 105 when the access door 400 is in the closed position. In some embodiments, the fastener 410 is configured to be tightened against a portion of the access door 400 to prevent rotation of the access door 400 about the pivot 402. The flange 404 can comprise a hook portion that can be disposed around a shaft of the fastener 410 to at least temporarily fix the closed position of the access door 400. For example, the fastener 410 can be configured to be rotated or otherwise adjusted to secure (e.g., compress) a portion of the access door 400, such as the flange 404, tightly against the outer surface of the cover 105, thereby securing the access door 400 in position relative to the rest of the fuel system 100. In some embodiments, rotation of the fastener 410 in a first direction (e.g., clockwise) tightens the fastener 410 against a portion of the access door 400 and rotation of the fastener 410 in a second direction (e.g., counterclockwise), opposite the first direction, releases the access door 400 from its closed position, allowing the access door 400 to be rotated about the pivot 402.

In some embodiments, it is desired to include a holder 412 configured to hold the access door 400 in one or more positions, such as in an open position. For example, as shown in FIG. 14, the holder 412 can be coupled to the cover 105 and configured to prevent the access door 400 from rotating beyond a particular location when the access door 400 is in an open position (e.g., by abutting an edge of the access door 400). This can prevent the access door 400 from blocking or covering a portion of the opening 420 when the access door 400 is in an open position. The holder 412 can be a protrusion, rod, screw, and/or clamp.

In some embodiments, the access door 400 can provide access, through the opening 420, to three or more components within the fuel system 100. This configuration can make it easier, faster, and/or more cost-efficient to service components of the fuel system 100. For example, in some embodiments, as illustrated in FIGS. 14 and 14A, the access door 400 can provide access to a filter 422, a cylinder valve assembly 424, a bleed valve 426, a defuel assembly 430 comprising a defuel valve 432 and a defuel nozzle 434, an electronic control unit (ECU) 428, and/or fuel assembly plumbing.

In some embodiments, the access door 400 can provide access, through the opening 420, to components of the fuel system 100 that are mounted on more than one modular plate. The opening 420 can provide access to components of more than one subassembly. For example, the access door 400 can provide access to components of the fuel system 100 that are mounted on a first plate 440A, a second plate 440B, and/or a third plate 440C. In some embodiments, the defuel assembly 430 and the filter 422 are mounted on different plates 440A, 440C. In some embodiments, the defuel assembly 430 and the ECU 428 are mounted on the same plate 440A. In some embodiments, the filter 422 and the cylinder valve assembly 424 are mounted on the same plate 440C.

The various embodiments of mounting assemblies and/or fuel systems described above in Sections I-IV, with reference to FIGS. 1-14B, may comprise various embodiments of gas cylinder assemblies, including, for example, the various embodiments of gas cylinder assemblies discussed below in Section V, with reference to FIGS. 15-32. For example, any of the fuel tanks (or portions thereof) visible in FIGS. 9, 10, 11, 11A, 11B, 13, and 13A may comprise any of the gas cylinder assemblies discussed below in Section V, with reference to FIGS. 15-32 (and/or may be manufactured using any of the manufacturing techniques discussed below in Section V, with reference to FIGS. 15-32).

V. Gas Cylinder Assemblies

Figure 15:
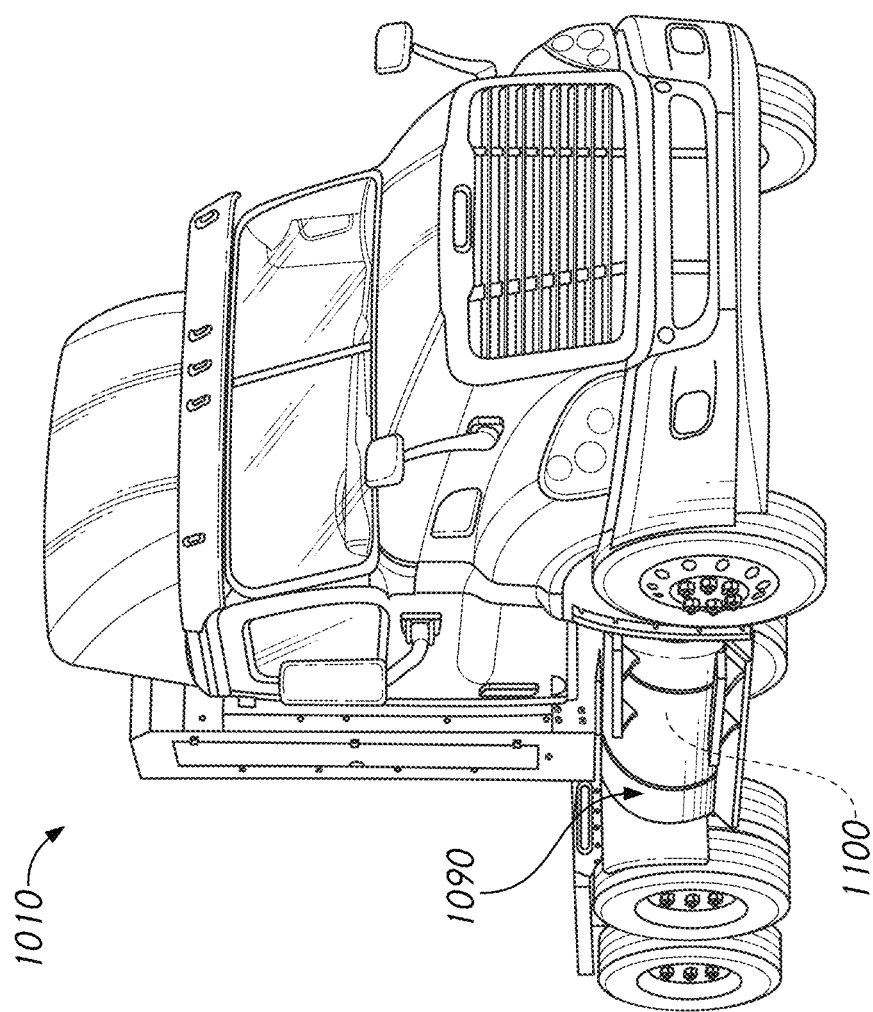
FIG. 15 shows a vehicle that has a gas cylinder assembly according to one embodiment integrated into a side-mount fuel system.

This application discloses novel gas cylinder assemblies and methods of producing gas cylinder assemblies. As used herein "cylinder" is a term that includes storage tanks, pressure vessels and other containers that can be used to store a gas and is not necessarily limited to a specific shape such as a right cylinder and/or having a constant or unvarying circular shape in cross-section. FIG. 15 show a fuel system 1090 that includes a gas cylinder assembly 1100 installed on a vehicle 1010 according to an embodiment. The gas cylinder assembly 1100 is in fluid communication with and supplies fuel to an engine or any other power generation system of the vehicle 1010. In various embodiments, the vehicle 1010 may be a car, a wagon, a van, a bus, a high-occupancy vehicle, a truck, a tractor trailer truck, a heavy duty vehicle such as a garbage truck or any other vehicle. In various embodiments, a gas cylinder assembly 1100 is configured for use in a ship, an airplane and a mobile or stationary fuel station. The illustrated fuel system 1090 is a side-mounted system in which one gas cylinder (fuel tank) is disposed in a housing. The gas cylinder assemblies 1100 disclosed herein can used in fuel systems with more than one gas cylinder assembly which can be configured for placement behind the cab of the vehicle, on a rooftop and/or mounted to a tailgate of a vehicle.

Structure of Gas Cylinder Assemblies

Figure 16:
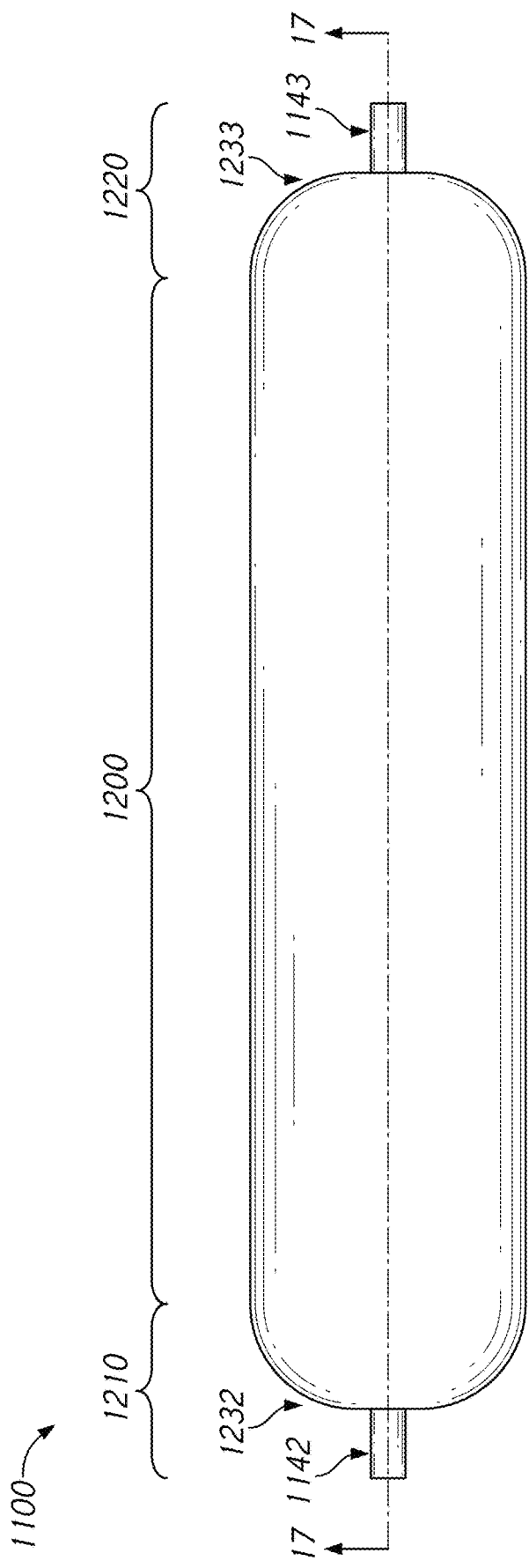
FIG. 16 is a side view of a gas cylinder assembly according to one embodiment.
Figure 17:
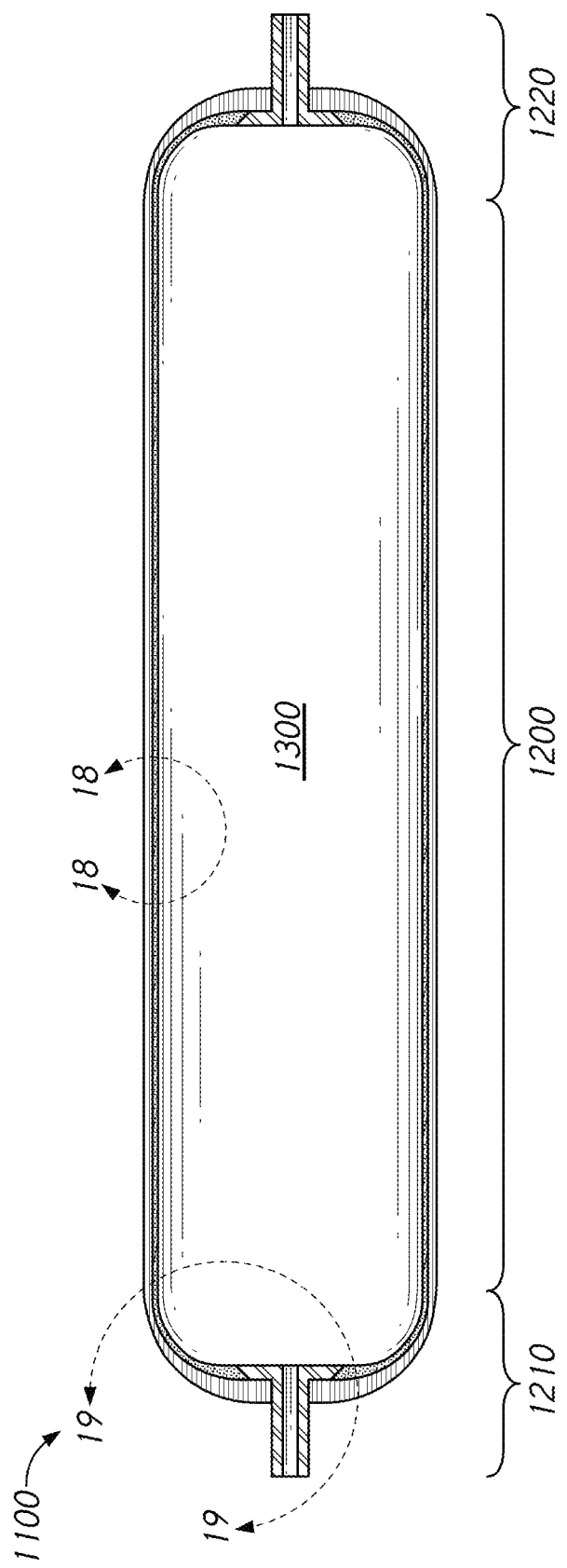
FIG. 17 is a cross-sectional view of the gas cylinder assembly of FIG. 16 taken at section plane 17-17.

FIGS. 16 and 17 show that the gas cylinder assembly 1100 comprises a central portion 1200 and two end portions 1210, 1220. The central portion 1200 can be of a cylindrical tubular shape. In other embodiments, the central portion is of a shape other than a cylinder. In some embodiments, each of the two end portions 1210, 1220 includes a dome structure 1232, 1233 as shown in FIG. 16. In certain embodiments, the two end portions are symmetrical to each other. The dome structure 1232, 1233 can be generally hemispherical at least at the end portions thereof. In certain embodiments, two end portions 1210, 1200 have different shapes such that the gas cylinder assembly 1100 is of an asymmetrical shape.

In some embodiments, the gas cylinder assembly 1100 comprises at least one neck 1142, 1143 (e.g., a longitudinal projection of a boss) that provides an inlet and/or an outlet of an internal volume of the gas cylinder assembly 1100. In some embodiments, the gas cylinder assembly 1100 comprises necks 1142, 1143 formed at both of the end portions 1210, 1220. In certain embodiments, a neck can be formed only one of the two end portions 1210, 1200. In some embodiments, the neck 1142, 1143 can be part of a metallic structure, sometimes referred to as a boss, that is formed through a first end portion 1124 of an internal pressure enclosure 1120, which is sometimes referred to as an inner liner assembly or simply a liner of the gas cylinder assembly 1100. The internally pressure enclosure 1120 is discussed below in connection with FIGS. 20-21.

Although the neck 1142, 1143 can be made of a metallic structure, the neck 1142, 1143 can be made of one or more other materials. In certain embodiments, the neck 1142, 1143 is formed using one or more materials not used for the internal pressure enclosure 1120. In certain embodiments, the neck 1142 is made of the same material as the internal pressure enclosure 1120.

Figure 18:
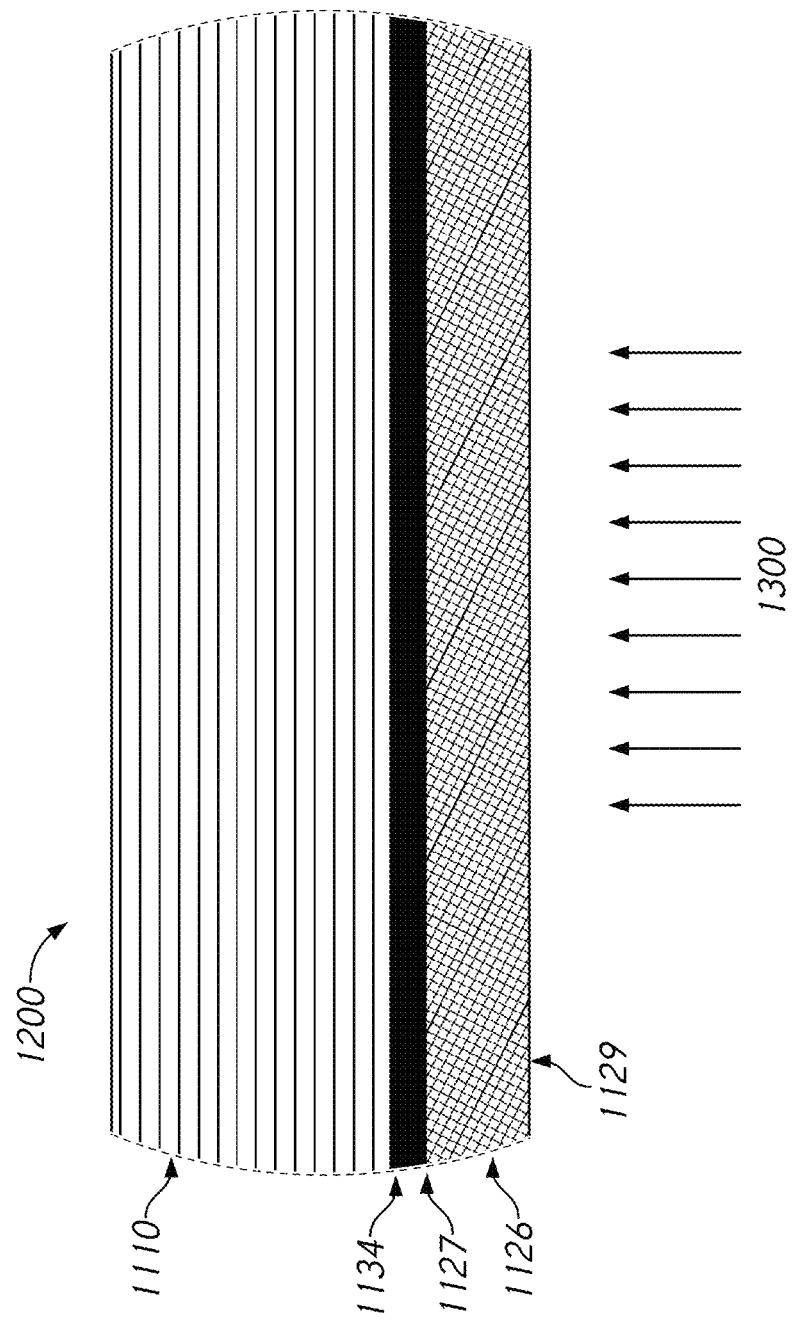
FIG. 18 is an enlarged view of detail 18-18 in FIG. 17 showing the structure of a central portion of the tank gas cylinder assembly of FIG. 16.

FIGS. 17 and 18 shows that the gas cylinder assembly 1100 can include multiple layers that are provided for distinct functions. As noted above and discussed more fully below the internal pressure enclosure 1120, which itself can be an assembly, primarily provides an internal space 1300 (enclosed cavity) for containing fuel. A reinforcement structure 1110 (e.g., an outer shell) is disposed over the internal pressure enclosure 1120 to provide additional strength to the gas cylinder assembly 1100. The strength provided by the reinforcement structure 1110 supports the gas cylinder assembly 1100 when the tank assembly is pressurized (as indicated by the arrows in FIG. 18). FIG. 18 shows that the central portion 1200 of the tank gas cylinder assembly 1100 can have a further layered structure.

In the region shown in FIG. 18, a central body 1126 of the internal pressure enclosure 1120 is the innermost layer of the layered structure. The inner surface 1129 of the central body 1126 defines at least a portion of the internal space 1300 of the gas cylinder assembly 1100.

In some embodiments, the central body 1126 and dome end portions (dome structures) 1162, 1163 of the internal pressure enclosure 1120 are constructed using one or more polymeric materials. The one or more polymeric materials can be selected, in certain embodiments, from nylon, high density polyethylene (HDPE), polyvinyl chloride (PVC), ethylene propylene diene terpolymer (EDPM), polyethylene terephthalate (PET) and polyketone (POK). Processes to build the internal pressure enclosure (inner liner) 1120 will be discussed below in connection with FIGS. 20-21.

In some embodiments, in the region shown in FIG. 18, the central body 1126 of the internal pressure enclosure 1120 has a thickness of 0.01, 0.02, 0.03, 0.05, 0.08, 0.09, 0.1, 0.12, 0.13, 0.15, 0.18, 0.19, 0.2, 0.21, 0.23, 0.25, 0.28, 0.29, 0.30 inches. In embodiments, the central body 1126 has a thickness in a range formed by any two numbers selected from those listed in the proceeding sentence such that the central body 1126 is stiff enough for further processing (e.g. to support a compression load applied in winding of a carbon fiber material over the body 1126). In other embodiments, the central body 1126 has a thickness greater than 0.30 inches. In other embodiments, the central body 1126 has a thickness less than 0.01 inches. In some embodiment, the central body 1126 has a thickness of about 0.10 inches or greater when it is made of nylon. In some embodiment, the central body 1126 has a thickness of about 0.18 inches or greater when it is made of HDPE.

Over the central body 1126 of the internal pressure enclosure 1120, a permeation barrier layer 1134 is disposed to lower permeation of fuel from the internal space 1300 through the central portion 1200 of the gas cylinder assembly 1100. In embodiments, as discussed further below, a portion of the gas cylinder assembly 1100 other than the central portion 1200 also can have the same or similar layered structure. For example, the end portions 1210, 1220 can have, at least in part, a similar layered structure.

FIGS. 17 and 18 show that in some embodiments the permeation barrier layer 1134 is interposed between the internal pressure enclosure 1120 and the reinforcing structure 1110. The permeation barrier layer 1134 can be immediately adjacent to and contacting the central body 1126 of the internal pressure enclosure 1120 (e.g., the outer surface 1127 thereof). In other embodiments, one or more additional layers can be interposed between the permeation barrier layer 1134 and the central body 1126, as discussed further below. In certain embodiments, the permeation barrier layer can be disposed at or on the inner surface 1129 of the central body 1126.

In certain embodiments, the permeation barrier layer 1134 is immediately adjacent to and contacting the outer reinforcement structure 1110. The permeation barrier layer 1134 can be immediately adjacent to and contacting both the outer surface 1127 of the central body 1126 and an inner surface of the outer reinforcement structure 1110. In other embodiments, one or more additional layers can be interposed between the permeation barrier layer 1134 and the outer reinforcement structure 1110.

In some embodiments, the permeation barrier layer 1134 comprise one or more low-permeability barrier materials. The one or more low-permeation barrier materials can be selected, in certain embodiments, from a metal (e.g. aluminum, tungsten, stainless steel), a metal alloy, a metallic compound (e.g. aluminum oxide, titanium), polyvinylidene chloride (PVDC), ethylene vinyl alcohol (EVOH), polyamide, and polyethylene terephthalate (PET). In certain embodiments, the foil may be of any metal that can be configured to provide a homogeneous continuous layer of metal that is impermeable to gas. More preferred materials will also be light weight and low cost. Aluminum foil is one preferred example. Processes to place the permeation barrier layer 1134 over the internal pressure enclosure 1120 will be discussed below in connection with FIGS. 22-32.

In some embodiments, in the region shown in FIG. 18, the permeation barrier layer 1134 has a thickness of 0.0001, 0.0002, 0.0003, 0.0004, 0.0005, 0.0006, 0.0007, 0.0008, 0.0009, 0.001, 0.002, 0.003, 0.005, 0.009, 0.01, 0.02, 0.05, 0.09, 0.1 inches. In some embodiments, the permeation barrier layer 1134 has a thickness in a range formed by any two numbers selected from those listed in the proceeding sentence. In other embodiments, the permeation barrier layer 1134 has a thickness greater than 0.1 inches. In other embodiments, the permeation barrier layer 1134 has a thickness less than 0.0001 inches.

In some embodiments, in the region shown in FIG. 18, the permeation barrier layer 1134 comprise a metal foil layer that has a thickness of 0.0001, 0.0002, 0.0003, 0.0004, 0.0005, 0.0006, 0.0007, 0.0008, 0.0009, 0.001, 0.002, 0.003, 0.005, 0.009, 0.01, 0.02, 0.05, 0.09, 0.1 inches. In some embodiments, the permeation barrier layer 1134 has a thickness in a range formed by any two numbers selected from those listed in the proceeding sentence. In other embodiments, the permeation barrier layer 1134 has a thickness greater than 0.1 inches. In other embodiments, the permeation barrier layer 1134 has a thickness less than 0.0001 inches. The permeation barrier layer 1134 can be configured to allow for draping over a structure disposed inward thereof. The permeation barrier layer can be a metal foil that is drapable. The permeation barrier layer 1134 can be draped over and directly onto the central body 1126. If configured as a metal foil, the barrier layer 1134 can be draped such that a metal surface is directly on the central body 1126 or is directly on a structure disposed between the draped foil and the central body. As used herein a drapable layer is a sheet layer that readily conforms to the surface to which the layer is applied.

In some embodiments, a metal foil layer, during its manufacturing or handling process, may be susceptible to minute pinholes when it is thinner than 0.001 inches. Pinholes of the metal foil layer may increase permeability of fuel gas. Accordingly, in some embodiments, an additional coating can be applied to plug pinholes of the meatal foil in providing the permeation barrier layer 1134.

In some embodiments, in the region shown in FIG. 18, the reinforcement structure 1110 has a thickness of 0.05, 0.1, 0.2, 0.3, 0.4, 0.5, 0.6, 0.7, 0.8, 0.9, 1, 1.2, 1.5 or 2.0 inches. In some embodiments, the reinforcement structure 1110 has a thickness in a range formed by any two numbers selected from those listed in the proceeding sentence. In other embodiments, the reinforcement structure 1110 has a thickness greater than 2.0 inches. In other embodiments, the reinforcement structure 1110 has a thickness less than 0.05 inches.

In some embodiments, in the region shown in FIG. 18, the permeation barrier 1134 layer has a thickness that is substantially thinner than that of the central body 1126. When the permeation barrier layer 1134 comprises a metal layer and has a density greater than that of the central body 1126, having a thinner permeation barrier can be advantageous to reduce the total weight of the gas cylinder assembly. In some embodiments, the permeation barrier 1134 has a thickness of 0.1, 1, 2, 3, 4, 5, 6, 7, 8, 9, 10, 12, 14, 16, 18, 20, 22, 24, 26, 28 or 30% of that of the central body 1126. In some embodiments, the permeation barrier layer 1134 has a thickness, expressed as a percent of the thickness of the central body 1126, in a range formed by any two numbers selected from those listed in the proceeding sentence. In other embodiments, the permeation barrier layer 1134 has a thickness over 30% of that of the central body 1126. In other embodiments, the permeation barrier layer 1134 has a thickness less than 0.1% of that of the central body 1126.

In some embodiments, because the permeation barrier layer 1134 does not bring a significant increase in the total weight of the gas cylinder assembly 1100, the gas cylinder assembly 1100 has a better (lower) permeability than a Type 4 CNG tank while maintaining a weight per unit containing volume comparable to that of a Type 4 CNG tank (e.g. 0.3 to 0.45 kg/L).

In some embodiments, the gas cylinder assembly 1100 has a weight per unit containing volume of 0.1, 0.2, 0.25, 0.3, 0.35, 0.4 or 0.45 kg/L. In some embodiments, the gas cylinder assembly 1100 has a weight per unit containing volume in a range formed by any two numbers selected from those listed in the proceeding sentence. In some embodiments, the gas cylinder assembly 1100 has a weight per unit containing volume less than 0.1 kg/L. In other embodiments, the gas cylinder assembly 1100 has a weight per unit containing volume greater than 0.45 kg/L.

In some embodiments, the reinforcement structure 1110 is constructed using a composite material. In certain embodiments, the reinforcement structure 1110 comprises a layer of a fiber-reinforced composite material (e.g. carbon-fiber reinforced polymer resin) In certain embodiments, a material other than composite materials discussed above can be used to form the reinforcement structure 1110.

Figure 19:
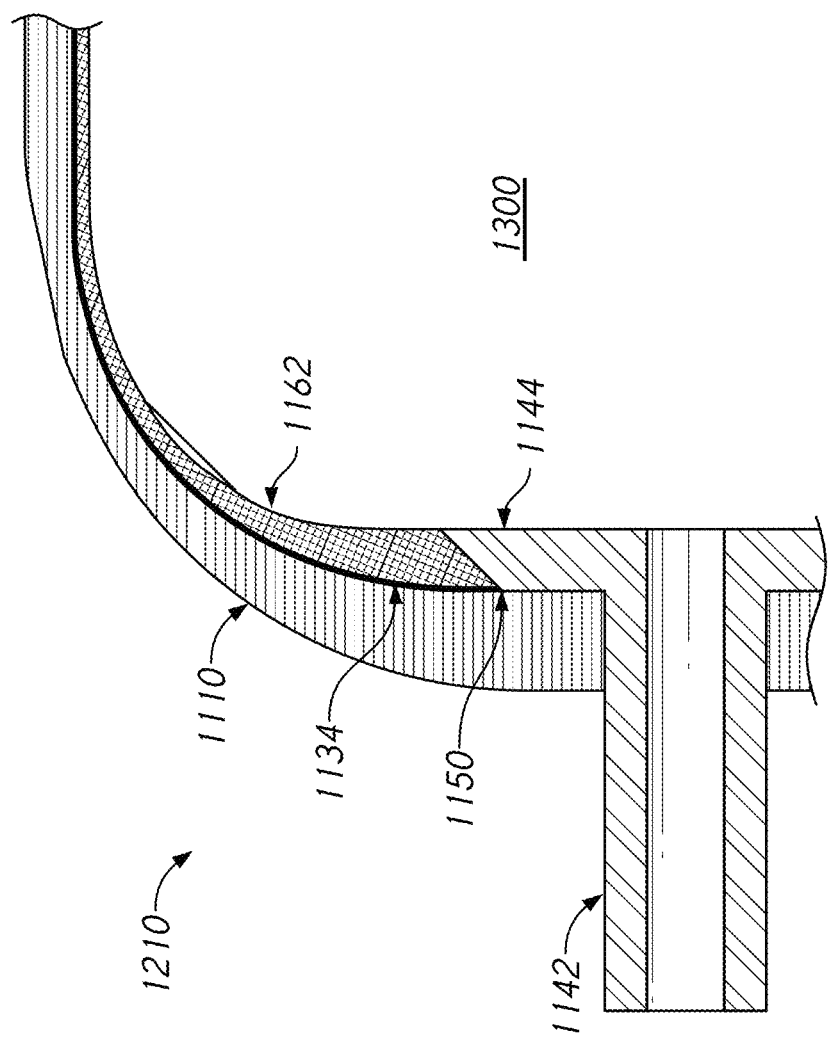
FIG. 19 is an enlarged view of detail 19-19 in FIG. 17 showing the structure of an end portion of the tank gas cylinder assembly of FIG. 16.

FIG. 19 shows that the end portion 1210 of the tank gas cylinder assembly 1100 can have a layered structure. A first end portion 1124 of the internal pressure enclosure 1120 is provided in the end portion 1210 of the gas cylinder assembly 1100. The first end portion 1124 of the internal pressure enclosure 1120 includes an assembly of a first dome end portion (dome structure) 1162 and a first boss 1144 that comprises a neck portion 1142. The first dome end portion 1162 and the first boss 1144 in combination provide the innermost part of the end portion 1210 and define at least a portion of the internal space 1300 of the tank gas cylinder assembly 1100.

FIGS. 16-19 show that in embodiments, the permeation barrier layer 1134 is disposed over the entirety of the first dome end portion 1162 within the first end portion 1210 up to but not including over the boss 1144. In some embodiments, the permeation barrier 1134 extends over the boundary between the inner liner 1124 and the boss 1144 and can extend over the boss 1144 as well. In certain embodiments, the permeation barrier 1134 does not extend over the boundary 1150 between the inner liner 1124 and the boss 1144. In other embodiments, the permeation barrier 1134 extend over the boundary 1150 to cover at least a portion of the boss 1144.

Methods of Producing Gas Cylinder Assemblies

In some embodiments, a method of producing the gas cylinder assembly 1100 includes: (1) forming the internal pressure enclosure 1120 of FIG. 20, (2) forming the permeation barrier layer 1134 over at least a portion of the internal pressure enclosure 1120 or on at least a portion of an inside surface thereof to form an intermediate assembly 1130 of FIGS. 22, and (3) subsequently forming the reinforcement structure 1110 over the permeation barrier layer 1134.

In some embodiments, the central body 1126 of the internal pressure enclosure 1120 can be produced by forming a cylindrical tube, e.g., by rolling a polymer sheet into a cylindrical tubular body. In other embodiments, the central body 1126 can be produced using other processes including injection molding and extrusion.

In some embodiments, the first end portion 1124 of the internal pressure enclosure 1120 can be prepared by (a) forming a first dome shaped member 1162 of a polymer material using an injection molding process, (b) forming a central hole through the first dome shaped member to form the first dome end portion 1162, and (c) coupling a boss 1144 to the first dome end portion 1162 through the central hole.

The second dome shaped member 1163 and the second end portion 1125 can be prepared using the same or similar layered processes.

In certain embodiments, forming the first dome shaped member and forming the central hole can be done at the same time in a single process of injection molding. In some embodiments, a process other than injection molding can be used to build the first dome shaped member 1162. In some embodiments, the first dome shaped member 1162 is a hemispherical member having a central opening therethrough.

Figure 20:
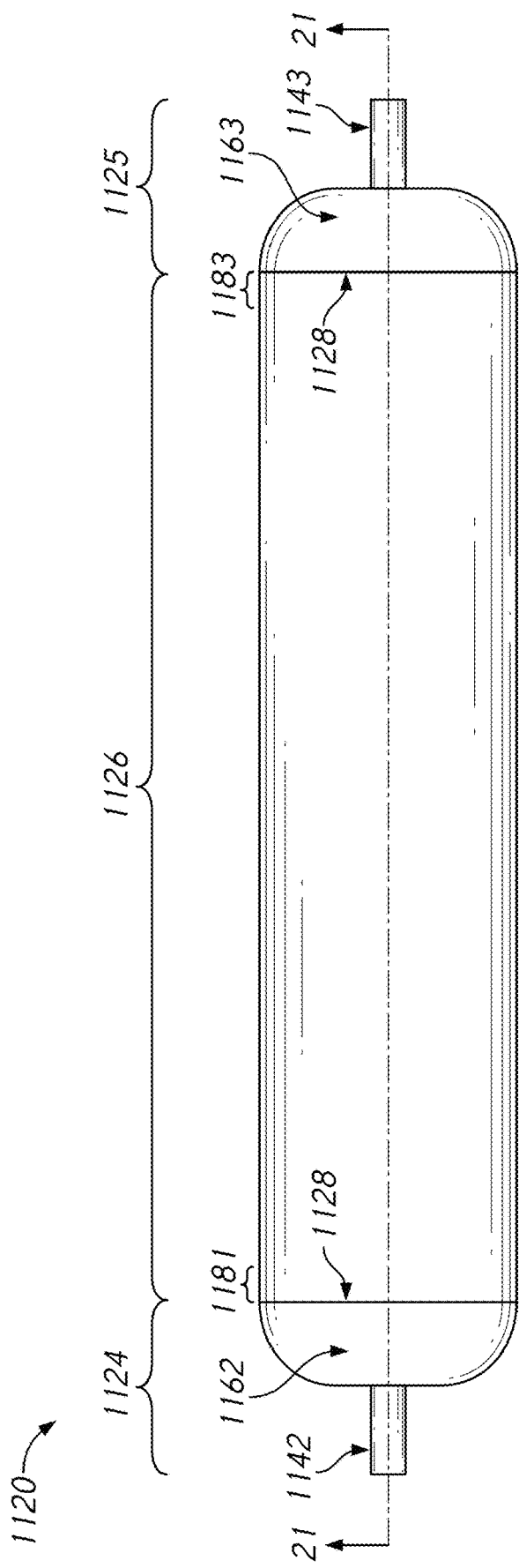
FIG. 20 shows an internal pressure enclosure of a gas cylinder assembly according to one embodiment.
Figure 21:
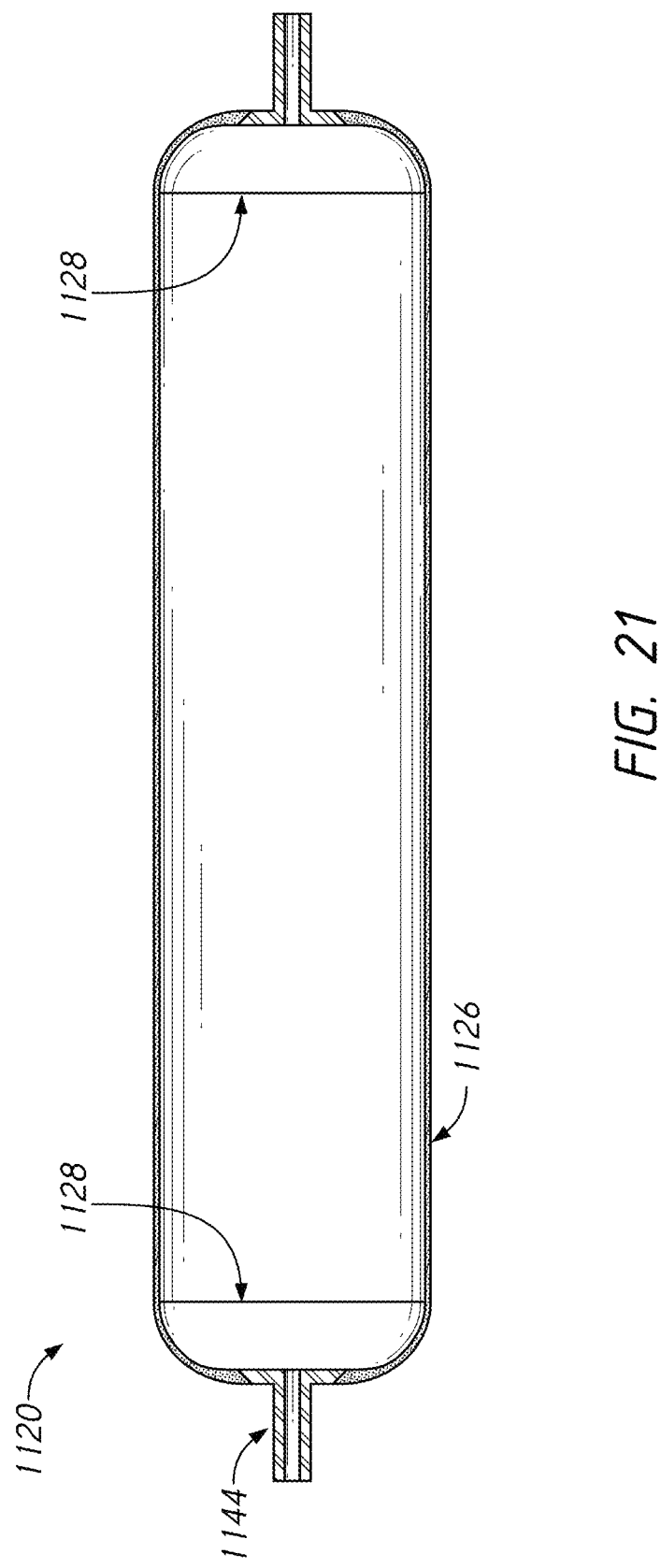
FIG. 21 is a cross-sectional view of the internal pressure enclosure of FIG. 20 taken at section plane 21-21.
Figure 22:
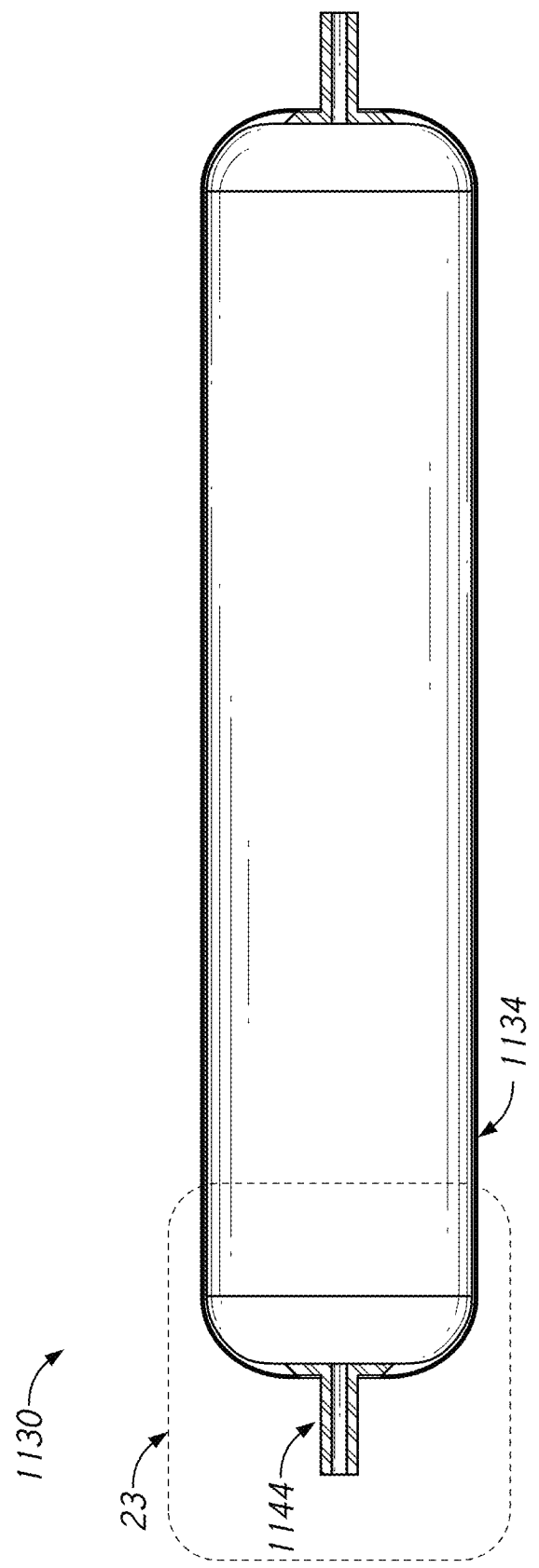
FIG. 22 is a cross-sectional view of an assembly including a barrier layer disposed over the internal pressure enclosure of FIG. 20.
Figure 23:
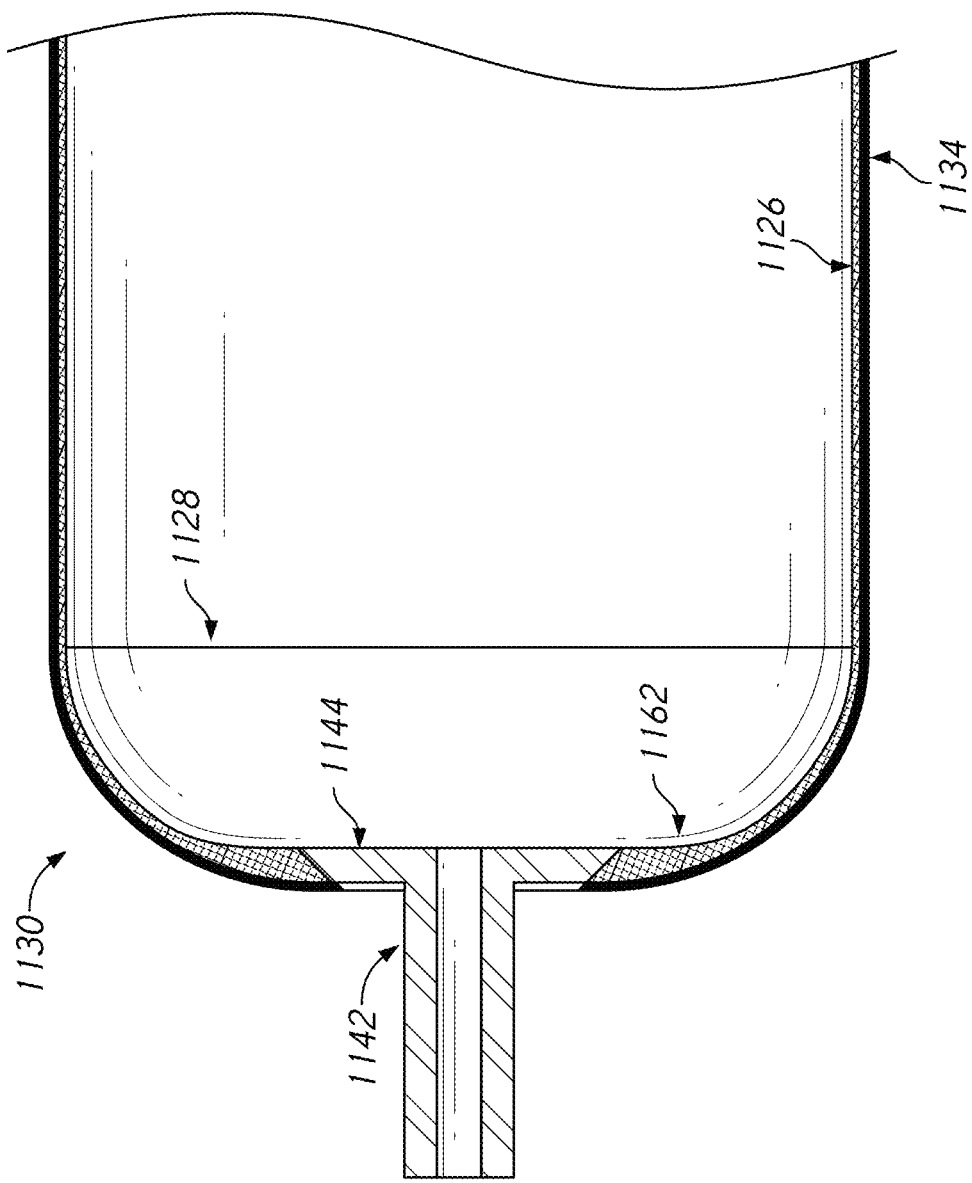
FIG. 23 is an enlarged view showing detail 23 of the assembly of FIG. 22.

After the central body 1126 and the end portions 1124, 1125 are produced, to form the internal pressure enclosure 1120, a first end 1181 of the central body 1126 is coupled with the first end portion 1124 and a second end 1183 of the central body 1126 is coupled with the first end portion 1125. In certain embodiments, a welding process can be used to couple the central body 1126 and the end portions 1124, 1125 and can leave a weld line 1128 along the boundary between the central body 1126 and the two end portions 1124, 1125 as shown in FIGS. 20 and 21. In some embodiments, the central body 1126 and the end portions 1124, 1125 are fixed to each other using an adhesive material.

In some embodiments, after the internal pressure enclosure 1120 is prepared, a permeation barrier layer 1134 is formed over the internal pressure enclosure 1120 to obtain an intermediate assembly 1130. In embodiments of FIGS. 22 and 23, the permeation barrier layer 1134 covers the central body 1126 and at least a portion of the end portions 1124, 1125. For example, the permeation barrier layer 1134 covers the entirety of the central body 1126 and further coves the dome end portion 1162 up to and/or including the boss 1144.

In some embodiments, the permeation barrier layer 1144 is provided by applying one or more strips of a barrier material on an outer surface of the internal pressure enclosure 1120. In other embodiments, a barrier material is painted or sprayed over an outer surface of the internal pressure enclosure 1120 (metallizing process). In some embodiments, a barrier material is deposited using a vapor deposition process. In certain embodiments, wrapping a metal foil over the internal pressure enclosure 1120 is preferred over a metallizing process. Without being limited to any particular theory it is believed that a continuous expanse of metal in the metal foil may provide a better (lower) permeability than a coating of a thickness or volume formed by the metallizing process. In certain embodiments, a process other than those discussed above can be used to form a permeation barrier layer. Various processes to form a permeation barrier layer will be describe below in more detail.

Figure 24:
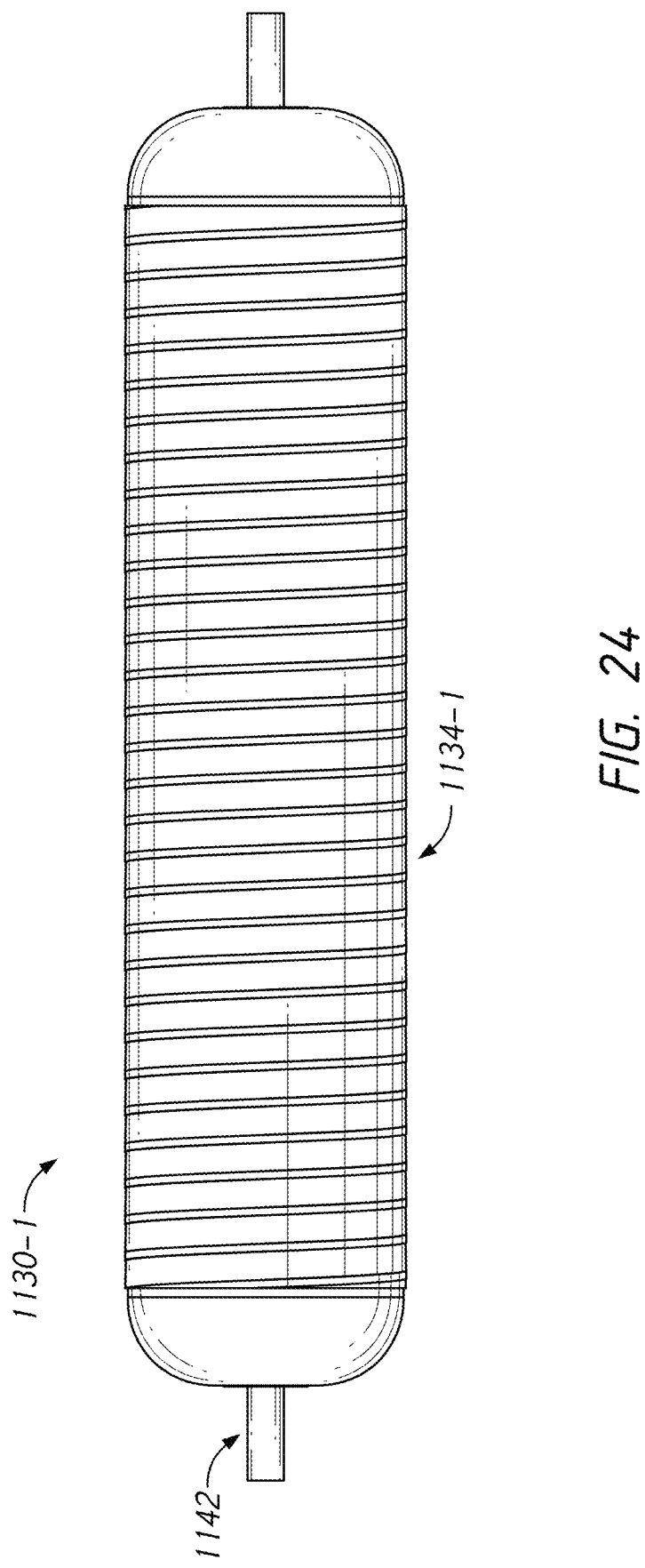
FIG. 24 shows an embodiment of a gas cylinder assembly having a barrier layer material in the form of a strip or strips wound or wrapped circumferentially around the internal pressure enclosure of FIG. 20 and also illustrates a process of wrapping or winding a strip or strips such that a longitudinal axis of the strip is disposed generally transverse to a longitudinal direction of the internal pressure enclosure.

FIG. 24 shows that in one embodiment one or more strips (e.g., tapes, ribbons) of barrier material 1134-1 are wound over the internal pressure enclosure 1120 and along a circumferential direction of the internal pressure enclosure 1120 to form a permeation barrier layer of an intermediate assembly 1130-1. The strips can be applied generally transverse to the longitudinal direction of the enclosure 1120. In some embodiments, two neighboring windings of the barrier material strip(s) 1134-1 overlap each other such that a portion of the permeation barrier layer 1134-1 is thicker than another portion. In embodiments, windings of the barrier material strip(s) 1134-1 cover, e.g., go over, the weld line 1128 along a longitudinal direction of the intermediate assembly to 1130-1 such that the barrier material strip 1134-1 is disposed over the weld line 1128. The barrier material strip(s) 1134-1 can also go over the dome end portion 1162 of the internal pressure enclosure 1120. In certain embodiments, windings of the barrier material strip(s) 1134-1 remain between the weld lines 1128 such that the dome end portion 1162 is not covered by the barrier material strip(s) 1134-1.

Figure 25:
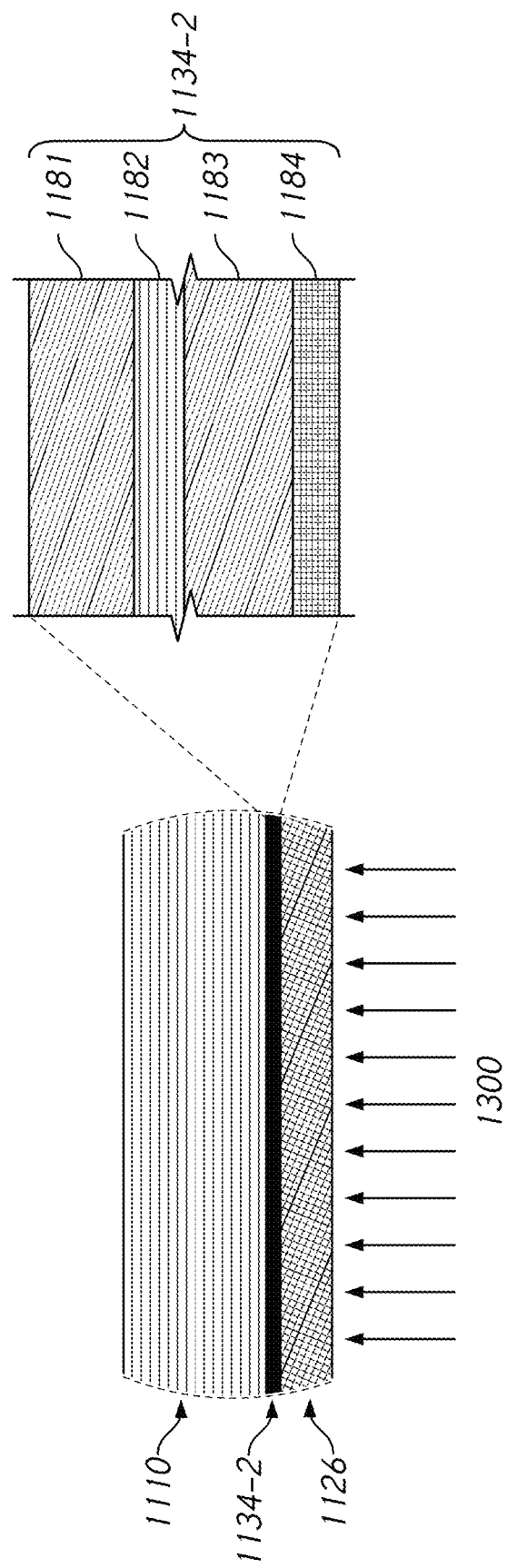
FIG. 25 is an enlarged partial cross-sectional view, similar to FIG. 18, of a central portion of a gas cylinder and also showing layers of a permeation barrier structure according to one embodiment.

FIG. 25 shows that in some embodiments a permeation barrier layer 1134-2 interposed between the enclosure 1120 and the structure 1110 comprises a multi-layer member or members. In some embodiments, the permeation barrier layer 1134-2 comprises a metal foil 1182, a first polymer layer 1181 and a second polymer layer 1183. The permeation barrier layer 1134-2 can also include an adhesive layer 1184 in some variations. In some embodiments, the permeation barrier layer 1134-2 does not have at least one of the first polymer layer 1181 and the second polymer layer 1183. In some embodiments, the permeation barrier layer 1134-2 does not have the adhesive layer 1184. In certain embodiments, the permeation barrier layer 1134-2 excludes the metal foil 1182 and includes at least one of the polymer layers 1181, 1183. In certain embodiments, a metal foil 1182 with no additional layer can be directly wrapped over an outer surface 1126 of the internal pressure enclosure 1120 to form a permeation barrier. The reinforcement structure 1110 can be applied directly on the permeation barrier layer 1134-2, e.g., directly on one of the polymer or adhesive layers or directly on the metal foil layer. The reinforcement structure 1110 can be applied directly on the metal foil 1182 of variations of the permeation barrier layer 1134-2, e.g., on variations in which the first polymer layer 1181 is not present. In some variations, direct contact is provided between the metal foil 1182 and the reinforcement structure 1110. In some variations, direct contact is provided between the metal foil 1182 and the internal pressure enclosure 1120. In some variations direct contact is provided between the internal pressure enclosure 1120 the metal foil 1182 and/or between the reinforcement structure 1110 and the metal foil 1182. In some embodiments, the first polymer layer 1181 is a polymer layer comprising ethylene vinyl alcohol (EVOH). In some embodiments, the second first polymer layer 1183 is a polymer layer comprising ethylene vinyl alcohol (EVOH). In certain embodiments, a permeation barrier layer does not comprises a metal foil layer, but comprise a layer of low-permeability ethylene vinyl alcohol (EVOH).

Figure 26:
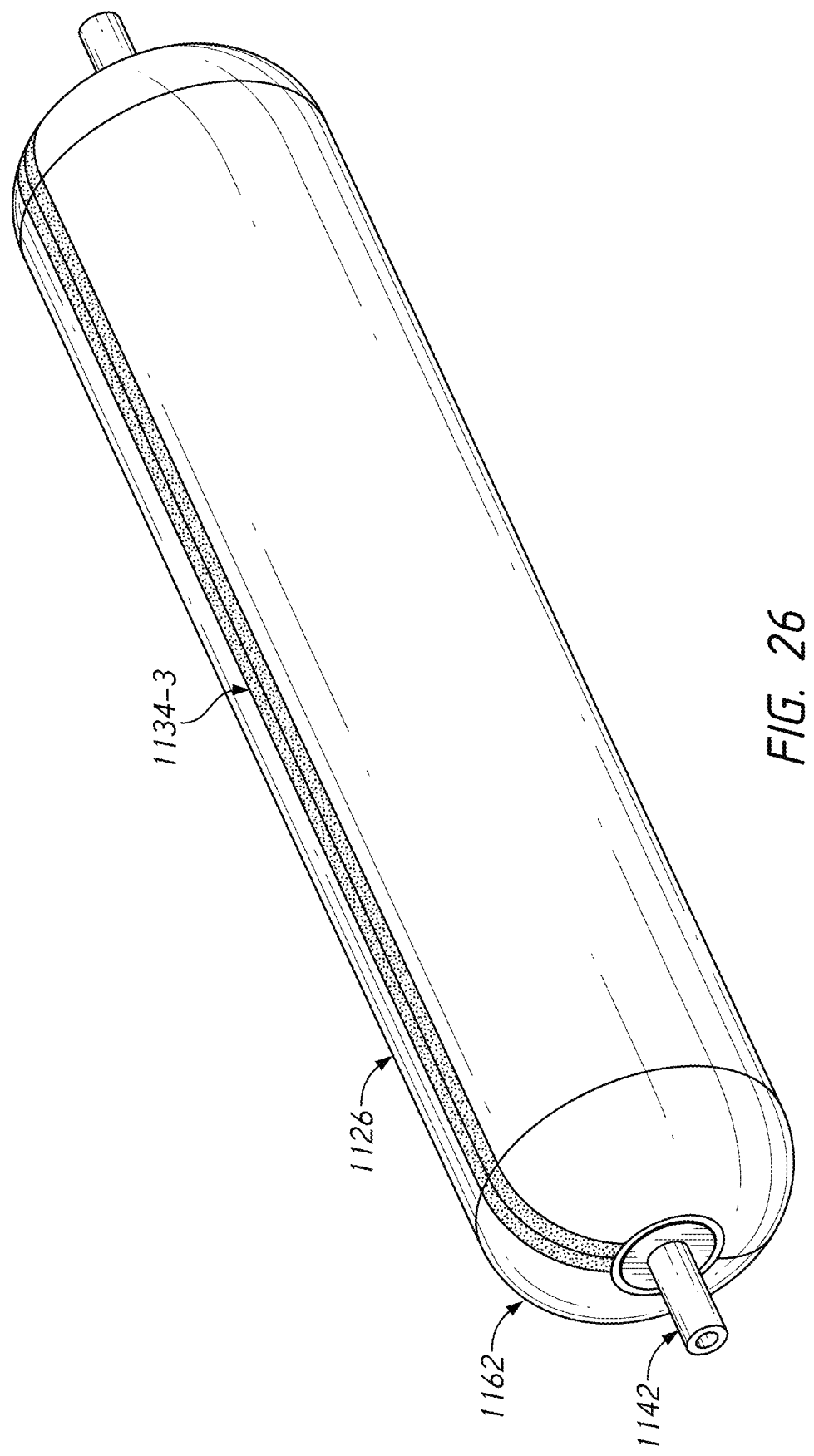
FIG. 26 illustrates a process of attaching a strip of a barrier layer material over the internal pressure enclosure of FIG. 20, a longitudinal axis of the strip aligned with a longitudinal direction of the internal pressure enclosure according to one embodiment.
Figure 27:
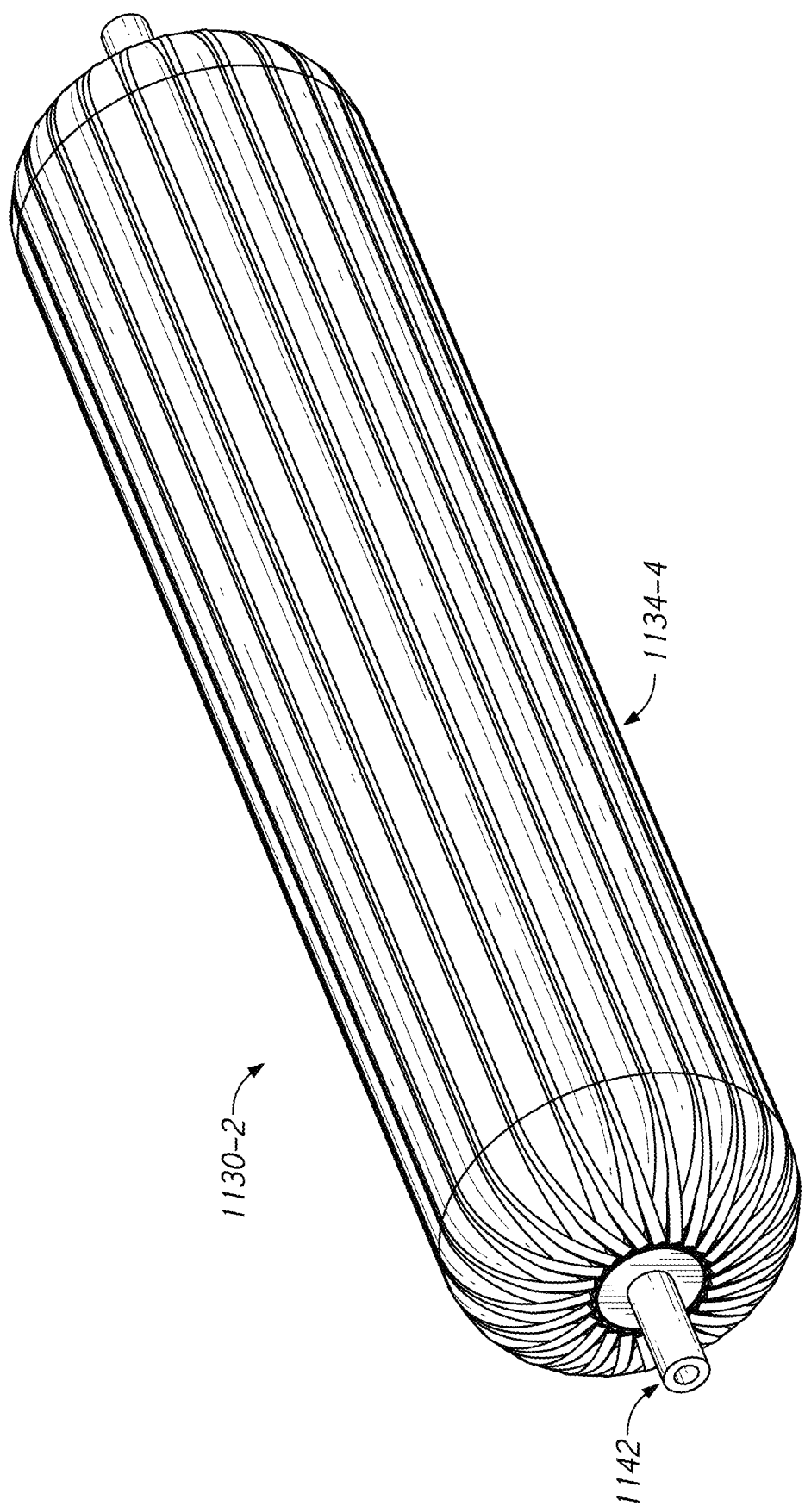
FIG. 27 illustrates a gas cylinder assembly that has a permeation barrier formed with multiple strips of barrier layer material, e.g., by repeating the process illustrated in connection with FIG. 26.

In embodiments of FIGS. 26 and 27, one or more strips (e.g., tapes, ribbons) of barrier material 1134-3 are disposed over the internal pressure enclosure 1120 along a longitudinal direction of the internal pressure enclosure 1120 to form a permeation barrier layer 1134-4 thereby to form an intermediate assembly 1130-2. In some embodiments, in the permeation barrier layer 1134-4, a strip of barrier material 1134-3 overlaps, at least in part, another strip of barrier material as shown in FIG. 27. In some embodiments, due to overlapping of two neighboring strips, the permeation barrier layer 1134-4 has a portion that is thicker than another portion.

Figure 28:
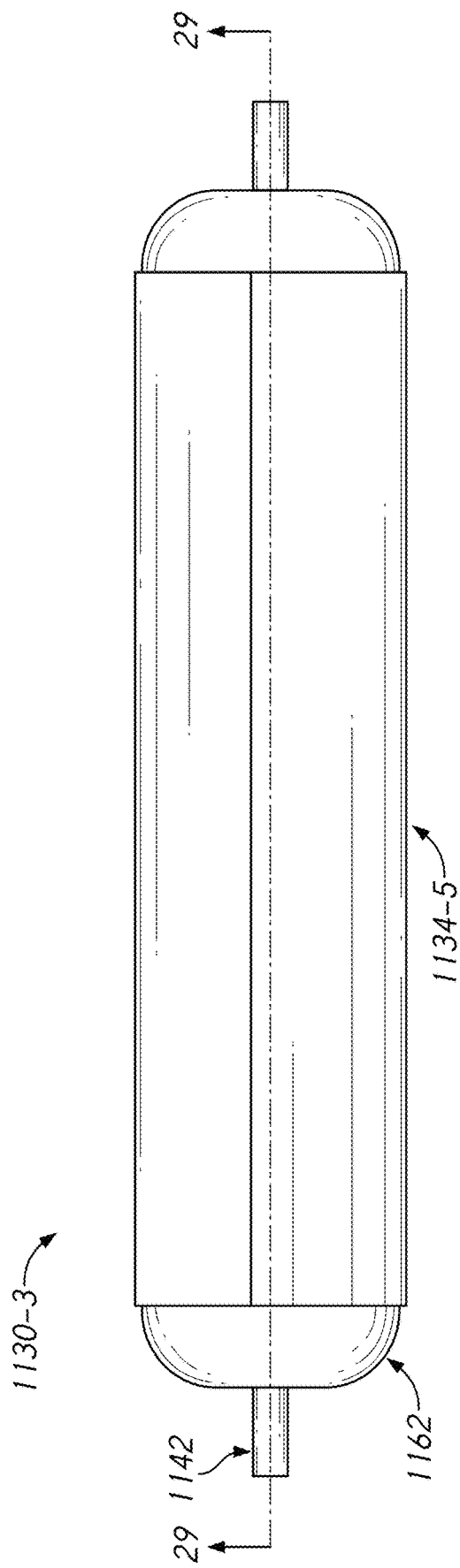
FIG. 28 shows one embodiment of a gas cylinder assembly having a sheet, e.g., a film of barrier material wrapped over a central portion of the internal pressure enclosure of FIG. 20.
Figure 29:
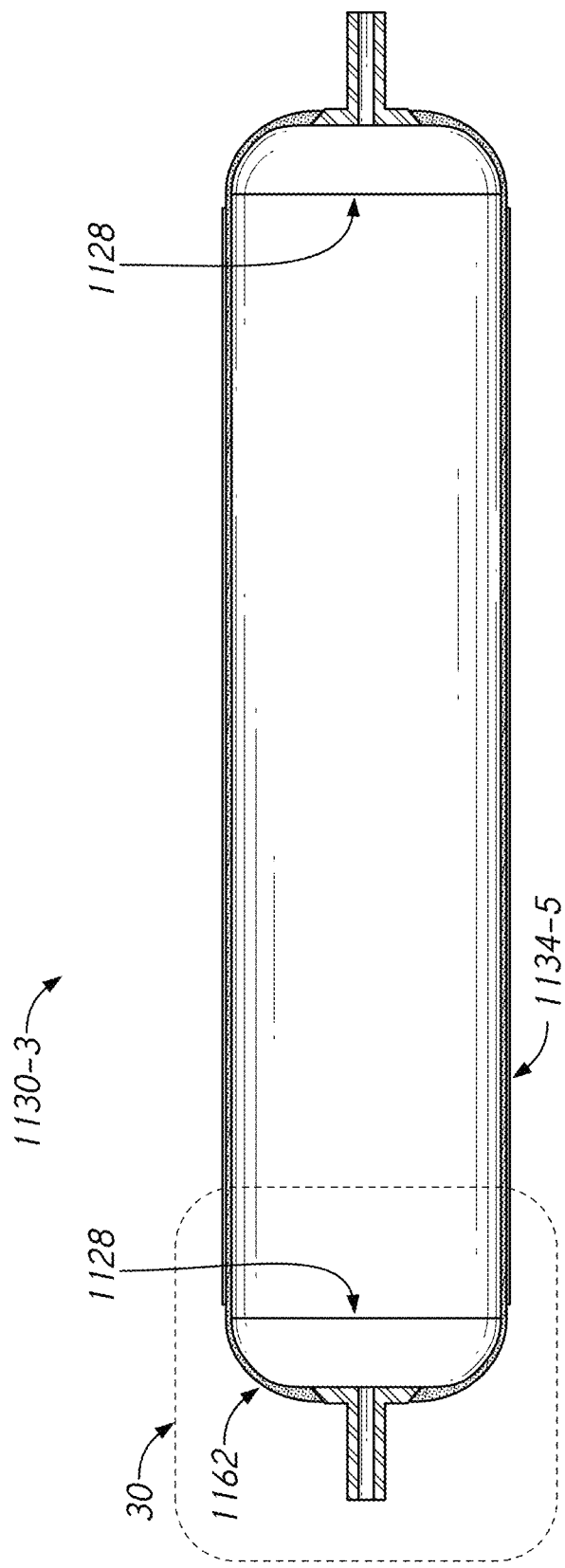
FIG. 29 is a cross-sectional view taken at section plane 29-29 shown in FIG. 28.
Figure 30:
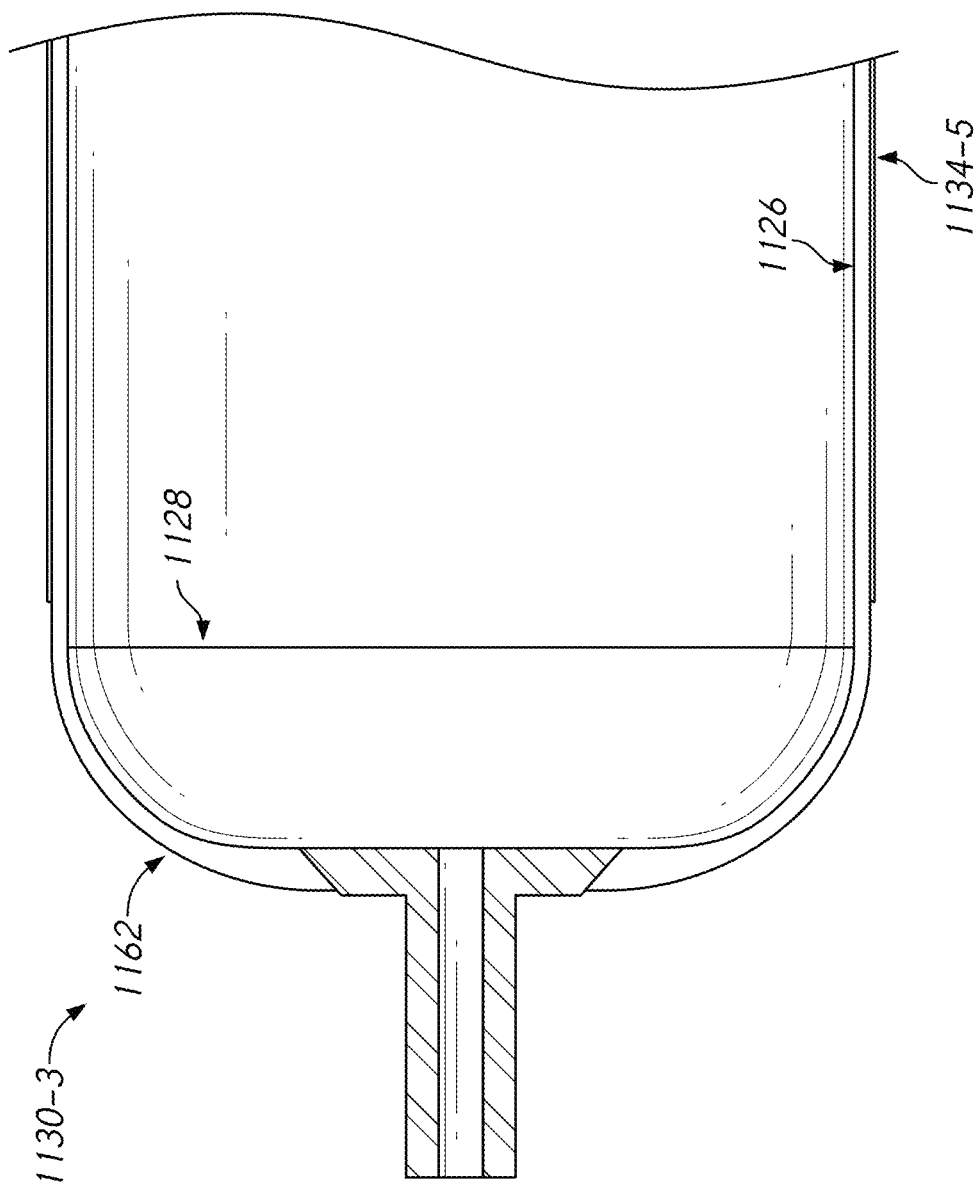
FIG. 30 is an enlarged view of detail 30 in FIG. 29.

In embodiments of FIGS. 28 to 30, one or more metal films are wrapped over the central body 1126 to form the permeation barrier layer 1134-5 and thereby to form an intermediate assembly 1130-3. In some embodiments, as shown in FIGS. 29 and 30, the permeation barrier layer 1134-5 covers the central body 1126 between the weld lines 1128 but does not cover the dome end portions 1162, 1163 such that the permeation barrier layer 1134-5 has an circumferential end that is spaced apart from the dome end portions 1162, 1163, e.g., disposed longitudinally between weld lines 1128 at which the dome end portions 1162, 1163 couple to the central body 1126. In some embodiments, the permeation barrier layer 1134-5 extends over the weld line 1128 along a longitudinal direction of the intermediate assembly 1130-3 to cover the longitudinal ends 1181, 1183 of the central body 1126 and to cover the at least part of the dome end portion 1162, 1163.

Figure 31:
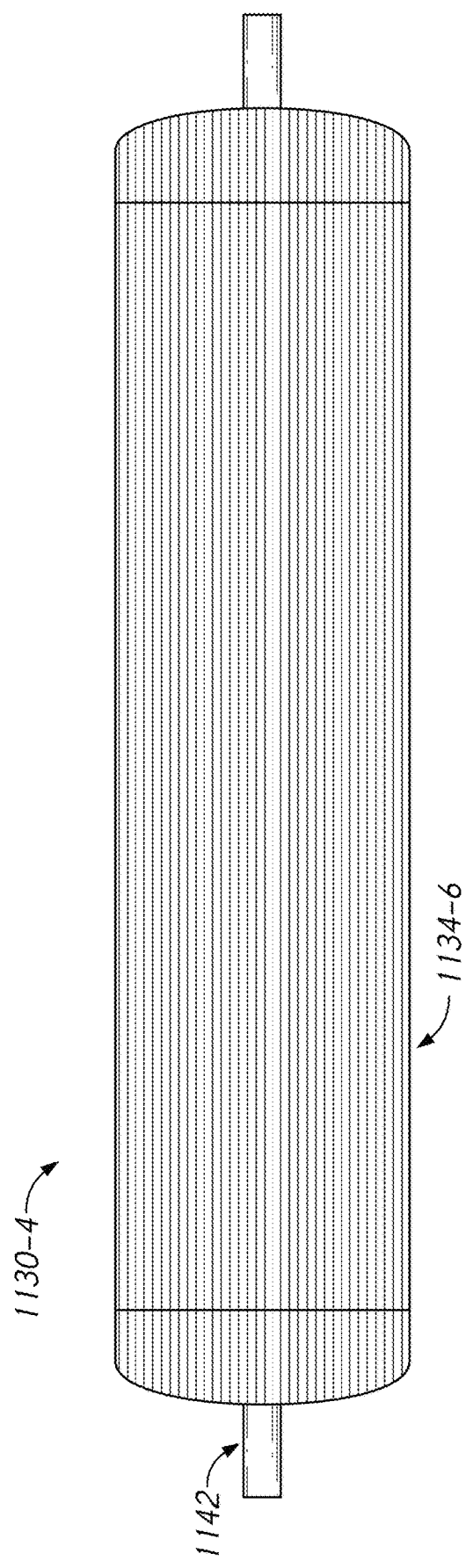
FIG. 31 shows a gas cylinder assembly having a barrier layer having a same configuration over a central portion and one or more end portions of the internal pressure enclosure of FIG. 20 according to one embodiment.

FIG. 31 illustrates further embodiments in which a permeation barrier layer 1134-6 is formed over the central body 1126 and also over the dome end portions 1162, 1163 to form an intermediate assembly 1130-4. In some embodiments, when the permeation barrier 1134-6 is formed by a single process or by repeating the same process (e.g. repeating the process of FIG. 26—attaching strips as shown in FIG. 26), the permeation barrier layer 1134-6 maintains the same configuration over the central portion 1126 and the dome end portions 1162, 1163 of the internal pressure enclosure 1120.

Figure 32:
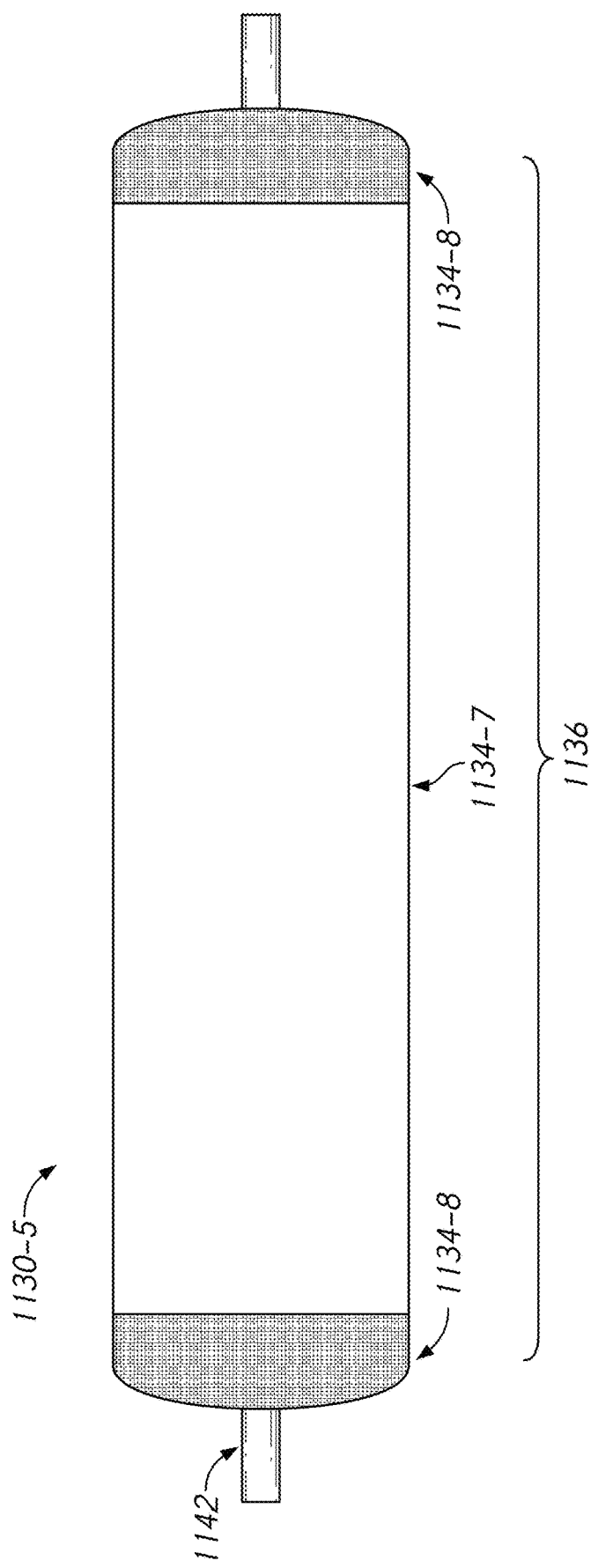
FIG. 32 shows a gas cylinder assembly having different configurations of a barrier layer over a central portion and one or both of the end portions of the internal pressure enclosure of FIG. 20 according to one embodiment.

In embodiments of FIG. 32, a permeation barrier layer 1136 placed over the internal pressure enclosure 1120 to form an intermediate assembly 1130-5. The permeation barrier layer 1136 comprises a first portion 1134-7 disposed over, e.g., covering the central body 1126 of the internal pressure enclosure 1120, and further comprises a second portion 1134-8 disposed over or covering the dome end portions 1162, 1163, of the internal pressure enclosure 1120.

In some embodiments, the first portion 1134-7 is formed using a first process, and the second portion 1134-8 is formed using a second process different from the first process to disposed the permeation barrier layer 1136 over a curved surface of the dome end portion 1162. In some embodiments, the first portion 1134-7 and the second portion 1134-8 can be formed by the same or a similar process but one can be thicker. For example, the first portion 1134-7 can be thicker than the second portion 1134-8. Or, the second portion 1134-8 can be thicker than the first portion 1134-7.

In some embodiments, the first portion 1134-7 and the second portion 1134-8 may have different configurations (e.g. mechanical structure, chemical composition). In some embodiments, when barrier material strips are attached over the central body 1126 and the dome end portions 1162, 1163 of the internal pressure enclosure 1120 (using the process shown in FIGS. 26 and 27) to form the second portion 1134-8, and subsequently additional barrier material strips are wrapped over the central body 1126 (using the process shown in FIG. 24) to form the first portion 1134-7, the permeation barrier layer 1136 is thicker over the central body 1126 than over the dome end portion 1162.

After the intermediate assemblies 1130, 1130-1, 1130-2, 1130-3, 1130-4, or 1130-5 are prepared after forming a permeation barrier layer over the internal pressure enclosure 1120, the reinforcement structure 1110 can be formed over the permeation barrier layer. In some embodiments, one or more strips (or sheets) of a carbon composite are wound over an intermediate assembly to form the reinforcement structure 1110. In some embodiments, a polymer resin is painted or sprayed on the carbon fiber reinforcement after disposing carbon fiber reinforcement over a permeation barrier layer to form the reinforcement structure 1110. In certain embodiments, a process to cure a composite material (or a resin) placed over the permeation barrier layer is performed to complete the reinforcement structure 1110.

VI. Vehicle Fluid Handling Systems

FIGS. 33-47, discussed below, illustrate a variety of embodiments of vehicles, fuel systems, and auxiliary fluid vessels, among other things. The disclosed fuel systems and/or auxiliary fluid vessels can be mounted in various locations and/or arrangements, including below the chassis (e.g., FIG. 33), behind-the-cab (e.g., FIGS. 34-39), roof mounted (e.g., FIGS. 42 and 43), tailgate mounted (e.g., FIGS. 44 and 45), side mounted (e.g., FIGS. 46 and 47), and/or the like. In addition to the side mounted examples of FIGS. 46 and 47, in some embodiments, the fuel systems and/or auxiliary fluid vessels may incorporate any of the side mount technology discussed above in Sections I-IV, with reference to FIGS. 1-14B.

Further, the fuel systems and/or auxiliary fluid vessels discussed below with reference to FIGS. 33-47 may comprise various embodiments of gas cylinder assemblies, including, for example, the various embodiments of gas cylinder assemblies discussed above in Section V, with reference to FIGS. 15-32. For example, any of the fuel tanks or pressure vessels (or portions thereof) visible in FIGS. 33, 35-38, 40, 41, 43, 45, and 47 may comprise any of the gas cylinder assemblies discussed above in Section V, with reference to FIGS. 15-32 (and/or may be manufactured using any of the manufacturing techniques discussed above in Section V, with reference to FIGS. 15-32).

Additionally, although various embodiments discussed below with reference to FIGS. 33-47 include both of (1) one or more fuel tanks (e.g., a gas cylinder intended to contain fuel for powering the vehicle) and (2) one or more auxiliary pressure vessels (e.g., a gas cylinder intended to contain pressurized air for powering an auxiliary system such as vehicle brakes), the disclosure is not limited to such embodiments. For example, any of the mounting arrangements discussed below with reference to FIGS. 33-47 (such as below the chassis, behind-the-cab, roof mounted, tailgate mounted, side mounted, and/or the like) may include or be modified to include: (1) only one or more fuel tanks, without any auxiliary pressure vessels, (2) only one or more auxiliary pressure vessels, without any fuel tanks, or (3) both of one or more fuel tanks and one or more auxiliary pressure vessels. In any of these embodiments, either or both of the fuel tanks or auxiliary pressure vessels may be constructed using various construction techniques, including but not limited to, the gas cylinder construction techniques discussed above in Section V, with reference to FIGS. 15-32.

Figure 33:
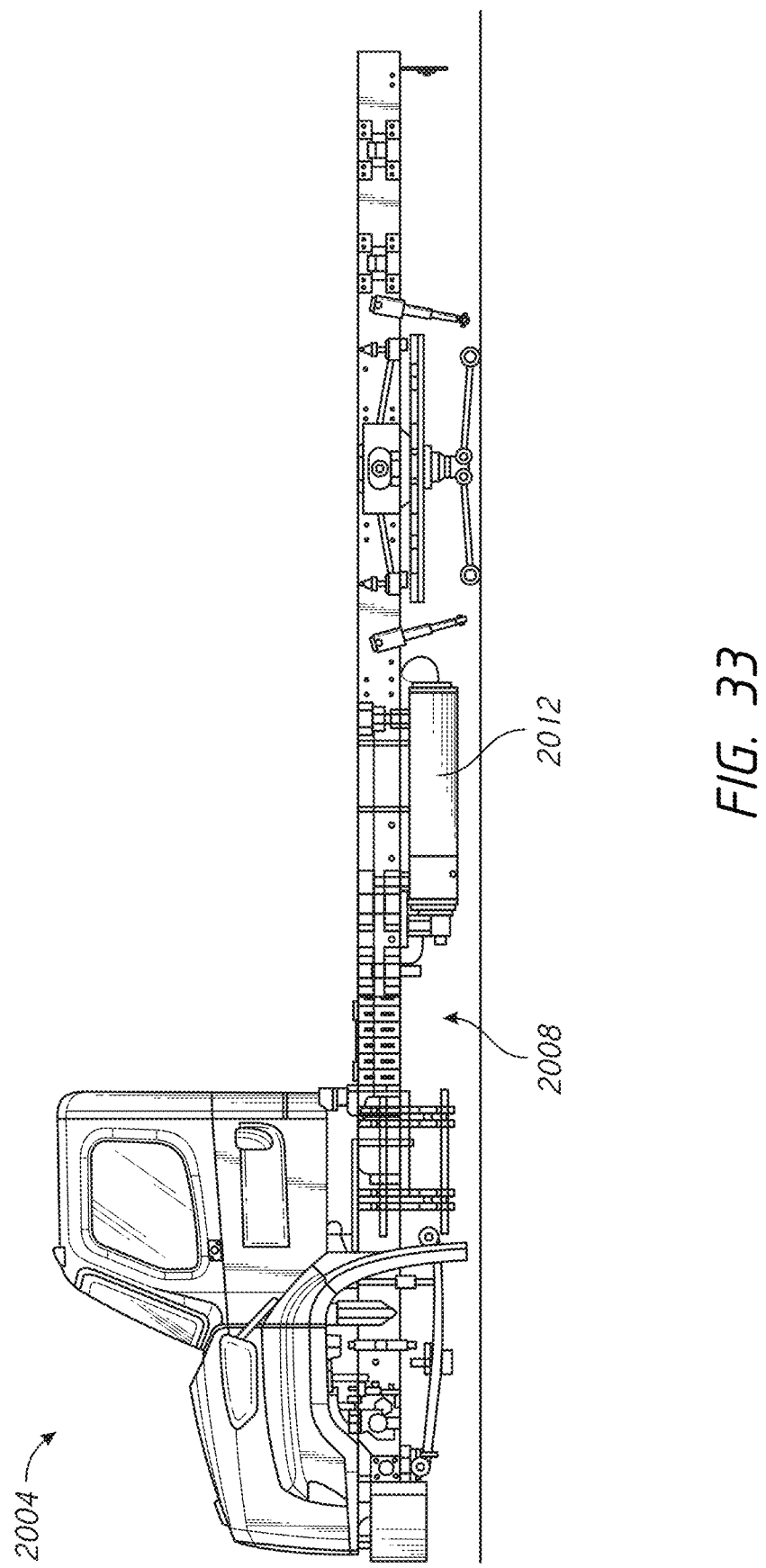
FIG. 33 shows a portion of a heavy duty truck illustrating a conventional location for a compressed air vessel.

FIG. 33 shows a conventional location for mounting a pressure vessel 2012 for a braking system to a lower portion 2008 of a chassis 2004 of a vehicle. The chassis 2004 mechanically supports the pressure vessel 2012, as well as the wheels and other components of a vehicle. The location shown is below the chassis 2004, between the forward wheels of the cab and the rear wheels of the semi-trailer. The pressure vessel 2012 can be supported by brackets or straps and supplies a fluid that is used to actuate the brakes to slow down the rotation of the wheels. The location shown is satisfactory if the space between the wheels is sufficient but leaves the pressure vessel 2012 exposed to damage by rocks or debris from the wheels or road.

Behind-the-Cab Systems

Figure 34:
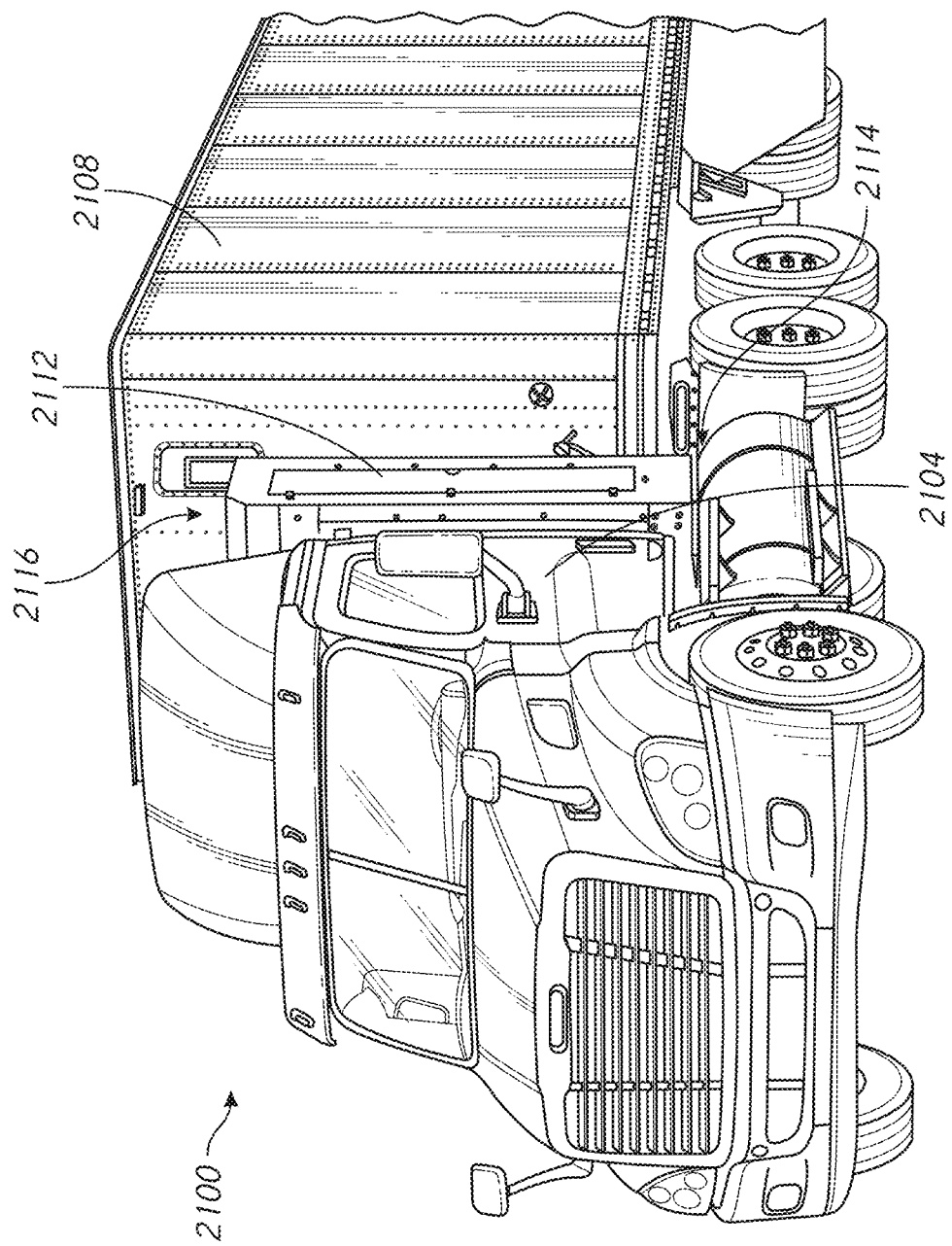
FIG. 34 is a perspective view of a heavy duty truck with a fluid storage system according to one embodiment of this application disposed behind the cab thereof.

FIG. 34 shows a vehicle 2100 that can benefit from a fluid system 2116 as claimed herein. The vehicle 2100 is a heavy duty truck capable of long range hauling, but it could be other heavy duty vehicles as discussed below. The vehicle 2100 includes a tractor unit having a cab 2104 and a semi-trailer 2108. A cowling 2112 of the fluid system 2116 can be seen disposed between the cab 2104 and the semi-trailer 2108. The system 2116 is mounted to a chassis 2114 of the vehicle 2100. The cowling 2112 encloses a number of components of the fluid system 2116 including a fuel pressure vessel 2118 and an auxiliary fluid vessel 2120 as discussed further below. The auxiliary fluid vessel 2120 preferably is able to store a working fluid at elevated pressure. In one application the vessel 2120 has a capacity of 1740 cubic inches. In another embodiment, the vessel has a capacity of about 2030 cubic inches. By integrating the auxiliary fluid vessel 2120 and the fuel pressure vessel 2118 into the fluid handling system 2116 the overall system integration of the vehicle 2100 can be greatly improved as explained further below. These advantages also apply to fuel systems that are mounted in different locations on a vehicle as discussed below.

Figure 35:
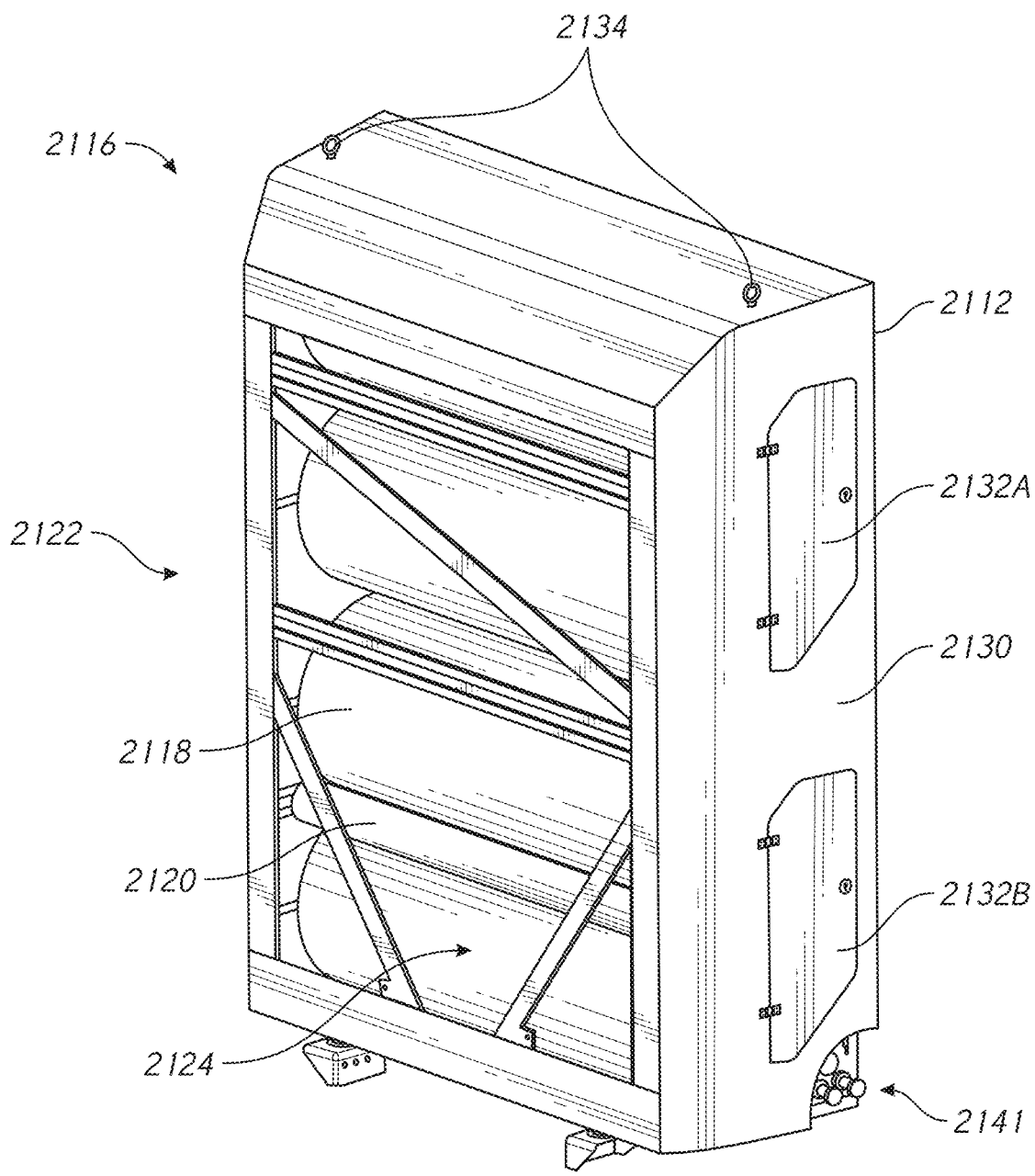
FIG. 35 is a front perspective view of a fluid storage system that can be mounted in a space behind a cab of a heavy duty truck as depicted in FIG. 34.
Figure 36:
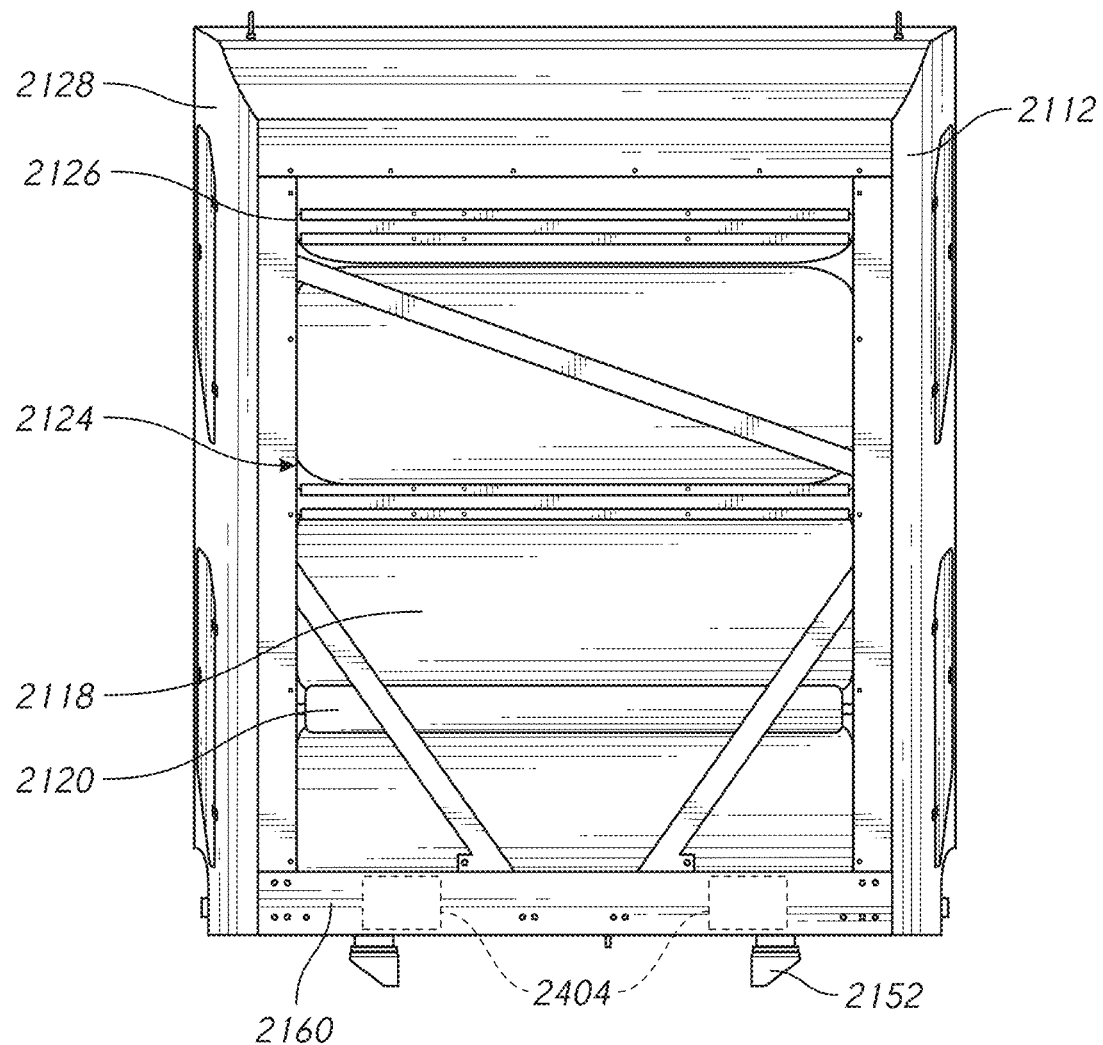
FIG. 36 is a front plan view of the fluid storage system of FIG. 35.

FIGS. 35 and 36 show certain components of the fluid system 2116 in more detail. A front portion 2122 includes one or more openings 2124 through which internal components of the fluid system 2116 are exposed. The opening 2124 can be bounded by an inner periphery 2126 of the cowling on the front portion 2122. The opening 2124 can be segmented between portions of a frame assembly of the fluid system 2116. In the illustrated embodiment, the fluid vessel 2120 is accessible through the opening 2124 so that the vessel can be inspected, serviced, and/or replaced as needed. In a behind the cab configuration the cab 2104 covers the opening 2124 to limit access to the components through the opening 2124 when the fluid system 2116 is mounted to the vehicle 2100. This improves upon existing practice by placing the auxiliary fluid vessel 2120 in an enclosed space. By leaving access through the opening 2124 that is blocked by the cab 2104, the fluid system 2116 provides a good combination of ease of access with protection of the vessel 2120. The opening 2124 also enables the fluid handling system 2116 to be lighter than if the cowling 2112 fully surrounded the fluid system 2116 on all side. In some applications, the opening 2124 is eliminated and the cowling 2112 fully surrounds the internal components of the fluid system 2116.

The cab 2104 controls flow of air around a front portion of the vehicle 2100 preventing the openings 2124 from increasing drag significantly. The cowling 2112 includes a forward portion 2128 that extends from the inner periphery 2126 to an outer periphery 2130 of the fluid storage system 2116. The forward portion 2128 may extend laterally of the cab 2104 to some extent in some applications. The forward portion 2128 may be shaped to reduce a drag contribution by the fluid handling systems 2116 in such configurations. For example, the forward portion 2128 can be inclined in a rearward direction as shown in FIG. 35 at the top or lateral edges. The system 2116 improves on existing practice by disposing the auxiliary fluid vessel out of the air stream to provide aerodynamic benefits resulting in continuous fuel savings.

The cowling 2112 can have access panels for enabling user and maintenance access to the enclosed space therein. For example, one lateral side of the outer periphery 2130 can have a plurality of access panels, e.g., an upper panel 2132A and a lower panel 2132B. One of the panels, e.g., the upper panel 2132A, can be primarily for accessing the fuel pressure vessel 2118. One of the panels, e.g., the lower panel 2132b, can provide access to an end of the auxiliary fluid vessel 2120. The access panels 2132A, 2132B also can provide access to controllers, fluid ports, and other features of the fluid system 2116, as discussed further in connection with FIG. 37. The access panels 2132A, 2132B also can provide access to controllers, fluid ports, and other features of an auxiliary fluid system, as discussed further below. Access to the auxiliary fluid vessel 2120 and a fluid system coupled therewith through the panel 2132B allows service of and/or a change in configuration of auxiliary systems that are powered by the fluid in the auxiliary fluid vessel 2120.

The fluid system 2116 can also have one or a plurality of handling members 2134 accessible on an outside surface of the cowling 2112. The handling members 2134 can include one or a plurality of hooks or eye-bolts. The handling members 2134 preferably are on a top side of the system 2100, such that the system 2100 can be suspended by cables or other tension members and lowered thereby into position. Other handling members 2134 can be provided. The handling members 2134 enable the fluid system 2116 to be hoisted onto the vehicle 2100 or removed therefrom for repair, reconditioning or replacement. For example, as discussed above, the auxiliary fluid vessels 2120 are accessible through the opening 2124. By lifting the system 2116 using the handling members 2134, the vessel 2120 can be inspected, serviced and repaired. The handling members 2134 are advantageous for applications where the fluid system 2116 is retrofitted to the vehicle 2100. The handling members 2134 can be used in original assembly of the vehicle 2100 as well.

FIGS. 35-38 show different aspects of a frame assembly 2140 of the fluid storage system 2116. The frame assembly 2140 is at least partially disposed within the cowling 2112. In the illustrated embodiment, the frame assembly 2140 is entirely enclosed within the cowling 2112 other than an exposed portion 2141 coupled with an exposed connection panel. The frame assembly 2140 has a lower portion 2144 and an upper portion 2148. The fuel storage system 2116 is configured to be mounted to or to couple with a chassis 2114 of the vehicle 2100. The fuel storage system 2116 can be couple with the chassis 2114 at or below the lower portion 2144. For example, the lower portion 2144 can have one or a plurality of brackets 2152 that are configured to couple the frame assembly 2140 with the chassis 2114 of the vehicle 2100. The fluid system 2116 can be lowered by a hoist coupled with the handling members 2134 on the chassis 2114 until one face of each of the brackets 2152 is aligned with a mounting portion of the chassis. Thereafter, the brackets 2152 can be secured to the chassis 2114.

Figure 37:
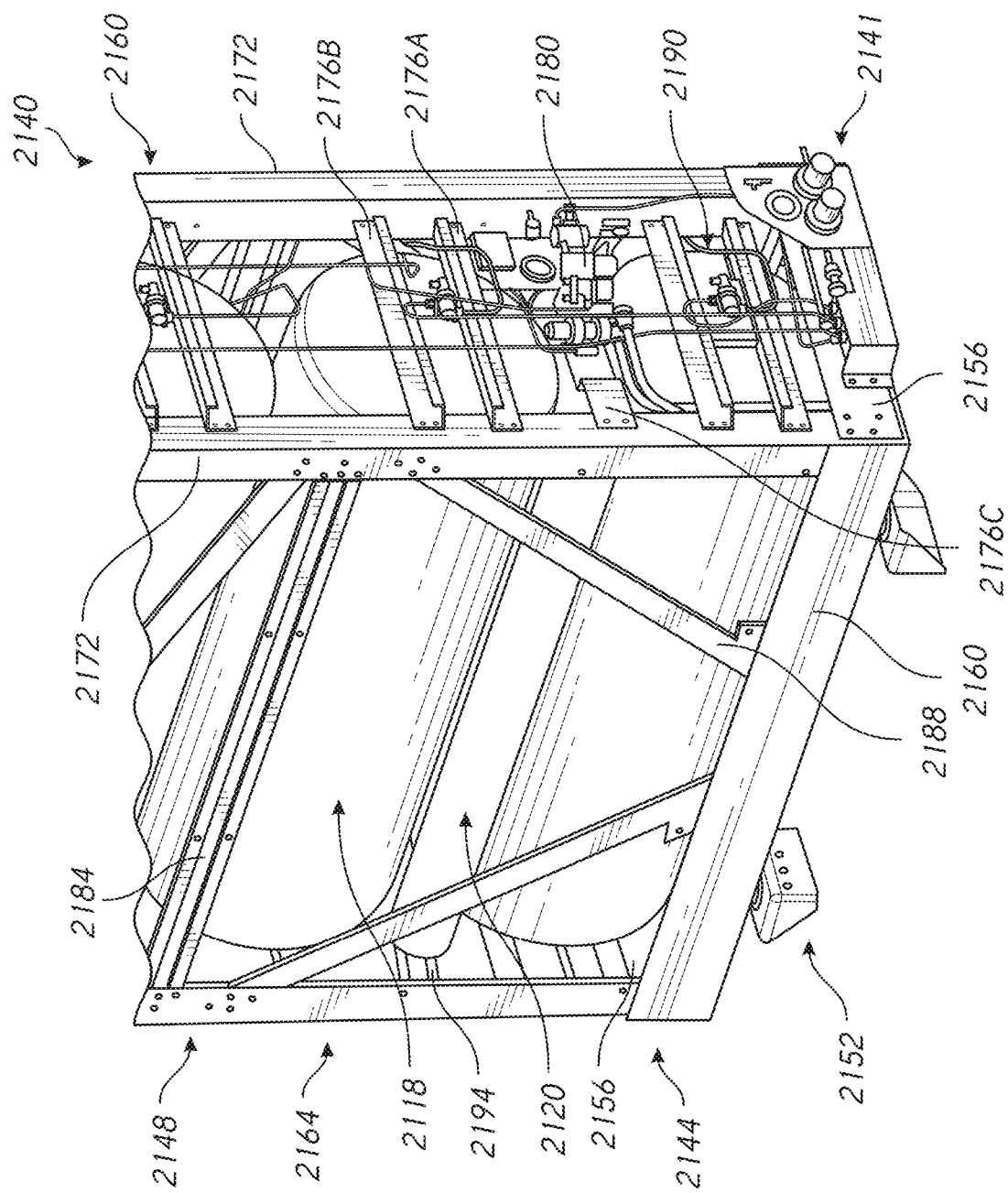
FIG. 37 is a detail front perspective view of the fluid storage system of FIG. 35 with the cowling thereof removed for enhanced clarity of view of the internal components of the system.
Figure 38:
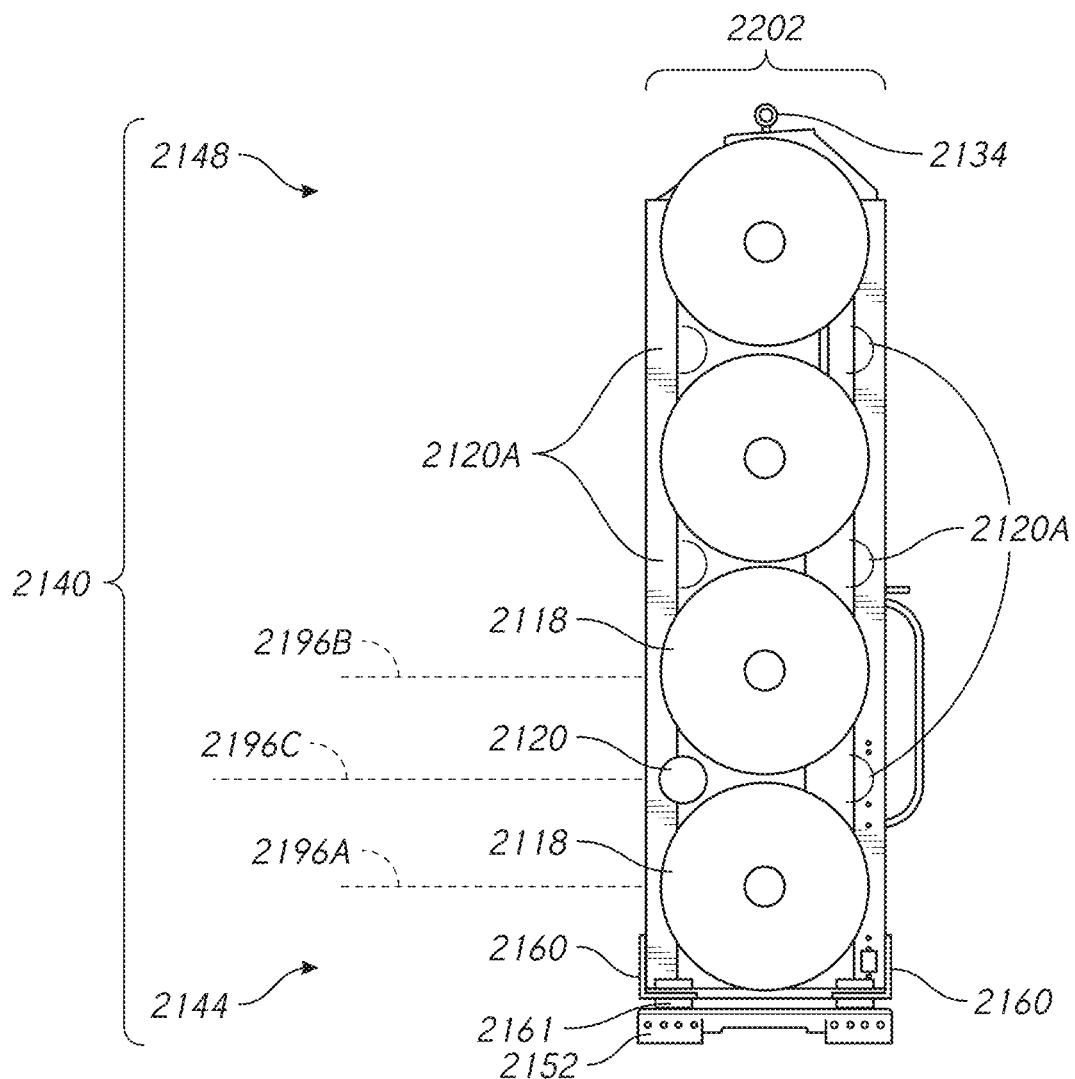
FIG. 38 is side view of the fluid storage system of FIG. 35 with the cowling thereof removed showing a number of auxiliary fluid pressure vessel support locations.

FIG. 37 shows an embodiment in which the lower portion 2144 includes first and second lateral members 2156 and first and second traverse members 2160. One of the lateral members 2156 is disposed on aside of the frame assembly 2140 corresponding to the driver side of the vehicle 2100, e.g., in a position below components accessible through the panels 2132A, 2132B. Another lateral member 2156 is disposed on the opposite lateral side of the frame assembly 2140. FIG. 38 shows the transverse members 2160. The lateral ends of the transverse members 2160 are coupled with the first and second lateral members 2156. In the illustrated embodiment the lateral members 2156 comprise a plate-like structure and the transverse members 2160 comprise L-brackets. A damper 2161 (see FIG. 38) can be disposed between the transverse members 2160 and the brackets 2152 to isolate the fluid system 2116 from vibration and shock from the road, at least to some extent. The brackets 2152 can be assembled to the transverse members 2160 and thus can be part of the lower portion 2144 of the frame assembly 2140 in some embodiments. In other embodiments, the brackets 2152 can be part of a standard chassis component to which the lower portion 2144 of the frame assembly 2140 is to be coupled.

The upper portion 2148 of the frame assembly 2140 can have any suitable configuration. For example, the upper portion 2148 can have first and second upright frames 2160, 2164. The first and second upright frames 2160, 2164 are disposed on opposite lateral sides of the frame assembly 2140. The lateral member 2156 disposed beneath the components accessible through the panels 2132A, 2132B can be coupled with or can be a lower portion of the first upright frame 2160. The lateral member 2156 disposed opposite these components can be coupled with or can be a lower portion of the second upright frame 2164. The first and second upright frames 2160, 2164 are located such that when the fluid system 2116 is mounted to the chassis 2114 the first upright frame 2160 is on the driver side of the vehicle and the second upright frame 2164 is on the passenger side of the vehicle. The opposite placement is also possible. In one embodiment, one of the frame members 2160, 2164 supports components of a fluid system including the auxiliary fluid vessel 2120 in a manner allowing access thereto through the panels 2132A, 2132B or at the exposed portion 2141.

The upright frames 2160, 2164 preferably include mounting features for creating a space to position the auxiliary fluid vessel 2120 and for supporting various components. For example, the upright frames 2160, 2164 can include a plurality of elongate members 2172 that have lower ends coupled with the lower portion 2144 of the frame assembly 2140 and upper ends disposed way from the lower ends. The elongate members 2172 can be L-brackets in one embodiment. The elongate members 2172 can partially define the perimeter of a space for disposing and, in some embodiments, enclosing the auxiliary fluid vessel 2120. A plurality of lateral members 2176 can be coupled to elongate members 2172. The lateral members 2176 can have forward ends coupled with a forward elongate member 2172 and rearward ends coupled with a rearward elongate member 2172.

In one configuration the lateral members 2176 provide one or both of structural reinforcement and component supporting functions to the upright frames 2160, 2164 and to the frame assembly 2140. FIG. 37 shows another configuration in which at least some of the lateral members 2176 provide multiple functions. A first lateral member 2176A comprises a C-shaped configuration in which a first side is coupled with lateral surfaces of the forward and rearward elongate members 2172. The C-shaped lateral member 2176A provides a second side adjacent to the first side. The second side can have a horizontal surface extending laterally from the first side. The horizontal surface can support the fuel pressure vessel 2120 as discussed further below. The C-shaped lateral member 2176A provides a third side adjacent to the second side. The third side can be configured to couple with a portion of a fluid manifold as discussed further below. A second lateral member 2176B can be provided in some embodiments. The second lateral member 2176B can have a configuration similar to that of the first lateral member 2176A, e.g., a C-shaped configuration. In one arrangement, the second lateral member 2176B is inverted compared to the first lateral member 2176A. The second lateral member 2176B can have a horizontal surface adjacent to a lower end of a first side of the member 2176B. The horizontal surface of the second lateral member 2176B can extend laterally of the first side of the second lateral member 2176B. The horizontal surface of the second member 2176B can be positioned to face a horizontal surface of the first lateral member 2176A. The horizontal surfaces of the first and second lateral members 2176A, 2176B can support pressure vessels directly or indirectly as discussed further below. Although shown supporting the fuel pressure vessel 2118 a pair of support members similar in structure to the members 2176A, 2176B could be provided to support the auxiliary fluid vessel 2120.

A third member 2176C can be configured for supporting fluid manifold components 2180. The fluid manifold components 2180 can include regulators, pressure relief devices, or other components of a state of the art fuel system in one embodiment. The fluid manifold components 2180 can include conduit, couplers or fluid line junctions for auxiliary fluid systems in another embodiment. The fluid manifold components 2180 can include components of both a fuel system and an auxiliary fluid system in another embodiment. In one compact arrangement the third member 2176C is configured to enable the fluid manifold components 2180 to be recessed into the upright frame 2160. A recessed configuration can allow the fluid manifold components 2180 be at least partially inward of a plane of the lateral sides of the elongate members 2172.

One approach to recessing the components 2180 is to form the third member 2176C with a bight along the direction from the forward to rearward. The bight can be seen in a top view of the third member 2176C. The bight has a first portion that extends away from the lateral side of the upright frame 2160 toward a transverse center of the fluid system 2116, a second portion that extends along the forward-to-rearward direction, and a third portion that extends from the second portion toward the lateral side of the upright frame 2160. The first portion and the third portion are coupled with the forward and rearward elongate members 2172 respectively. The extent of the first and third portions controls the depth of recessing of the second portion of the third member 2176C. The recessing can be at least 25% of the dimension of the fluid manifold components 2180 as measured in the transverse direction. The recessing can be at least 50% of the dimension of the fluid manifold components 2180 as measured in the transverse direction. The recessing can be at least 100% or more of the dimension of the fluid manifold components 2180 as measured in the transverse direction. The fluid manifold components 2180 can be nested into the area at least partially surrounded by the bight of the third member 2176C. The nesting of the fluid manifold components 2180 provides some protection for these components and also reduces the width of the system 2116 overall. Reduced width can contributed to weight reduction and to aerodynamic drag contribution by the system 2166 to the vehicle 2100.

In the illustrated embodiment, the lateral members 2176A, 2176B, and 2176C are all mounted to outside surfaces of the elongate members 2172. In other embodiment, the lateral members 2176A, 2176B, and 2176C can be coupled with inside surfaces of the elongate members 2172, e.g., the side facing the space surrounded by the frame assembly 2140.

FIG. 37 shows that in one embodiment, of the first and second upright frames 2160, 2164 each have a fuel pressure vessel support 2190 and an auxiliary fluid pressure vessel support 2194. The fuel pressure vessel support 2190 is configured to receive and retain an end portion 2304 (See FIG. 40) of the fuel pressure vessel 2118. For example, in one embodiment a mounting block assembly is provided in which a first block portion is configured to support a boss 2308 of the end portion 2304 from beneath. The first block can have a semi-cylindrical surface upon which a lower portion of the boss 2308 rests in a free state. The block assembly can have a second block that is placed over the boss 2308 to cover the boss. For example, the second block can have a semi-cylindrical surface that can be disposed over a top surface of the boss 2308. The first and second blocks of the block assembly can form a cylindrical surface that surrounds the boss 2308. The first block can be secured to the first lateral members 2176A. The second block can be secured to the second lateral member 2176B directly above the first lateral member 2176A to which the first block is secured. The block assembly enables the lateral members 2176A, 2176B to indirectly support the boss 2308 and thereby the fuel pressure vessel 2118.

In one embodiment, a block assembly is used to support the end portion 2304 and a block assembly is used to support the end portion 2306, which is an end portion of the fuel pressure vessel 2118 opposite the end portion 2304. The end portion 2304 will usually be supported in the fluid system 2116 adjacent to the location of the access panels 2132A, 2132B of the cowling 2112. This allows a user to access fill and bleed ports 2316, 2320 of the fuel pressure vessel 2118 as needed. The ports 2316, 2320 can be directly accessed or can be in fluid communication with a fluid line that is remote from the ports 2316, 2320. This would permit the pressure vessel 2118 to be mounted in the opposite orientation such that the ports 2316, 2320 are not close to or accessible through the panel 2132A, 2132B.

The auxiliary fluid vessel 2120 can be supported in the same manner as the fuel pressure vessel 2118, for example, by a block assembly configured to form a cylindrical surface that surrounds a boss or other end portion of the vessel 2120. The block assembly can be mounted on the same or a similar structure to the members 2176A, 2176B. As discussed below, in certain embodiments to improve the integration of the auxiliary fluid vessel 2120 in the confined space of the cowling 2112 the vessel 2120 can be mounted in a different manner than the fuel pressure vessels 2120.

Figure 43:
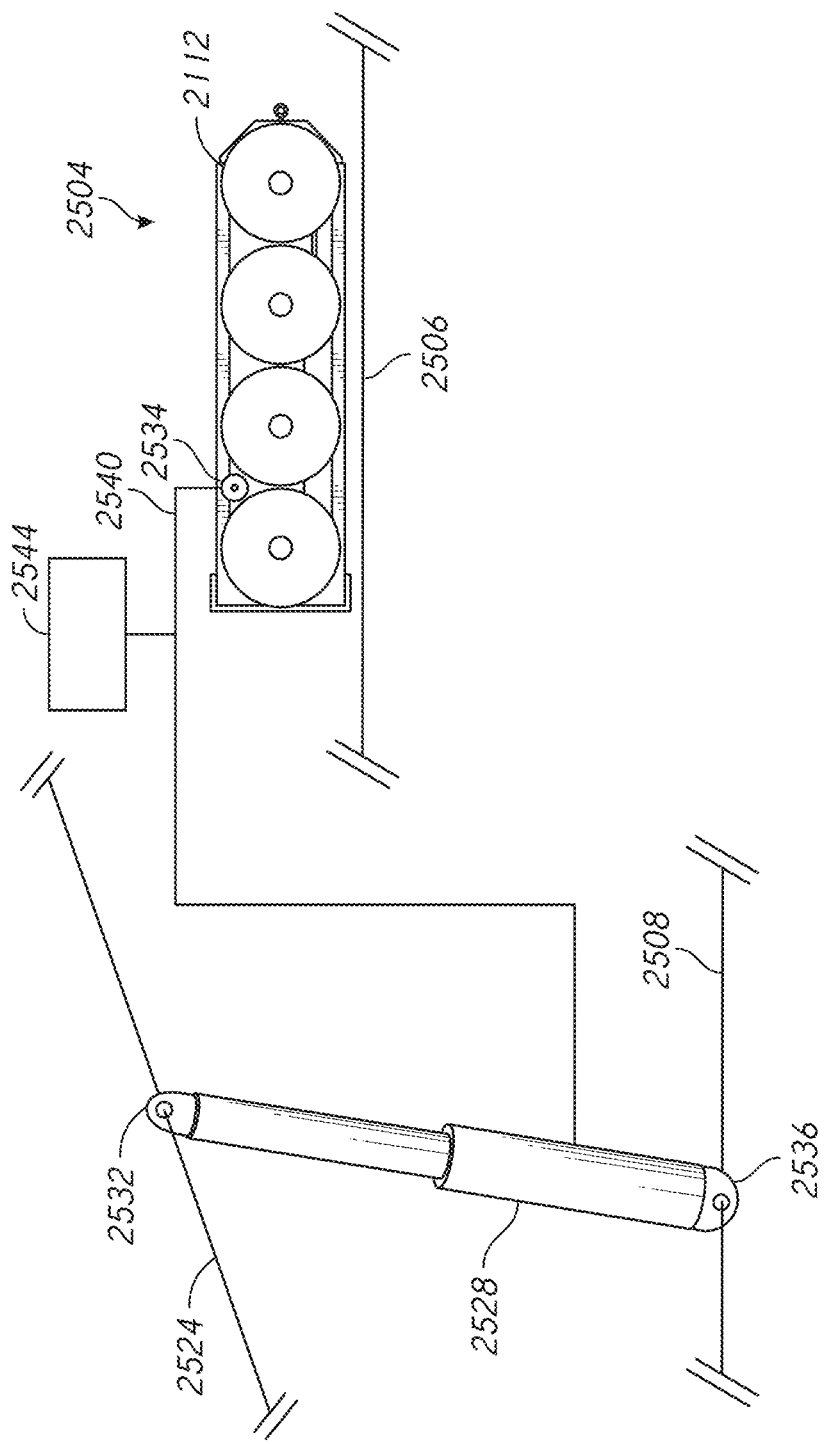
FIG. 43 illustrates another auxiliary component that can be coupled with the auxiliary fluid pressure vessel of the fluid storage system of the garbage truck of FIG. 42.
Figure 45:
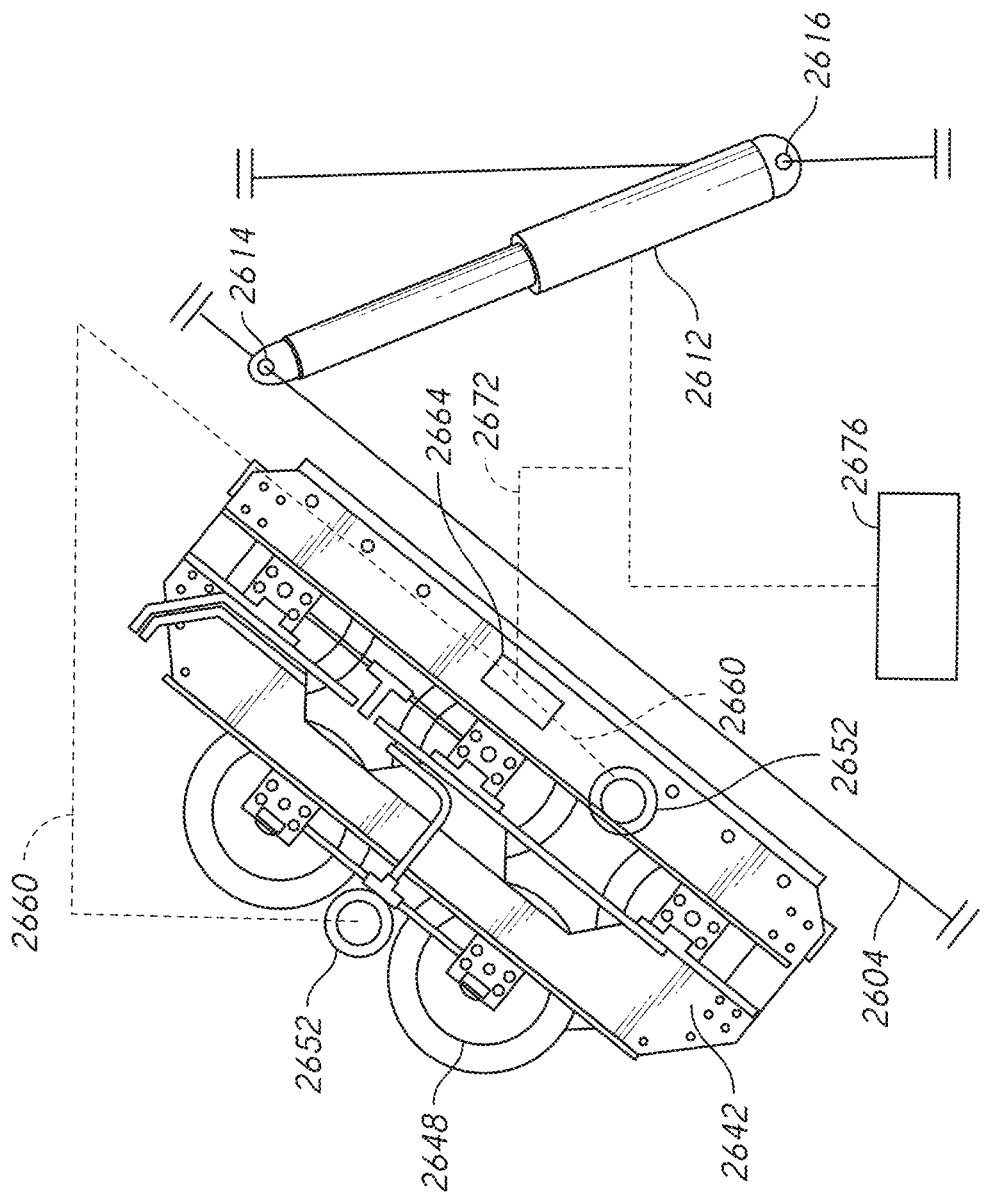
FIG. 45 illustrates a system including a component powered by a fluid vessel disposed in the tail-gate mounted fluid storage system of FIG. 44.

The fluid vessels 2118, 2120 preferably are mounted to the frame assembly 2140 in a compact array. The fluid system 2116 can have a plurality of fuel pressure vessel supports 2190 on each of the first upright frame 2160 and the second upright frame 2164 to support a plurality of fuel pressure vessels in a compact array. FIG. 38 shows that the compact array can include a vertically oriented array. The vertically oriented array can include providing a plurality of, e.g., four, fuel vessels 2120 aligned in a vertical plane. In one instance the central longitudinal axes of the pressure vessels 2120 can be disposed on a common vertical plane. FIG. 43 shows that the central longitudinal axes of the pressure vessels 2120 can be disposed on a common horizontal plane. FIG. 45 shows that the central longitudinal axes of the pressure vessels 2120 can be disposed on a common plane that is not vertical or horizontal but generally along a surface of the vehicle that is angled to one or both of these planes. A line connecting the central longitudinal axes of the pressure vessels 2120 can be arcuate, e.g., following a contour of a tailgate or other curved surface of a vehicle. In such embodiments, a central longitudinal axis of the fluid vessels 2118 may be spaced away from a line connecting the central longitudinal axes of two adjacent fuel vessels 2120.

FIG. 38 shows that in one embodiment a fuel pressure vessel 2118 at a first, e.g., a lowest, elevation 2196A can be disposed immediately below a second fuel pressure vessel 2118 at a second elevation 2196B. A compact arrangement of the fluid vessels 2118, 2120 can be provided by mounting the auxiliary fluid vessel 2120 at a third elevation 2196C that is above the first elevation 2196A and that is below the second elevation 2196B. In addition, the fluid vessel 2120 can be arranged away from the plane of the central axes of the fluid pressure vessels 2118 at the first and second elevations. For example, the central longitudinal axis of the auxiliary fluid vessel 2120 can be located away from, e.g., forward of, the central longitudinal axes of one or both of the fluid pressure vessels 2118 at the first and second elevations. The central longitudinal axis of the auxiliary fluid vessel 2120 can be located rearward of the central longitudinal axes of one or both of the fluid pressure vessels 2118 at the first and second elevations.

In one embodiment the auxiliary fluid vessel 2120 can be nested in with two fuel pressure vessels 2118. Nest means, broadly, that the auxiliary fluid vessel 2120 is received in a space between the two fuel pressure vessels 2118. For example, FIG. 38 shows that an area can be bounded by outer surfaces of two fuel pressure vessels 2118 and a forward portion of the frame assembly 2140. The auxiliary fluid vessel 2120 can be positioned in this area. The area so bounded can be further bounded by the forward-most portion of the two fuel pressure vessels 2118. In one embodiment, a vertical line intersecting an outer periphery of a first fuel pressure vessels 2118 at the first elevation 2196A and also intersecting an outer circumference of a second fuel pressure vessels 2118 at the second elevation 2196B also intersects the auxiliary fluid vessel 2120. The central longitudinal axis of the auxiliary fluid vessel 2120 can be located at this line. The central longitudinal axis of the auxiliary fluid vessel 2120 can be located between this line and a vertical plane intersecting the central longitudinal axis of the fuel pressure vessels 2118 at the first elevation 2196A and the fuel pressure vessels 2118 at the second elevation 2196B. These arrangements allow the cowling 2112 to extend nearly tangentially to the outer periphery of the fuel pressure vessels 2118 while at the same time enclosing the auxiliary fluid vessel 2120. These arrangements allow the auxiliary fluid vessel 2120 be positioned in a fuel system without significant enlargement or modification of the cowling 2112.

FIG. 38 shows that further fluid vessels can be provided in certain embodiments. A third fuel pressure vessel 2118 can be disposed at a fourth elevation above the second fuel pressure vessel 2118. A fourth pressure vessel 2118 can be disposed at a fifth elevation above the third fuel pressure vessel 2118. One or a plurality of additional fluid vessels 2120A can be provided in spaces similar to those discussed above. By providing a number of additional fluid vessels 2120A, the volume of fluid available for an auxiliary fluid system can be increased. By providing additional fluid vessels 2120A, the size of individual vessels 2120, 2120A can be reduced while still meeting the volume demands of a system.

The illustrated embodiments provide that both the first frame 2160 and the second frame 2164 support the fuel pressure vessel 2188 at fuel pressure vessel supports 2190. In another embodiment, at least one of the first frame 2160 and second frame 2164 has a fuel pressure vessel support 2190 and an auxiliary fluid pressure vessel support 2194. In another embodiment, only one of the first frame 2160 and the second frame 2164 has a fuel pressure vessel support 2190 and an auxiliary fluid pressure vessel support 2194. Other variations are possible. The auxiliary fluid pressure vessel support 2194 is spaced apart from the fuel pressure vessel support, as discussed further below.

The frame assembly 2140 can be strengthened by providing a number of braces, e.g., transverse braces 184 and/or disposed between the first and second upright frames 2160, 2164.

FIGS. 37 and 38 show further details of how the fuel pressure vessel 2118 and the auxiliary pressure vessel 2120 are integrated in the space defined by the frame assembly 2140. FIG. 38 shows that a front-to-back profile 2202 can be provided that yields a compact arrangement suitable for a behind the cab configuration. This arrangement provides a compact horizontal arrangement. FIG. 43 shows that in certain application a compact vertical arrangement is preferred. A compact vertical arrangement is preferable for roof-mounted systems.

Figure 39:
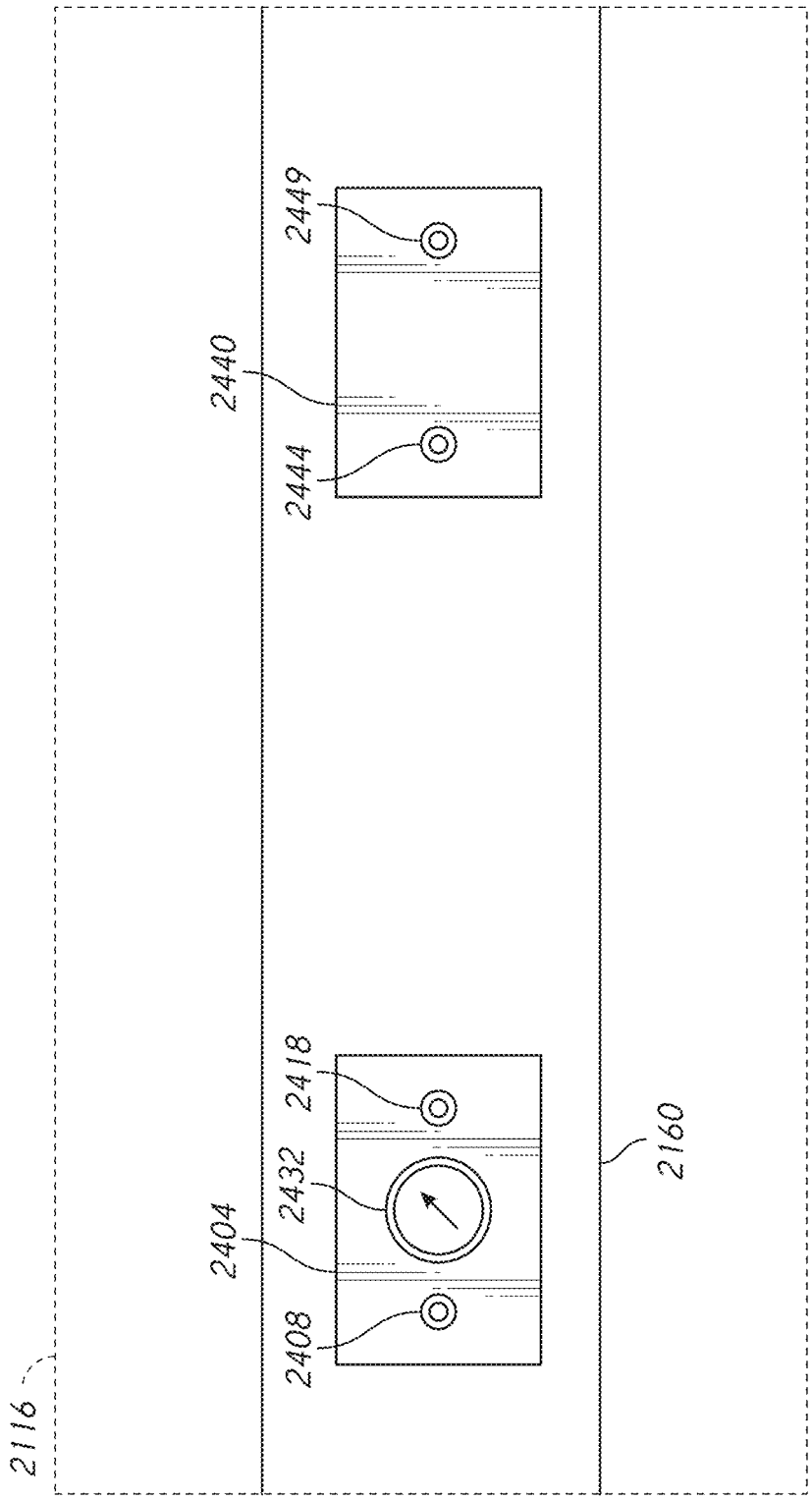
FIG. 39 shows a portion of a manifold that can be coupled with one or more pressure vessels of the fluid storage system of FIG. 35.
Figure 41:
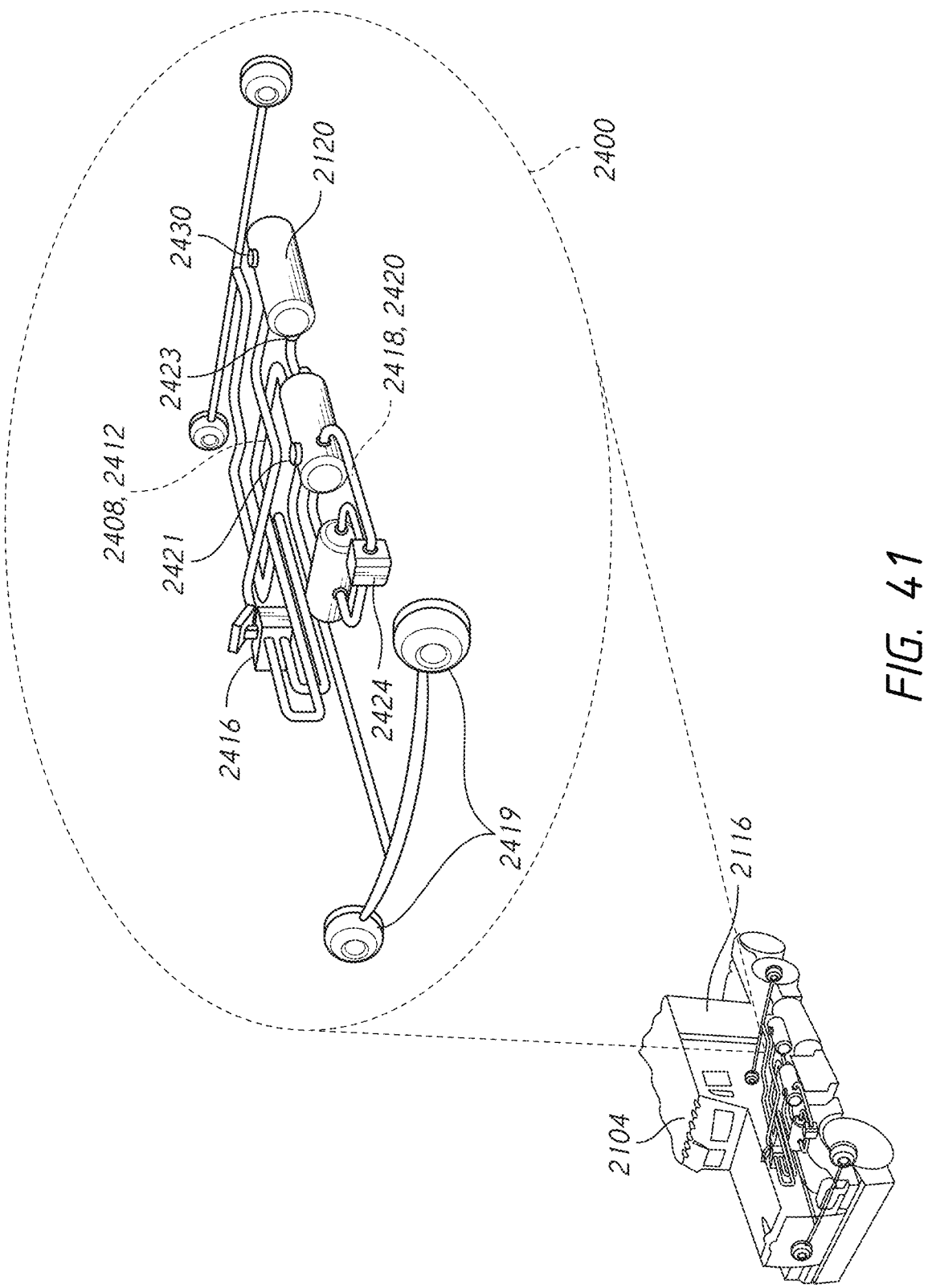
FIG. 41 illustrates one auxiliary component that can be coupled with an auxiliary fluid pressure vessel of the fluid storage system of FIG. 35.

FIGS. 36, 39, and 41 illustrate further aspects of a fluid system 2400 that can be at least partially integrated into the space surrounded by the frame assembly 2140 and/or the cowling 2112. In one embodiment, a forward portion of the fluid system 2116 includes an access panel 2404 for coupling the auxiliary fluid vessel 2120 with other components of the fluid system 2400. The panel 2404 can be formed at or through one of the transverse members 2160. The panel 2404 can include one or more connection ports to couple the vessel or vessels 2120 with other components of the fluid system 2400. The panel 2404 can include a first port 2408 coupled to a fluid line 2412 that extends between a foot valve 2416 and the vessel or vessels 2120. When the foot valve 2416 is depressed the pressure in the fluid line 2412 is communicated to brake lines coupled with brake chambers 2419. The pressure can be communicated to some or all of the wheels of the vehicle 2100. The panel 2404 can include a second port 2418 that can be coupled with a fluid line 2420 that extends from a compressor 2424 to the vessel or vessels 2120. FIG. 41 illustrates that the fluid system 2400 can have two auxiliary fluid vessels 2120. Both of these vessels can be disposed within the cowling 2112. Components disposed outside the cowling 2112 can communicate with the vessels 2120 via the panel 2404. The fluid system 2400 can also include an indicator 2430 providing some diagnostic information about the system 2400. The indicator 2430 is shown schematically associated with one of the pressure vessels 2120. The indicator 2430 can include a sensor located inside the cowling 2112, a read-out 2432 on the panel 2404, a read-out in the cab 2104 or any combination of these components or locations. The panel 2404 is shown in more detail in FIG. 39. The system 2400 also can have one or more valves. For example, a bleed valve 2421 can be provided within the cowling 2112. Additionally, one or more check valves 2423 can be provided inside the cowling 2112 to regulate flow.

FIG. 39 also shows that a secondary panel 2440 can be provided with a first port 2444 and a second port 2448. The first port 2444 can be coupled with a valve or switch for powering a second fluid system, such as an air horn (not shown). The second port 2448 can be coupled with a source of fluid, such as air to supply a line coupled with the first port 2444. The second port 2448 can be coupled with an air compressor, for example. The first and second panels 2404, 2440 can be independently coupled with one, two or more than two independent fluid vessels 2120 through manifolds. In other embodiments, a common manifold can be provided that channels the flow of fluid to and from the vessels 2120.

Roof Mounted Systems

Figure 42:
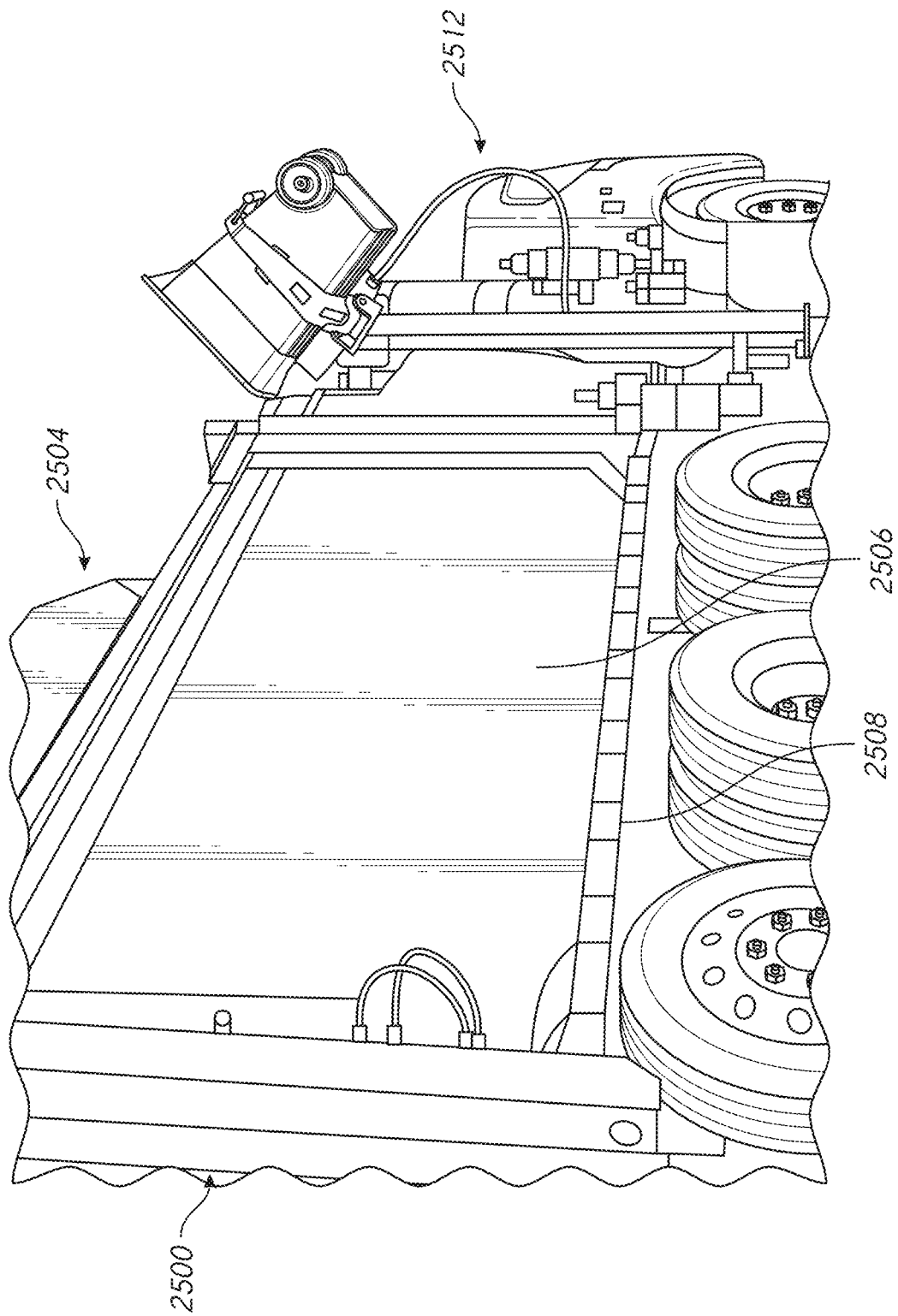
FIG. 42 shows a garbage truck with a roof mounted fluid storage system.

FIGS. 42 and 43 show additional features of various embodiments. FIG. 42 shows a vehicle 2500. The vehicle 2500 is a refuse truck. The vehicle 2500 has a fluid handling system 2504 mounted to a top of a shell 2506 thereof. The system 2504 is similar to the system 2116 except as described differently below.

The shell 2506 is mounted to a chassis 2508 of the vehicle 2500. The shell 2506 has a volume to receive a load of refuse therein by a lift system 2512 that lifts and dumps garbage bins 2516 therein. A compactor 2524 disposed within the shell 2506 serves to compress the refuse that is deposited therein. The compactor 2524 is shown schematically but would generally include a rigid plate that moves toward a rigid portion of the shell 2506 or vehicle 2500 to reduce the volume of the space inside the shell 2506 temporarily to cause the contents thereof to occupy less space.

The vehicle 2500 also includes a hydraulic actuator 2528. The hydraulic actuator 2528 is coupled at a first end 2532 with the compactor 2524 and directly or indirectly at a second end 2536 with the chassis 2502 of the vehicle 2500. The vehicle 2500 includes a compactor actuator system that include an auxiliary fluid vessel 2534 disposed in the cowling 2112. A fluid line 2540 coupled with the vessel 2534 at a first end is also coupled with the hydraulic actuator 2528 at a second end opposite the first end. A start button 2544 causes the flow of hydraulic fluid from the vessel 2532 to flow into or to convey pressure into the actuator 2528 through the fluid line 2540. The flow of fluid or the conveyance of pressure via the fluid line 2540 causes the hydraulic actuator 2528 to move the compactor 2524 to compress the refuse deposited in the shell 2506. This allows more material to be loaded into the shell 2506 to make the route more efficient. The start button 2544 can be located inside the cab of the vehicle 2500 or adjacent to the lift system 2512.

In one variation, the hydraulic actuator 2528 is coupled with a door or tailgate that is configured to provide access to or enclose the inside area of the shell 2506. The actuator 2528 in this embodiment can be configure to lift a heavy load, which can even include the fluid system 2504 or a variant thereof that may be mounted on the door or tailgate.

In one embodiment multiple fluid systems of the vehicle 2500 can be driven from fluids stored within the cowling 2112. For example, in addition to the compactor 2524, the lift system 2512 could also be driven by a hydraulic or pneumatic system including one or more of the fluid vessels 2534.

Tailgate Mounted Systems

Figure 44:
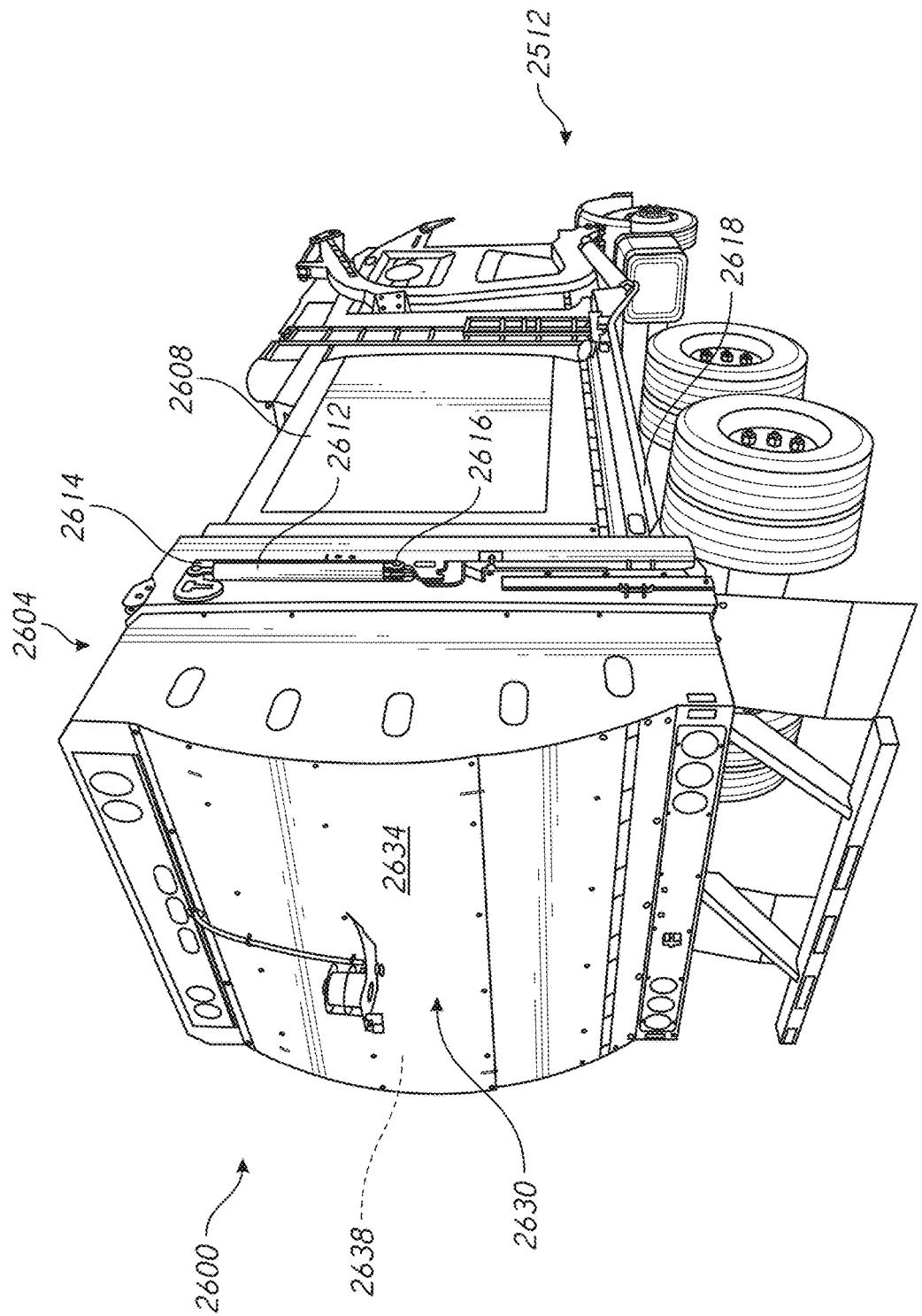
FIG. 44 shows a garbage truck with a tail-gate mounted fluid storage system.

FIGS. 44 and 45 show additional features of a vehicle 2600 having a fluid system 2630. The vehicle 2600 can be a refuse truck. The vehicle 2600 can have any of the features of the vehicle 2500. The vehicle 2600 can have a tailgate 2604. The tailgate 2604 can be configured to open and close, such as to provide access to internal contents of a shell 2608. A hydraulic actuator 2612 can be used to open and close the tailgate 2604. In particular, the actuator 2612 can be coupled at a first end 2614 to the tailgate 2604 and at a second end 2616 to a chassis 2618 of the vehicle 2600. The second end 2616 can be connected directly or indirectly to the chassis 2618.

The fluid system 2630 is mounted to the tailgate 2604. The fluid system 2630 includes a cowling 2634 enclosing a space 2638 in which at least some of the components of the system 2630 reside. Some of the components of the fluid system 2630 that are disposed within the space 2638 are shown in FIG. 45. In particular, the fluid system 2630 includes a frame assembly 2642 that is disposed at least partially within the cowling 2624. The frame assembly 2642 is coupled with and is supported by the tailgate 2604. The connection can be any suitable connection such as one or a plurality of brackets. The frame assembly 2642 is coupled with and supports, in one embodiment, one or a plurality of fuel pressure vessels 2648. The frame assembly 2642 is coupled with and supports, in one embodiment, one or a plurality of auxiliary fluid vessels 2652. The auxiliary fluid vessels 2652 can include gas fluid vessels. The auxiliary fluid vessels 2652 can include pressure vessels. The auxiliary fluid vessels 2652 can include gas pressure vessels. The support of the auxiliary fluid vessel(s) 2652 can be by any suitable support structure such as a bracket on each end or a support block or block assembly as discussed above. The auxiliary fluid vessels 2652 are compactly arranged within the cowling 2634, e.g., are nested within the space partially defined by two adjacent vessels 2648.

The auxiliary fluid system 2630 at least partially disposed in a cowling also includes one or a plurality of fluid conduits 2660 configured to convey fluid from within the fluid vessel(s) 2652 to a fluid port or a junction 2664. The port 2664 can include a point at which fluid supply from a plurality of fluid vessels 2652 merges or can include two separate connection points so that one of a plurality of fluid vessels 2652 can power a first system or component and another of the plurality of fluid vessels 2652 can power a second system or component. In the illustrated embodiment the vessels 2652 supply fluid through fluid conduits 2660 to a merged conduit 2672 that supplies fluid to the actuator 2612 upon pressing of a controller 2676. Upon pressing the controller 2676, which can be a control button, the actuator 2612 can be lengthened extending the distance between the first end 2614 and the second end 2616. Because the second end is secured (directly or indirectly) to the chasses 2618 the tailgate 2604 is moved away from the rearward portion of the shell to expose its volume and any contents therein.

The fluid vessels 2652 could power other or additional components. The fluid vessels 2652 could actuate a compactor disposed in the shell through a second actuator similar to the hydraulic actuator 2528. The fluid vessels 2652 could power an air horn, brakes or other fluid system of the vehicle 2600.

Side-Mounted Systems

Figure 46:
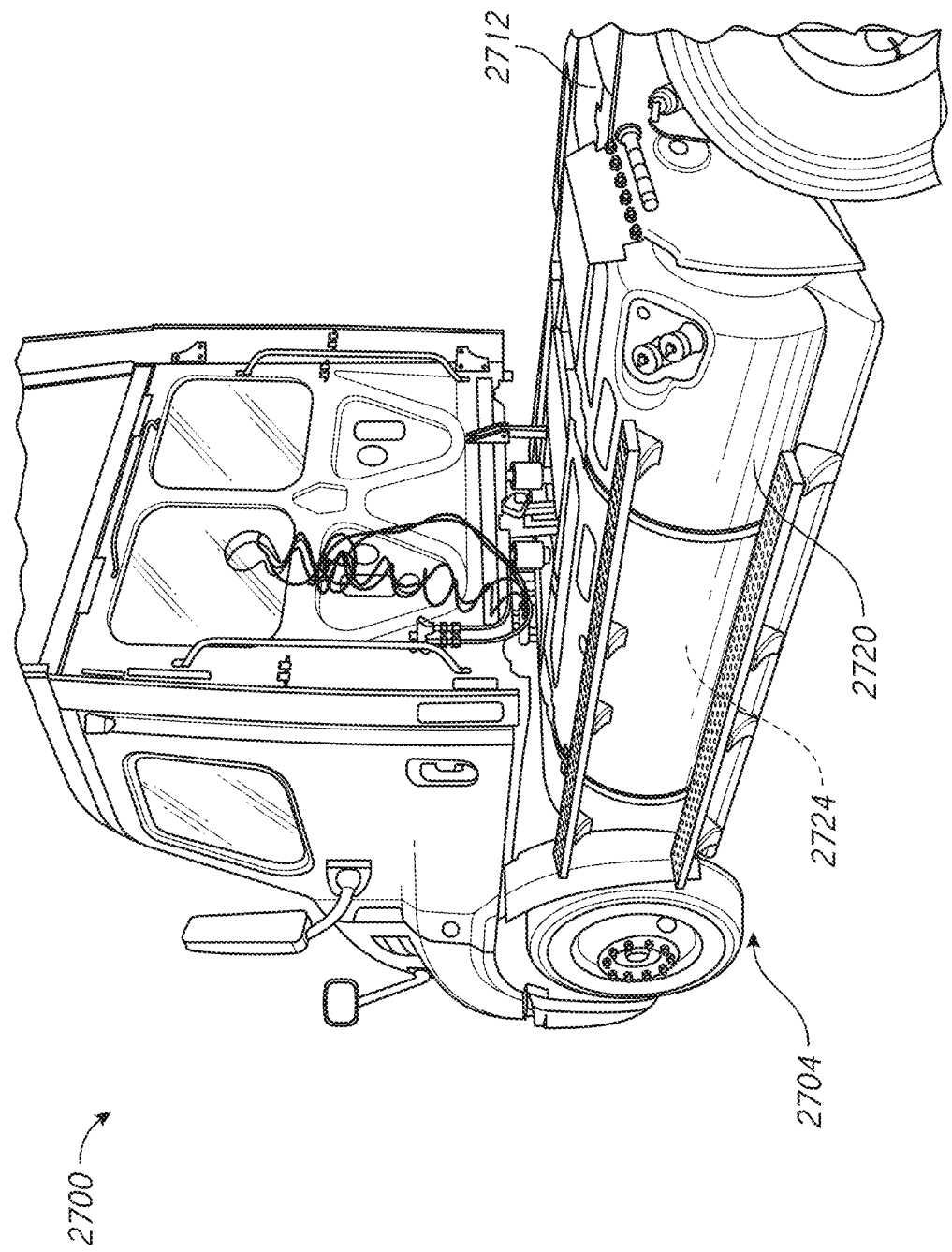
FIG. 46 shows a vehicle with a side-mounted fluid storage system.
Figure 47:
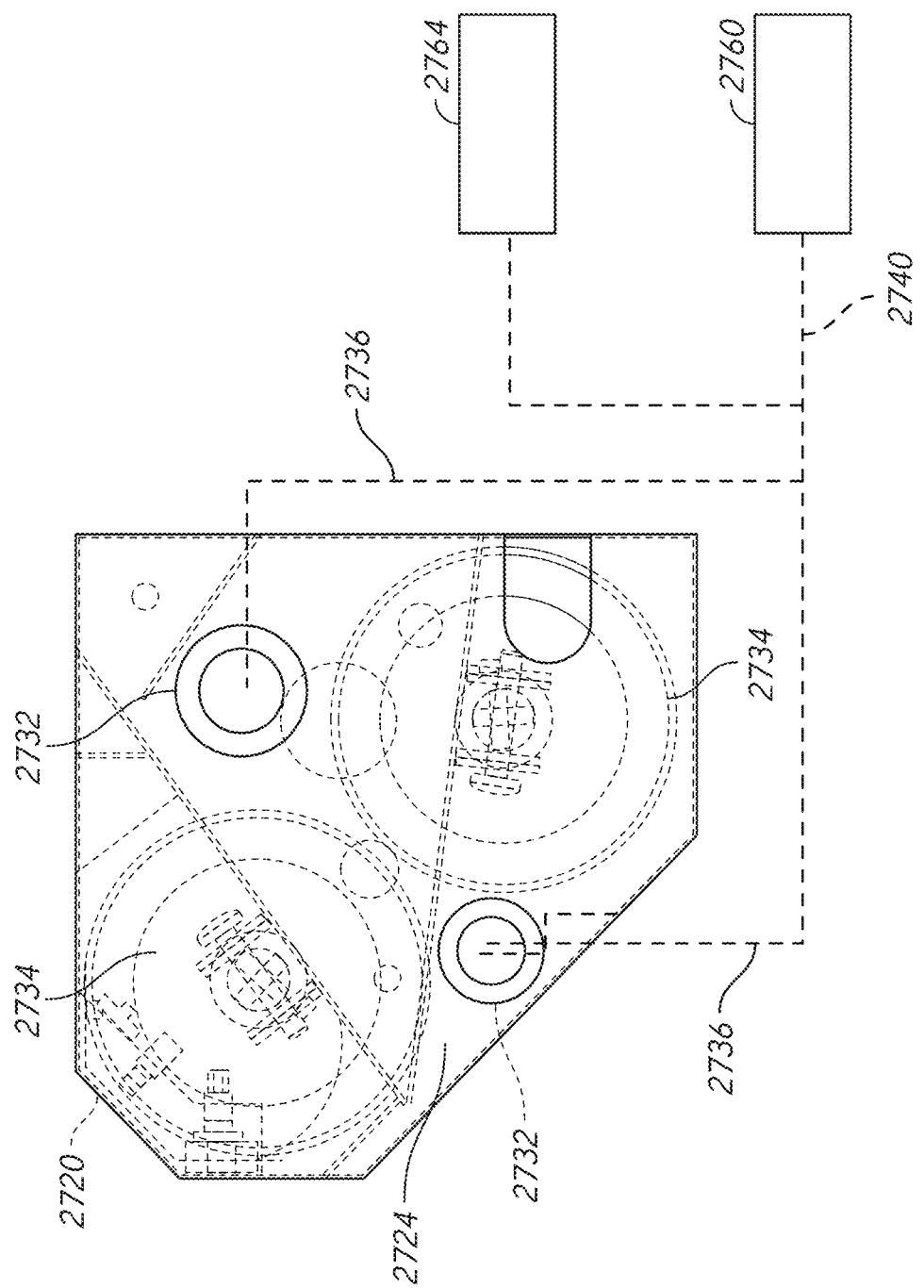
FIG. 47 is a cross-section of the side mounted system of FIG. 46.

FIGS. 46 and 47 illustrate another fluid system 2704 that could be coupled with a vehicle 2700. The vehicle 2700 includes a frame member 2712 to which the system 2704 is mounted. The vehicle 2700 can have a system 2704 mounted to the frame member 2712 on each side of the vehicle. The system 2704 includes a cowling 2720 that is disposed around a space 2724 in which an auxiliary fluid vessel 2732 can be disposed. In the illustrated embodiment, two auxiliary fluid vessels 2732 are disposed in the space 2724 surrounded by the cowling 2720. The auxiliary fluid vessels 2732 are compactly arranged within the cowling 2720, e.g., are nested within the space partially defined by two adjacent vessels 2734 as shown in FIG. 47. Fluid conduits 2736 disposed at least partially in the cowling 2720 convey the fluid between the fluid vessels 2732 and a component 2760 of the vehicle 2700 that is powered by or otherwise uses the fluid. The fluid conduits 2736 can communicate independently with the component 2760 or with two or more components 2760. The fluid conduits 2736 can merge at a valve or junction to a single conduit 2740 to communicate with one or more components 2760.

In the illustrated embodiment a controller 2764 is provided to control fluid flow in the conduit 2736 and/or the conduit 2740. Upon pressing the controller 2764, which can be a control button, the component 2760 is pressurized, powered or otherwise supplied with the fluid form the fluid vessel(s) 2732. The component 2760 can be any of the components disclosed herein or other similar auxiliary components or systems of the vehicle.

Additional Information

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A vehicle, comprising:
a cab configured to house one or more occupants of the vehicle;
a plurality of wheels;
one or more frame rails configured to support the cab and the plurality of wheels;
an engine or power generation system configured to be powered by a fuel;
a cylinder configured to store the fuel to be used by the engine or power generation system, the cylinder comprising:
a first end portion, a second end portion, and a central body forming an enclosed cavity for storing pressurized gas,
a reinforcement structure disposed over the central body, and
a permeation barrier layer interposed between the reinforcement structure and an outer surface of the central body, the permeation barrier layer configured to reduce permeation of contents of the cylinder,
wherein the permeation barrier layer comprises a multilayer tape wound circumferentially about the outer surface of the central body, the multilayer tape comprising a first polymer layer having an inner surface and an outer surface, a metal foil layer, a second polymer layer having an inner surface and an outer surface, and an adhesive layer, the adhesive layer securing a portion of the inner surface of the second polymer layer to the outer surface of the central body, and the metal foil layer disposed between the inner surface of the first polymer layer and the outer surface of the second polymer layer,
wherein the multilayer tape comprises one or more elongate strips each comprising a first elongate lateral edge and a second elongate lateral edge, wherein the first polymer layer, the metal foil layer, the second polymer layer, and the adhesive layer each extend from the first elongate lateral edge to the second elongate lateral edge, and
wherein each of the one or more elongate strips are wound circumferentially about the outer surface of the central body in an overlapping configuration that positions the first elongate lateral edge of a first winding longitudinally between the first and second elongate lateral edges of a neighboring winding, with the adhesive layer securing a portion of the inner surface of the second polymer layer of the first winding to the outer surface of the first polymer layer of the neighboring winding; and
a housing coupled to at least one of the one or more frame rails, the housing configured to receive the cylinder, protect the cylinder, and accommodate fluid coupling between the cylinder and the engine or power generation system, the housing having one or more access panels allowing access to an interior of the housing.

2. The vehicle of claim 1, wherein the vehicle is a tractor configured to pull a trailer.

3. The vehicle of claim 1, wherein the fuel is compressed natural gas.

4. The vehicle of claim 1, wherein the housing is located on a side of the vehicle, behind a cab of the vehicle, on a rooftop of the vehicle, or on a tailgate of the vehicle, and wherein the access panel is rotatably coupled to an end portion of the housing in a configuration that enables the access panel to be rotated between open and closed positions while keeping an inner surface of the access panel parallel to an outer surface of the end portion of the housing.

5. The vehicle of claim 1, wherein the metal foil layer comprises an aluminum foil having a thickness in a range between 0.0005 in and 0.05 inches.

6. The vehicle of claim 1, wherein the central body has a first end coupled with the first end portion and a second end coupled with the second end portion,
wherein the central body has an inner surface, the inner surface and the outer surface of the central body disposed between the first end and the second end, and
wherein the central body between the inner surface of the central body and the outer surface of the central body is a continuous expanse of a homogenous material.

7. The vehicle of claim 1, wherein the central body comprises a cylindrical body and the first end portion comprises a hemispherical member coupled with one end of the cylindrical body, wherein the permeation barrier layer is disposed over the cylindrical body.

8. The vehicle of claim 1, wherein the central body comprises a cylindrical body and the first end portion comprises a hemispherical member coupled with one end of the cylindrical body, wherein the permeation barrier layer has a circumferential end spaced apart from the hemispherical member.

9. A system for powering a vehicle, the system comprising:
an engine or power generation system configured to be powered by a fuel;
a housing configured to:
couple to one or more frame rails of the vehicle, and
receive and protect a cylinder configured to store the fuel to be used by the engine or power generation system,
wherein the cylinder comprises a first end portion, a second end portion, a central body forming an enclosed cavity for storing pressurized gas, a reinforcement structure disposed over the central body, and a permeation barrier layer interposed between the reinforcement structure and an outer surface of a central body, the permeation barrier layer configured to reduce permeation of contents of the cylinder,
wherein the permeation barrier layer comprises a tape having one or more strips wound circumferentially about the central body in an overlapping configuration, the tape comprising a multilayer structure comprising:
a first polymer layer having an inner surface and an outer surface,
a second polymer layer having an inner surface and an outer surface,
a metal foil layer between the first polymer layer and the second polymer layer, and
an adhesive layer located on the inner surface of the second polymer layer,
wherein, for each of the one or more strips of the tape, a first portion of the adhesive layer is adhered to the outer surface of the central body and a second portion of the adhesive layer is adhered to the outer surface of the first polymer layer of a neighboring winding.

10. The system of claim 9, wherein the housing is located on a side of the vehicle, behind a cab of the vehicle, on a rooftop of the vehicle, or on a tailgate of the vehicle.

11. The system of claim 9, wherein the fuel is compressed natural gas.

12. The system of claim 9, wherein the central body comprises a cylindrical body and the first end portion comprises a hemispherical member coupled with one end of the cylindrical body, wherein the permeation barrier layer is disposed over the cylindrical body.

13. The system of claim 9, wherein the central body comprises a cylindrical body and the first end portion comprises a hemispherical member coupled with one end of the cylindrical body, wherein the permeation barrier layer has a circumferential end spaced apart from the hemispherical member.

14. The system of claim 9, wherein the metal foil layer comprises an aluminum foil having a thickness in a range between 0.0005 in and 0.05 inches.

15. A system for powering a vehicle, the system comprising:
- an engine or power generation system configured to be powered by a pressurized gas;
- an internal pressure enclosure comprising:
  - a first end portion;
  - a second end portion;
  - a central body having a first end coupled with the first end portion and a second end coupled with the second end portion, the central body further having an outer surface and an inner surface disposed between the first end and the second end,
  - the first end portion, the second end portion, and the central body forming an enclosed cavity for storing the pressurized gas wherein the inner surface of the central body forms at least a portion of an innermost surface of the internal pressure enclosure, and
  - the central body between the inner surface and the outer surface being a continuous expanse of a homogenous material;
- a reinforcement structure disposed over the central body;
- a barrier structure interposed between the reinforcement structure and the outer surface of the central body, the barrier structure configured to reduce permeation of contents of the internal pressure enclosure,
  wherein the barrier structure comprises a multilayer tape wound circumferentially about the outer surface of the central body, the multilayer tape comprising a first polymer layer having an inner surface and an outer surface, a metal foil layer, a second polymer layer having an inner surface and an outer surface, and an adhesive layer, the adhesive layer securing a portion of the inner surface of the second polymer layer to the outer surface of the central body, and the metal foil layer disposed between the inner surface of the first polymer layer and the outer surface of the second polymer layer,
  wherein the multilayer tape comprises one or more elongate strips each comprising a first elongate lateral edge and a second elongate lateral edge, wherein the first polymer layer, the metal foil layer, the second polymer layer, and the adhesive layer each extend from the first elongate lateral edge to the second elongate lateral edge, and
  wherein each of the one or more elongate strips are wound circumferentially about the outer surface of the central body in an overlapping configuration that positions the first elongate lateral edge of a first winding longitudinally between the first and second elongate lateral edges of a neighboring winding, with the adhesive layer securing a portion of the inner surface of the second polymer layer of the first winding to the outer surface of the first polymer layer of the neighboring winding; and
- a housing coupled to one or more frame rails of the vehicle and configured to receive the internal pressure enclosure.

16. The system of claim 15, wherein the housing is located on a side of the vehicle, behind a cab of the vehicle, on a rooftop of the vehicle, or on a tailgate of the vehicle.

17. The system of claim 15, wherein the central body comprises a cylindrical body and the first end portion comprises a hemispherical member coupled with one end of the cylindrical body, wherein the barrier structure is disposed over the cylindrical body.

18. The system of claim 15, wherein the central body comprises a cylindrical body and the first end portion comprises a hemispherical member coupled with one end of the cylindrical body, wherein the barrier structure has a circumferential end spaced apart from the hemispherical member.

19. The system of claim 15, wherein the metal foil layer comprises an aluminum foil having a thickness in a range between 0.0005 in and 0.05 inches.

20. The system of claim 15, wherein the pressurized gas is compressed natural gas.

* * * * *